US009589419B2

(12) United States Patent
Miyawaki et al.

(10) Patent No.: US 9,589,419 B2
(45) Date of Patent: Mar. 7, 2017

(54) GAMING MACHINE CAPABLE OF REPEATEDLY EXECUTE A UNITARY GAME

(71) Applicants: Universal Entertainment Corporation, Tokyo (JP); ARUZE GAMING AMERICA, INC., Las Vegas, NV (US)

(72) Inventors: Makoto Miyawaki, Tokyo (JP); Masafumi Uchida, Tokyo (JP); Hiromoto Yamauchi, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 0 days.

(21) Appl. No.: 13/872,220

(22) Filed: Apr. 29, 2013

(65) Prior Publication Data

US 2013/0303252 A1 Nov. 14, 2013

Related U.S. Application Data

(63) Continuation of application No. 13/151,731, filed on Jun. 2, 2011, now Pat. No. 8,449,377.

(30) Foreign Application Priority Data

Jun. 8, 2010 (JP) ................................ 2010-131516

(51) Int. Cl.
*A63F 9/24* (2006.01)
*A63F 13/00* (2014.01)
(Continued)

(52) U.S. Cl.
CPC ...... *G07F 17/3244* (2013.01); *G07F 17/3258* (2013.01); *G07F 17/3267* (2013.01); *G07F 17/34* (2013.01)

(58) Field of Classification Search
CPC ........................................................ G07F 17/32
(Continued)

(56) References Cited

U.S. PATENT DOCUMENTS 6,039,649 A * 3/2000 Schulze .......................... 463/16
2002/0037765 A1* 3/2002 Johnson .......................... 463/17
(Continued)

*Primary Examiner* — Kevin Y Kim
(74) *Attorney, Agent, or Firm* — Lex IP Meister, PLLC

(57) ABSTRACT

The present invention provides a gaming machine which is capable of realizing an appropriate balance between players' profits and slot machine providers' profits. When a first number of bets have been selected, a control device executes a first basic unitary game which completes when a first time interval has elapsed after starting the game. When a second number of bets have been selected, the control device executes a second basic unitary game which completes when a second time interval shorter than the first time interval has elapsed after starting the game. On the basis of the fact that the first basic unitary game has been executed, the control device executes a first progressive game in which a first payout rate can be realized. On the basis of the fact that the second basic unitary game has been executed, the control device executes a second progressive game in which a second payout rate higher than the first payout rate can be realized. When a second number of bets have been selected, information relating to the second payout rate is displayed.

4 Claims, 40 Drawing Sheets

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(58) Field of Classification Search

USPC ........................................................... 463/17

See application file for complete search history.

(56) References Cited

U.S. PATENT DOCUMENTS

| | | | | |
|---|---|---|---|---|
| 2003/0027628 | A1* | 2/2003 | Luciano | 463/20 |
| 2003/0232640 | A1 | 12/2003 | Walker | |
| 2005/0059481 | A1 | 3/2005 | Joshi | |
| 2007/0054723 | A1* | 3/2007 | Mattice | G07F 17/3211 463/16 |
| 2008/0058067 | A1 | 3/2008 | Okada | |
| 2008/0058072 | A1 | 3/2008 | Okada | |
| 2008/0311979 | A1 | 12/2008 | Walker | |

* cited by examiner

FIG. 5

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 7

Symbol combination table

| Combination of symbols | | | | | Number of payouts | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | Bonus game※ | Bonus game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

※Free games of the number of times determined by lottery are conducted.

GAMING MACHINE CAPABLE OF REPEATEDLY EXECUTE A UNITARY GAME

CROSS-REFERENCE TO RELATED APPLICATIONS

This application is based upon and claims a priority from the prior Japanese patent Application No. 2010-131516 filed on Jun. 8, 2010, the entire contents of which are incorporated herein by reference.

BACKGROUND OF THE INVENTION

1. Technical Field

The present invention relates to a gaming machine which is capable of repeatedly execute a unitary game.

2. Background Art

A technique of changing a payout rate in a gaming machine repeatedly executing a unitary game is proposed (for example, United State Patent Application Publication No. 2008/0058067 and United State Patent Application Publication No. 2008/0058072).

In recent years, there has been a tendency that slot machines become less popular, whereas table games or the like become more popular. One of the reasons is deemed to be that a payout rate of a slot machine is low. In casinos, since there is a need to ensure sales, there is a tendency of avoiding installation of a slot machine with its high payout rate. That is, in a case where the payout rate is high in a state in which operability of a slot machine is identical to that of another one, the sales in gaming facility tend to lower. Thus, the managers of the gaming facilities such as casinos are prone to hesitating introduction of a slot machine with its high payout rate. As a result, in a slot machine with its low payout rate, since a player cannot enjoy the play of game very much, the number of players playing slot machine games decreased, and the sales in the gaming facility could not be increased.

A slot machine which is capable of changing a payout rate in gaming facility such as casino is also conventionally known. Such a slot machine has a switch for changing a payout rate. The staff in gaming facility can change setting of the payout rate by operating the switch according to a play situation in gaming facility subsequent to closing the facility. However, a player cannot directly check whether the payout rate is set to be high or low. Therefore, even in a case where the staff in gaming facility sets the payout rate to be high, no player can be aware of the fact and there has been a low possibility that a player can enjoy a game at the slot machine at which the payout rate is set to be high. Hence, even in a case where the payout rate is set to be high, players who visit the gaming facility cannot enjoy a game, the number of players who play games at slot machines cannot be always increased, and it has been difficult to increase the sales of the slot machines in the gaming facility.

Further, there is a slot machine at which a basic game migrates to a bonus game on the basis of the fact that a player wins lottery processing and gaming mediums are paid out intensively in large amount. However, in such a slot machine, there are many cases in which the number of payouts in basic game is defined to be extremely small in comparison with that in bonus game in order to realize an appropriate balance of payout. Therefore, in a case where a basic game does not migrate to a bonus game, a large amount of gaming mediums are disallowed to be paid out to a player in the bonus game.

In the conventional slot machines as described above, therefore, there has been a tendency that players have impression that they cannot enjoy a game even if there is provided a function which is capable of changing a payout rate or a function such as a bonus game which enables a player to acquire a large amount of gaming mediums. From the standpoint of gaming facility such as casino, the conventional slot machines having the function which is capable of changing a payout rate or the function such as a bonus game enabling a player to acquire a large amount of gaming mediums as described above, failed to attract players well with these functions and the sales in the gaming facilities could not be ensured.

The present invention has been made in order to solve the conventional problems described above, and it is an object of the present invention to provide a gaming machine which is capable of realizing an appropriate balance between players' profits and providers' profits of slot machines (gaming facilities such as casinos, for example) by realizing an attractive payout rate for players and ensuring the sales of slot machine providers.

For example, the balance between the players' profits and the providers' profits of slot machines can be realized by increasing a payout rate while time of executing a unitary game is reduced and then the number of times of executing the unitary game is increased. The players' profits can be increased by increasing the payout rate. The playing time of the unitary game is reduced and then the number of times of executing the unitary game is increased, whereby the number of gaming mediums inserted can be increased and then the profits of the slot machine providers can be provided. Therefore, the present invention aims to provide a gaming machine which is capable of realizing an appropriate balance between the players' profits and the slot machine providers' profits.

SUMMARY OF THE INVENTION

According to aspect of the present invention, a gaming machine which is capable of repeatedly executing a unitary game, the gaming machine including:

an operating device which can be operated by a player and which is for selecting either one of a first bet number and a second bet number obtained by adding an additional bet number to the first bet number, in order to start the unitary game;

a control device for executing the unitary game, based on a fact that either one of the first bet number and the second bet number has been selected, the control device being executed processing of:

- when the first bet number has been selected, executing a first basic unitary game to be completed when a first time has elapsed after a game has been started;
- when the second bet number has been selected, executing a second basic unitary game to be completed when a second time interval which is shorter than the first time interval has elapsed after the game has been started;
- executing a first progressive unitary game which is capable of realizing a first payout rate, based on the fact that the first basic unitary game has been executed; and
- executing a second progressive unitary game which is capable of realizing a second payout rate which is higher than the first payout rate, based on a fact that the second basic unitary game has been executed; and a display device for displaying information relating to the second payout rate when the second bet number has been selected.

A gaming machine according to one aspect of the present invention is capable of ensuring the providers' sales of gaming machines (gaming facilities such as casinos, for example) while realizing an attractive payout rate for players.

According to another aspect of the present invention, the operating device includes:

a first operating device for selecting the first bet number; and a second operating device for selecting the second bet number, the control device selects the first bet number and then starts execution of the first basic unitary game when the first operating device has been operated by a player; and selects the second bet number, and then starts execution of the second basic unitary game when the second operating device has been operated by a player.

According to a further aspect of the present invention, the control device changes a display mode of information relating to the second payout rate when the first operating device has been operated by a player in a state in which the information relating to the second payout rate is displayed on the display device.

According to further another aspect of the present invention, the control device changes a display mode of information relating to the second payout rate when the first operating device has been operated by a player, in a state in which information relating to the second payout rate is displayed on the display device.

An appropriate balance between players' profits and providers' profits of gaming machines (gaming facilities such as casinos, for example) can be realized by realizing an attractive payout rate for players and ensuring the sales of slot machines of providers.

BRIEF DESCRIPTION OF THE DRAWINGS

FIG. 5 is a view showing a symbol table for basic game.

FIG. 7 is a table showing a symbol combination of the gaming machine according to the embodiment of the present invention.

DESCRIPTION OF THE EMBODIMENTS

Figure 1A:
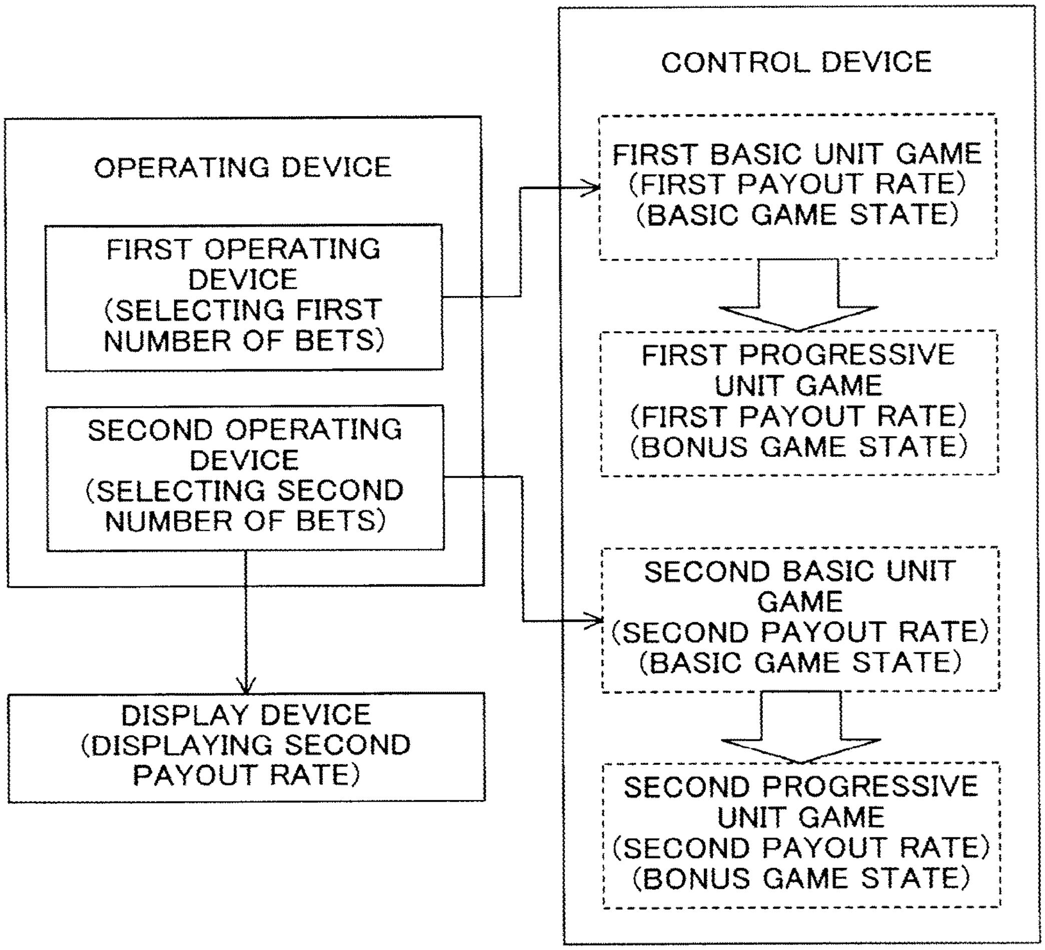
FIG. 1A is a block diagram depicting an overview of a gaming machine according to an embodiment of the present invention.

Hereinafter, the embodiments of the present invention will be described with reference to the drawings.

First Aspect of Embodiment of the Present Invention

Overview of First Aspect of Embodiment of the Present Invention

An overview of a first aspect of an embodiment of the present invention is as follows. When high power is selected, additional 5 bets are placed in addition to an ordinary bet and then, a game can be played at a high payout rate. One-play time at the time of high power becomes shorter than one-play time at the time of non-high power (effect time including reel variation is cut by half). A high payout rate is realized by an increased number of times of free game or an increased payment in big bonus game. The payout rate is adapted to increase as the number of line bets increases. This is not a gaming machine in which a payout rate is increased by changing a winning probability of symbols.

A more specific description will be given below. A high power state is established by adding an additional bet number to an ordinary bet number (hereinafter, referred to as a basic bet number) in order to start a unitary game and then executing the unitary game bet number. If the unitary game is executed in the high power state at least one time, a possibility of migrating to a game with its high payout rate will take place. For example, the game with its high payout rate is a bonus game or a free game. The payout rate can be increased by setting a payment in bonus game to be higher than an ordinary payment or increasing the number of times of executing free game. More profits can be given to players by performing a game with its high payout rate. The bonus game or free game designates a game state in which more profits can be given than those in basic game.

A non-high power state is established when a unitary game is executed in only the ordinary bet number in order to start the unitary game. Execution time of unitary game in the high power state (a second time interval to be described later) is shorter than execution time of unitary game in the non-high power state (a first time interval to be described later). By doing this, more unitary games can be executed in the high power state. A total bet number can be increased by increasing the number of times of unitary game and then the profits in gaming facility such as casino can be increased.

In this manner, profits can be given to a player by a game with its high payout rate and the number of times of playing unitary game is increased, whereby the profits in gaming facility can be increased and then an appropriate balance between the players' profits and the gaming facilities' profits can be realized.

It is preferable that a basic bet number is a so called line bet number in video slot machine. It is preferable that a unitary game is started by multiplying the number of lines for the line bet number and then adding an additional bet number thereto. For example, in a case where the line bet number is 1, the line bet number is 30, and the additional bet number is 5, a total bet number is obtained by 1×30+5 and then a unitary game is started.

It is preferable that a payout rate increases as the line bet number increases. In the first aspect according to the embodiment of the present invention, the payout rate is increased by increasing a payment in bonus game or increasing the number of times of executing free game. That is, the first aspect according to the embodiment of the present invention is not that the payout rate is increased by changing a winning probability of symbols.

In the first aspect according to the embodiment of the present invention, a high power state is established by adding an additional bet number to a basic bet number and then executing a unitary game. A current game can be caused to migrate to a game with its high payout rate by executing the unitary game at least one time in the high power state. The game with its high payout rate is not executed immediately by establishing the high power state. It is preferable to cause whether or not to migrate to a game with its high payout rate to be judged and determined by virtue of a result of the unitary game executed when the high power state is established, for example, a result obtained in unitary game such as a lottery result or a result of winning prize.

It is preferable that a high power state is continued and a current game migrates to a game with its high payout rate. That is, it is preferable that a current game migrates to a game with its high payout rate when an additional BET is placed every time unitary game is executed, the high power state is established, and the unitary game is repeatedly executed. By doing this, an additional bet is placed every time unitary game is executed, so that the profits in gaming facility can be increased. A game with its high payout rate is executed for a player who has contributed to the profits in gaming facility, whereby more profits can be given to the player.

Even in a case where a high power state is not continued, a current game may be caused to migrate to a game with its high payout rate. That is, after a unitary game has been executed in the high power state at least one time, when the unitary game is repeatedly executed in a non-high power state a current game may be caused to migrate a game with its high payout rate. While it is stored that the unitary game has been executed in the high power state at least one time, when a current game migrates to a bonus game or a free game, it is judged whether or not the unitary game has been executed in the high power state at least one time, or alternatively, when the unitary game has been executed in the high power state at least one time, a unitary game is executed in bonus game or free game with its increased payout rate. On the other hand, when a current game migrates to a bonus game or a free game, when a unitary game has not been executed in the high power state at least one time, the unitary game is executed in bonus game or free game with its ordinary payout rate.

In this way, even in a case where a high power state is not continued, at least one additional bet is placed and then the profits in gaming facility can be increased. A game with its high payout rate is executed for a player who has contributed to the profits in gaming facility, whereby profits can be given to the player. In this case, the payout rate may be lowered than that when the high power state has been continued. For example, it is preferable to define a payout rate according to the number of times of unitary game executed in high power state. The profits according to the degree of contribution to gaming facility can be given to a player.

It is preferable that a high power state is established when an additional bet is placed in unitary game of basic game and a non-high power state is established by disabling an additional bet to be placed in unitary game of bonus game enabling more profits to be given to a player than those in basic game. A motivation to play a game while a high power state is maintained until a bonus game or a free game starts can be given to a player. In addition, when a current game has migrated to a bonus game, the non-high power state is established, whereby a loss of a player due to an additional BET can be reduced and more profits can be given to the player.

A high power state can be established in bonus game as well. In this case, a motivation to play a game until the next bonus game or free game starts can be given to a player.

Details of First Aspect According to Embodiment of the Invention

FIG. 1A is a block diagram depicting details of a first aspect according to the embodiment of the present invention.

According to the first aspect of the embodiment of the present invention, a gaming machine which is capable of repeatedly executing a unitary game includes:

an operating device which can be operated by a player and which is selecting a first bet number a first bet number and a second bet number obtained by adding an additional bet number to the first bet number in order to start a unitary game;

a control device for executing a unitary game, based on a fact that either one of the first bet number and the second bet number has been selected, the control device being executed processing of:

- when the first bet number has been selected, executing a first basic unitary game to be completed when a first time has elapsed after a game has been started;
- when the second bet number has been selected, executing a second basic unitary game to be completed when a second time interval which is shorter than the first time interval has elapsed after the game has been started;
- executing a first progressive unitary game which is capable of realizing a first payout rate, based on the fact that the first basic unitary game has been executed; and
- executing a second progressive unitary game which is capable of realizing a second payout rate which is higher than the first payout rate, based on a fact that the second basic unitary game has been executed, and a display device for displaying information relating to the second payout rate when the second bet number has been selected.

A gaming machine has an operating device, a control device, and a display device. The operating device is equivalent to a spin button 31 or a high power button 38 to be described later. The control device is equivalent to a main CPU 71 to be described later. The display device is equivalent to a lower image display panel 141.

The operating device can be operated by a player. The operating device is a device for selecting either one of a first bet number and a second bet number in order to start a unitary game. The second bet number is obtained by adding an additional bet number to the first bet number. The second bet number may be obtained by selecting the first bet number and then adding the additional bet number thereto. In addition, the second bet number may be obtained by selecting the first bet number and the additional bet number simultaneously. The second bet number may also be obtained by causing the first bet number and another additional bet number to be added to each other, and any timing with which they are added to each other is available.

Figure 20:
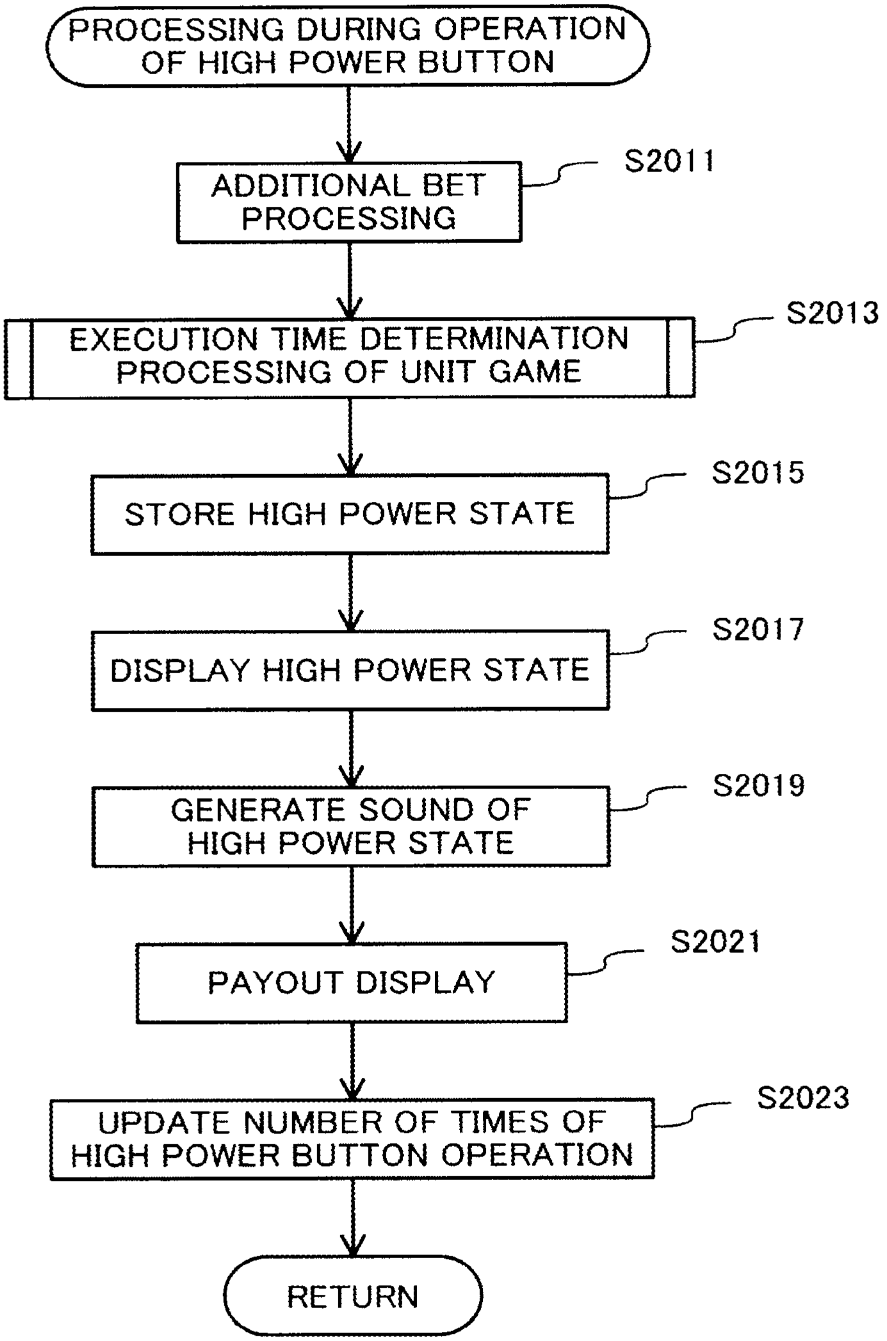
FIG. 20 is a flowchart showing a subroutine of processing to be executed when a high power button 38 is operated by an operator.

Additional bet processing is equivalent to the processing in step S2100 of FIG. 20.

The control device executes a unitary game on the basis of the fact that either one of the first bet number and the second bet number has been selected. That is, the control device executes a unitary game on the basis of the fact the first bet number has been selected. The control device also executes a unitary game on the basis of the fact the second bet number has been selected. When the first bet number has been selected, a unitary game may be started immediately, or alternatively, subsequent to another operation or processing, a unitary game may be started. Similarly, when the second bet number has been selected, a unitary game may be started immediately, or alternatively, subsequently to another operation or processing, a unitary game may be started.

The abovementioned processing is equivalent to the processing operations of FIG. 8 and FIG. 9 to be described later.

Unitary games include a first basic unitary game, a second basic unitary game, a first progressive unitary game, and a second progressive unitary game.

The first basic unitary game is directed to a unitary game to be executed when a first bet number has been selected and is directed to the game to be completed when a first time interval has elapsed after a game has been started. The second basic unitary game is directed to a unitary game to be executed when a second bet number has been selected and is directed to the game to be completed when a second time interval has elapsed after a game has been started. The second time is shorter than the first time.

Figure 22:
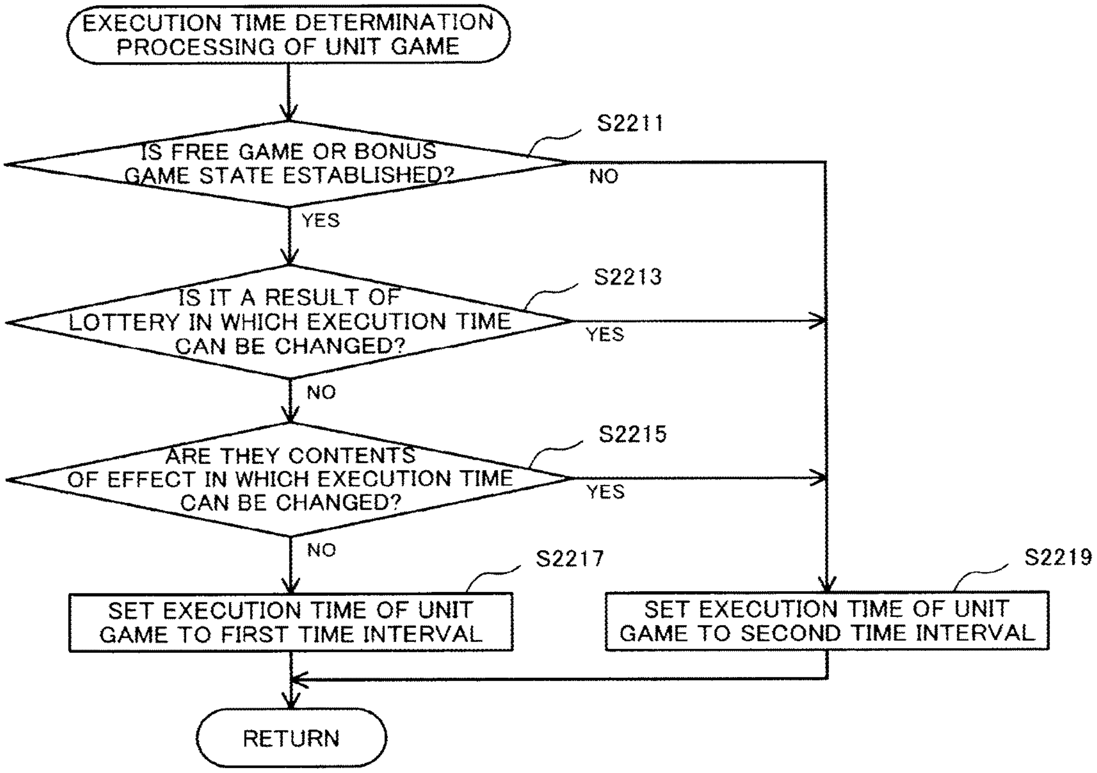
FIG. 22 is a flowchart showing a subroutine of execution time determination processing for unitary game.

The first time interval or second time interval determination processing is equivalent to the processing in FIG. 22.

The first progressive unitary game is directed to a game to be executed on the basis of the fact that the first basic unitary game has been executed. The first progressive unitary game may be executed immediately after the first basic unitary game has been completed, or alternatively, may be executed subsequent to executing another game after the first basic unitary game has been completed. It is stored that the first basic unitary game has been executed and then on the basis of the fact, the first progressive game may be executed. The first progressive unitary game is a game which is capable of realizing a first payout rate.

The second progressive unitary game is directed to a game to be executed on the basis of the fact that the second basic unitary game has been executed. The second progressive unitary game may be executed immediately after the second basic unitary game has been completed, or alternatively, may be executed subsequent to executing another game after the second basic unitary game has been completed. It is stored that the second basic unitary game has been executed and then on the basis of the fact, the second progressive unitary game may be executed. The second progressive unitary game is a game which is capable of realizing a second payout rate. The second payout rate is directed to a payout rate which is higher than the first payout rate.

Figure 14:
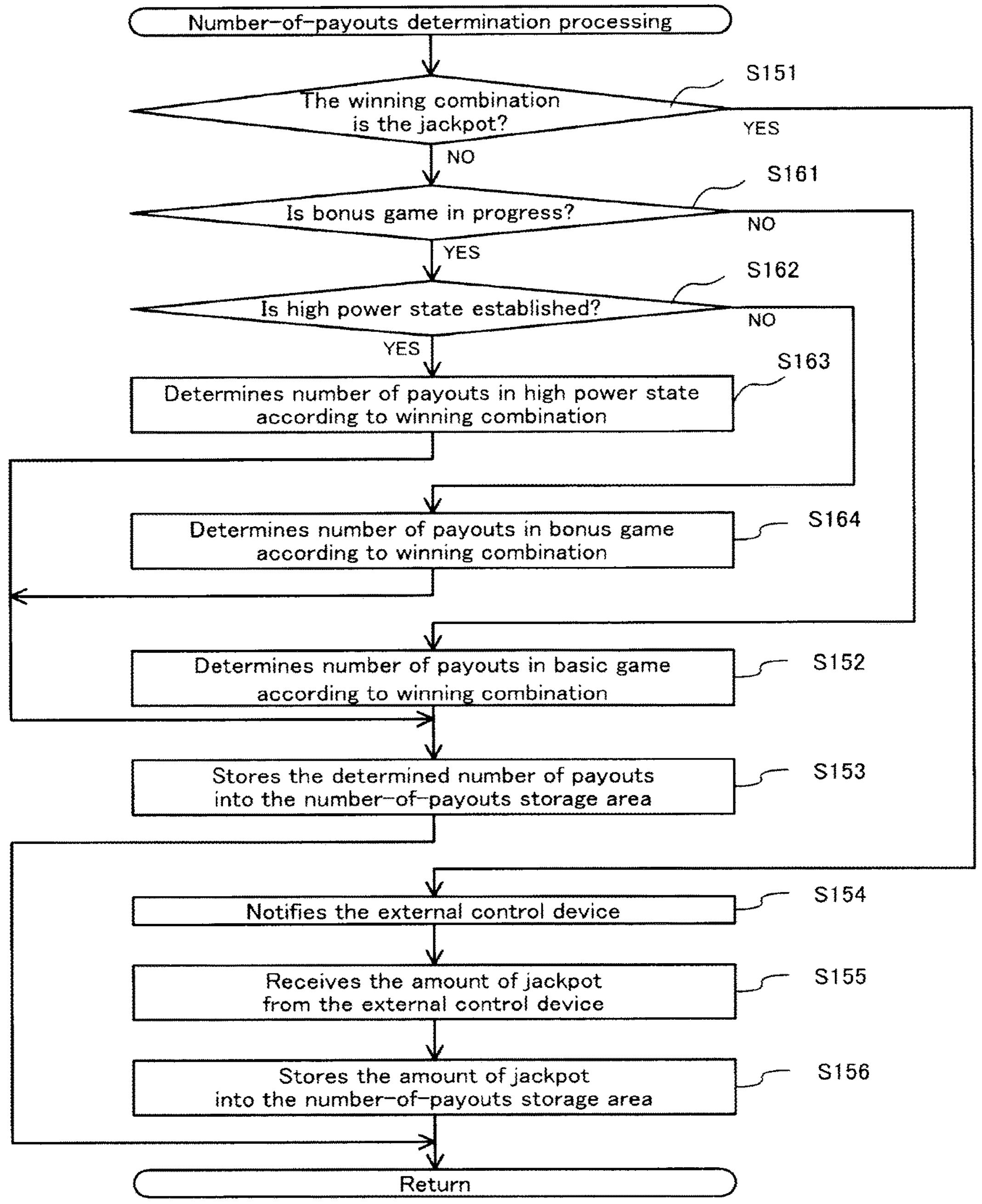
FIG. 14 is a flowchart showing a subroutine of number-of-payouts determination processing of the gaming machine according to the embodiment of the present invention.
Figure 23:
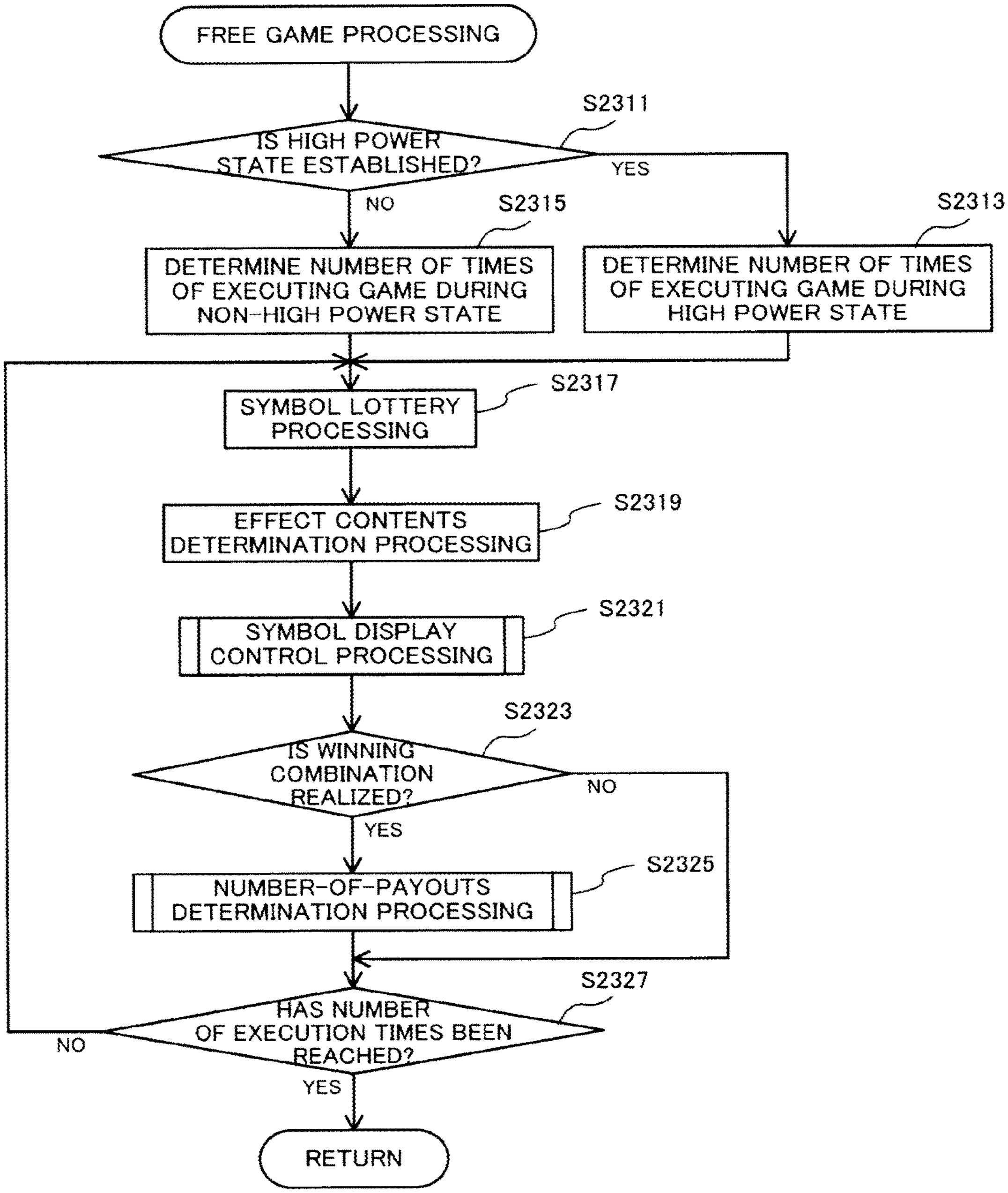
FIG. 23 is a flowchart showing a subroutine of free game processing.

Determination of the second payout rate is equivalent to the processing operations in step S163 of FIG. 14 and in step S2313 of FIG. 23.

The display device serves to display information relating to the second payout rate when the second bet number has been selected. When the first bet number has been selected, information relating to the first payout rate may or may not be displayed.

Display of the information relating to the second payout rate is equivalent to the processing in step S2021 of FIG. 20.

Since information relating to the second payout rate is displayed on the display device, a player is caused to visually recognize the information relating to the second payout rate, enabling the player to determine whether a high payout rate or a low payout rate is set, and the player can be given a profit of being playable at the high payout rate.

Since a player operates the operating device, thereby enabling a payout rate to be determined by the player's will, a state which is advantageous to the player can be determined by the player oneself, thus enabling the player to enjoy a unitary game. In addition, a time interval (a first time interval or a second time interval) during which a unitary game is played according to the payout rate is determined, so that: the number of times of executing a unitary game can be adjusted; and the profits given to gaming facility can be ensured. Doing this makes it possible to realize an appropriate balance between the profits given to the player and the profits given to the gaming facility. Further, a gaming machine for a general roller and a gaming machine for a high roller can be experienced by means of a selection operation of a player oneself by one machine.

It is preferable that: the operating device includes a first operating device for selecting the first bet number and a second operating device for selecting the second bet number; and the control device selects the first bet number and then starts execution of the first basic unitary game when the first operating device has been operated by a player; and selects the second bet number and then starts execution of the second basic unitary game when the second operating device has been operated by a player.

The first operating device is directed to an operating device for selecting a first bet number and starts execution of a first basic unitary game. The second operating device is directed to an operating device for selecting a second bet number and starts execution of a second basic unitary game. In this manner, the first operating device and the second operating device can select a bet number and can start a unitary game. Therefore, a player can make both of a bet operation and a start operation merely by operating the first operating device or the second operating device and can simplify an operation for starting a unitary game. In particular, the player merely operates the second operating device, whereby the second basic unitary game can be executed with an additional bet number being added as well as the first bet number, so that operation can be simplified more significantly.

It is preferable that in a state in which the information relating to the second payout rate is displayed on the display device, when the first operating device has been operated by a player, the control device changes a display mode of the information relating to the second payout rate.

The display mode of the information relating to the second payout rate is obtained by setting the current mode to a non-display mode or changing a display color or the like.

By doing this, the first operating device is operated, whereby the first basic unitary game is executed, enabling a player to visually recognize that a first progressive game is executed on the basis of the fact that the first basic unitary game has been executed. That is, the first operating device is operated, thereby enabling a player to visually recognize that the second progressive unitary game is not always executed.

It is preferable that the control device executes the first basic unitary game and the second basic unitary game in a basic game state and executes the first progressive unitary game and the second progressive unitary game in a bonus game state which is more advantageous to a player than the basic game state.

A second payout rate can be realized by executing a unitary game in a bonus game state, so that a player can be given a motivation to repeatedly execute the unitary game until a basic game state mitigates to a bonus game state and the profits in gaming facility can be increased.

According to the first aspect of the embodiment of the present invention, a gaming machine which is capable of repeatedly executing a unitary game includes:

an operating device which can be operated by a player and which is selecting a first bet number and a second bet number obtained by adding an additional bet number to the first bet number in order to start a unitary game;

a control device for executing a unitary game, based on a fact that either one of the first bet number and the second bet number has been selected, the control device being programmed to execute processing operations (A) to (E) below; and a display device for displaying information relating to a unitary game, the control device executing the processing operations of:

(A) when the first bet number has been selected, executing a first basic unitary game to be completed when a first time interval has elapsed after a game has been started;

(B) when the second bet number has been selected, executing a second basic unitary game to be completed when a second time interval which is shorter than the first time interval has elapsed after the game has been started;

(C) executing a first progressive unitary game which is capable of realizing a first payout rate, based on the fact that the first basic unitary game has been executed; and (D) executing a second progressive unitary game which is capable of realizing a second payout rate which is higher than the first payout rate, based on a fact that the second basic unitary game has been executed, and (E) displaying on a display device information relating to the second payout rate when the second bet number has been selected.

Information relating to a second payout rate is displayed on a display device, so that a player is caused to visually recognize the information relating to the second payout rate, thereby enabling the player to judge whether a high payout rate or a low payout rate is set and then give a profit of being playable at the high payout rate to the player.

A player operates an operating device, enabling a payout rate to be determined at the player's will, so that a state which is advantageous to the player can be determined by the player oneself and a unitary game can be enjoys. A time interval (a first time interval or a second time interval) during which a unitary game is performed according to a payout rate is determined, so that: the number of times of executing a unitary game can be adjusted; and the profits given to gaming facility can be ensured. By doing this, an appropriate balance between the profits given to the player and the profit given to the gaming facility can be realized.

Second Aspect According to Embodiment of the Present Invention

There is a gaming machine for executing a game which is different from a game of scroll-displaying symbols as a feature game. By executing such a game, a possibility of attracting a player's interest will take place. In such a game also, while any payment is given to a player, it is preferable that a tense atmosphere is imparted without causing a player to become weary of the game. Therefore, it is preferable to determine a payment which is finally given to a player by playing a game a plural number of times without immediately determining the payment.

It is an object of the second aspect according to the embodiment of the present invention to provide a gaming machine which is capable of sustaining a tense atmosphere which is imparted to a player without causing the player to be weary of the game.

Overview of Second Aspect According to Embodiment of the Present Invention

An overview of the second aspect according to the embodiment of the present invention is as follows. A roulette rotates on which the number of credits and RESPIN are displayed. After the roulette has been stopped, a position indicated by the arrow is defined as the number of credits. In a state in which the selected number of credits lights, the roulette is rotated again. A magnification and a jackpot are arranged outside of the roulette, and the position designated by the credit having lit after the roulette has stopped indicates the magnification or the jackpot. A value obtained by multiplying a magnification for a credit is defined as an acquired credit.

When RESPIN is established, the roulette is adapted not to stop at a predetermined number of credits. RESPIN is intended to play a roulette game by rotating the roulette again. When RESPIN is temporarily established, the roulette is disallowed to stop at a predetermined number of credits, for example, a credit with its low payment. By doing this, when RESPIN is temporarily established, the roulette can be always stopped at a certain degree of high payment, so that a player's sense of expectation can be enhanced. When RESPIN is temporarily established, the roulette is disallowed to stop by RESPIN again. Doing this prevents extended time required for a roulette game and the profits in gaming facility can be ensured by earlier returning to a unitary game requiring coins or credits.

A more specific description will be given below. An image indicating a roulette board (hereinafter, merely referred to as a roulette board) is displayed on a display. Numeric values of at least one credit (hereinafter, referred to as a payment) and characters indicating at least one replay are arranged and displayed along a circumference of the roulette board. Each of the display regions indicating numeric values of payment or each of the display regions indicating characters indicating replay have an elongated shape along a radial direction of the roulette board.

This roulette board is displayed in a rotating manner and then is displayed in a manner in which the roulette board is stopped and is static after a predetermined time. The numeric values of payment and the characters indicating replay, which are arranged on the roulette board, are also displayed in a rotating manner together with the roulette board.

When the roulette board is displayed in a static manner, an arrow image is displayed. The imaged arrow is displayed so as to indicate either one of at least one numeric value of payment and at least one character string indicating replay. Displaying the imaged arrow enables a player to visually recognize that either one of at least one numeric value of payment and at least one character string indicating replay has been selected by roulette-game (the following, call a first roulette-game). When the arrow has been displayed so as to indicate one numeric value of payment, that numeric value is selected as a payment. When the imaged arrow is displayed so as to indicate one character string indicating replay, replaying is selected.

Next, after the imaged arrow has been displayed so as to indicate one numeric value of payment, the roulette board is displayed as an image in such a manner as to illuminate a display region of such one numeric value of payment. As described above, each of the display regions indicating numeric values of payment or each of the display regions indicating characters indicating replay has an elongated shape along the radial direction of the roulette board. Therefore, the display region of one numeric value of payment is displayed in a illuminative manner, whereby this display region can be displayed in a manner of an elongated region like a clock's hands on the roulette board (hereinafter, referred to as an elongated region).

Afterwards, a roulette board is displayed in a rotating manner while a clock's hands-like region is maintained. When the roulette board is displayed in the rotating mode, the clock's hands-like region is also displayed in a rotating mode together with the roulette board. Then, after a predetermined time has elapsed, the roulette board is stopped and is displayed in a static manner.

An image of a ring-like display object running around the roulette board is displayed on a circumferential edge of the roulette board. At the ring-like display object, a numeric value indicating at least one magnification and a character string indicating at least one jackpot are arranged and displayed along the circumference of the ring-like display object.

When the roulette board is displayed in a static manner, an elongated region is displayed so as to indicate either one of at least one magnification and at least one jackpot. Displaying the elongated region enables a player to visually recognize that either one of at least one magnification and at least one jackpot has been selected by roulette-game (the following, call a second roulette-game). When the elongated region is displayed so as to indicate one numeric value of magnification, that numeric value is selected as a magnification. When the elongated region is displayed so as to indicate one character indicating a jackpot, that jackpot is selected.

When one payment is selected by a first roulette game and then one magnification is selected by a second roulette game, a value obtained by multiplying one magnification for one payment is determined as a payment to be given to a player.

Details of Second Aspect According to Embodiment of the Present Invention

Figure 1B:
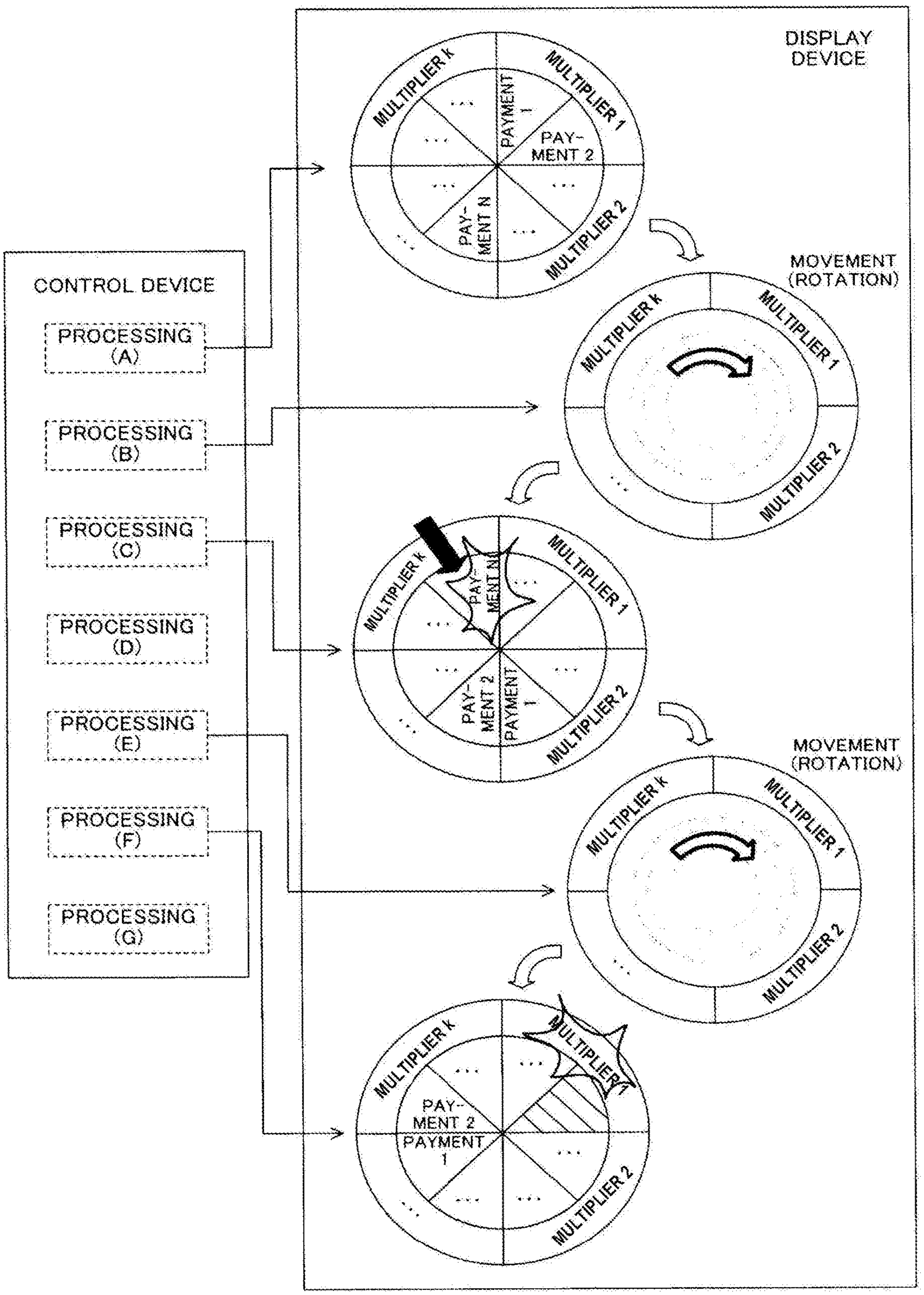
FIG. 1B is a block diagram depicting an overview of the gaming machine according to the embodiment of the present invention.

FIG. 1B is a block diagram depicting the details of a second aspect according to the embodiment of the present invention.

According to the second aspect of the embodiment of the present invention, a gaming machine which is capable of repeatedly executing a unitary game includes:

a control device for determining a payment which is given to a player, the control device being programmed to execute processing operations (A) to (G) below; and a display device for displaying an image relating to the payment that is given to the player, the control device executing the processing operations of:

(A) displaying a plurality of magnification images indicating a plurality of magnification, respectively, in a static manner;

(B) displaying a plurality of payment images indicating a plurality of payments, respectively, in a moving manner;

(C) displaying at least one of the plurality of payment images in a manner in which said at least said one payment image is stopped and static at a predetermined position, when a predetermined time has elapsed;

(D) displaying said one payment image in an illuminative manner;

(E) displaying the plurality of payment images in a moving aspect;

(F) displaying one of the plurality of payment images in a manner in which the plurality of payment images are stopped and static as said one payment image indicates, when a predetermined time has elapsed; and (G) determining a payment which is given to the player according to a payment corresponding to said one payment image and a magnification corresponding to said one magnification image.

A gaming machine has a control device and a display device. The control device is equivalent to a main CPU 71 to be described later. The display device is equivalent to an upper image display panel 131'.

The control device is directed to a device for determining a payment which is given to a player. The control device is programmed to execute the processing operations (A) to (G).

The display device serves to display an image relating to a payment which is given to a player.

In the processing (A), a plurality of magnification images are displayed on the display device in a static manner. The plurality of magnification images indicate a plurality of magnifications, respectively. It is preferable that each of the plurality of magnification is displayed at a different position. Each of the plurality of magnification images can be visually recognized by a player. The processing (A) is equivalent to the processing in step S2611 of FIG. 26.

In the processing (B), a plurality of payment images are displayed on the display device in a moving manner. The plurality of payment images indicate a plurality of payments, respectively. It is preferable that each of the plurality of payment images is displayed at a different position. Each of the plurality of payment images can be visually recognized by a player. The moving manner may be such that a plurality of payment images move similarly or differently. The processing (B) is equivalent to the processing in step S2617 of FIG. 26.

In the processing (C), when a predetermined time has elapsed, one of the plurality of payment images is stopped at a predetermined position and then are displayed in a static manner. Such one payment image is stopped at the predetermined position, thereby enabling player to visually recognize that a payment corresponding to such one of the plurality of payment images has been selected. The processing (C) is equivalent to the processing in step S2621 of FIG. 26.

In the processing (D), said one payment image is displayed in an illuminative manner. The term "illuminative" used here designates that one payment image is illuminated by a virtual light source and then such one payment image is displayed in a brightly illuminated manner. It is sufficient if one payment image can be visually recognized by a player in a brighter illuminated manner. The processing (D) is equivalent to the processing in step S2627 of FIG. 26.

In the processing (E), the plurality of payment images are displayed in a moving manner. The moving manner may be such that the plurality of payment images move similarly or differently. The processing (E) is equivalent to the processing in step S2629 of FIG. 26.

In the processing (F), when a predetermined time has elapsed, one of the plurality of magnification images is displayed in a manner in which the plurality of payment images are stopped and static as said one payment image indicates. One payment image is stopped so as to indicate one magnification image, thereby enabling a player to visually recognize that a payment corresponding to one magnification image has been selected. The processing (F) is equivalent to the processing in step S2633 of FIG. 26.

In the processing (G), the payment given to the player is determined according to the payment corresponding to said one payment image and the magnification corresponding to said one magnification image. The processing (G) is equivalent to the processing in step S2635 of FIG. 26.

Since a plurality of games are executed for determining different parameters between a game for determining a payment and a game for determining a magnification, a tense atmosphere can be imparted for determination for each of the different parameters, unlike repeating a game a plural number of times as to the same parameter, and a tense atmosphere which is imparted to a player can be sustained without causing the player to become weary of the game.

It is preferable that each of the plurality of payment images is arranged along a circumferential direction on a roulette image indicating a roulette board and that each of the plurality of magnification images is arranged along a circumferential direction on a ring-like display object image running around the roulette image.

A payment or a magnification is determined in a manner in which a roulette game is played, so that: the progress of the game can be explicated more clearly; and a player's sense of expectation can be enhanced more significantly.

Third Aspect According to Embodiment of the Present Invention

There is a gaming machine for executing a game which is different from a game of scroll-displaying symbols as a feature game. By executing such a game, a possibility of attracting a player's interest will occur. In such a game, there is a possibility of causing a player to become weary of the game if a game result is merely displayed. Thus, it is preferable to employ a gaming machine at which a player can positively participate in game by causing the player to make operation in accordance with the progress of the game. However, at such a gaming machine, a tense atmosphere is imparted to the player, enabling the player to enjoy a game by causing the player to participate in the game, whereas a possibility of imparting a mental burden to the player will take place.

It is an object of the third aspect according to the embodiment of the present invention to provide a gaming machine which is capable of imparting a tense atmosphere to a player without causing the player to become weary of the game and which is capable of causing the player to enjoy game without imparting a mental burden to the player.

An overview of the third aspect according to the embodiment of the present invention is as follows. Six cards are displayed at the time of feature-in. Five of the six cards are directed to cards for migrating to a bonus game. One of the six cards is directed to cards for migrating to a free game. When three cards for migrating to a big bonus can be arranged, the routine migrates to the big bonus. When one card for migrating free game can be arranged, the routine migrates to the free game. A probability that the routine can migrate to a big bonus and a probability that the routine can migrate to a free game both are ½, both of which are identical to each other. In comparison with a case in which a player must select only one of two cards, the probabilities are ½, both of which are identical to each other, whereas the player's mental burden can be reduced by enabling the player to select any one from among the six cards.

A more specific description will be given below. The third aspect according to the embodiment of the present invention is directed to a gaming machine for executing a bonus selection game for determining whether the routine is caused to migrate to a big bonus or a free game.

First, on the condition that "feature-in" is established, six cards are arranged in one line with the cards being faced up and then the faced-up six cards are displayed on a display. The arrangement of the six cards is determined by means of lottery processing. Five of the six cards are directed to cards for migrating to big bonus (hereinafter, referred to as big bonus cards). One of the six cards is directed to a card for migrating to free game (hereinafter, referred to as a free game card). The six cards are displayed on a display with these cards being faced up, thereby enabling a player to visually recognize arrangement of the six cards.

Next, an aspect of shuffling six cards with these cards being faced up is displayed on a display. That is, the six cards are displayed on a display in a manner in which what suits and numbers of the six cards are cannot be visually recognized by a user and then the sixth cards are displayed in a shuffled manner. After shuffling has completed, the six cards are displayed on a display in a manner in which these cards are arranged with the cards being faced down.

Next, a player is allowed to select one of the six cards. The player may employ any of buttons which are disposed on a control panel or may employ a touch panel which is provided with the touch panel being superimposed on the display. When the player has selected one card, the selected card is displayed at that position with the card being faced up. Doing this enables the player to visually recognize what suit or number of the selected card is.

When the card that is selected by the player is a free game card it is determined that the routine migrates to a free game. When the card that is selected by the player is a big bonus card, the player is allowed to select any one from among the remaining cards.

In this manner, when one free game card is arranged (selected), it is determined that the routine migrates to free game. When three big bonus game cards are arranged, it is determined that the routine migrates to a big bonus. Either one of these two conditions, which is met earlier, will take precedence.

An overview of the third aspect according to the embodiment of the present invention may be as follows. A respective one of an image relating to a first bonus game and an image relating to a second bonus game is constructed so as to trigger their respective bonuses with a different number of images. In a case where a predetermined condition has been displayed as a result of basic game, a predetermined number of the images relating to the first bonus game or the second bonus game are displayed. When the number of displayed images has reached the one allowed to trigger the first bonus game, the first bonus game is executed. When the number has reached the one allowed to trigger the second bonus game, the second bonus game is executed.

Details of Third Aspect According to Embodiment of the Present Invention

Figure 1C:
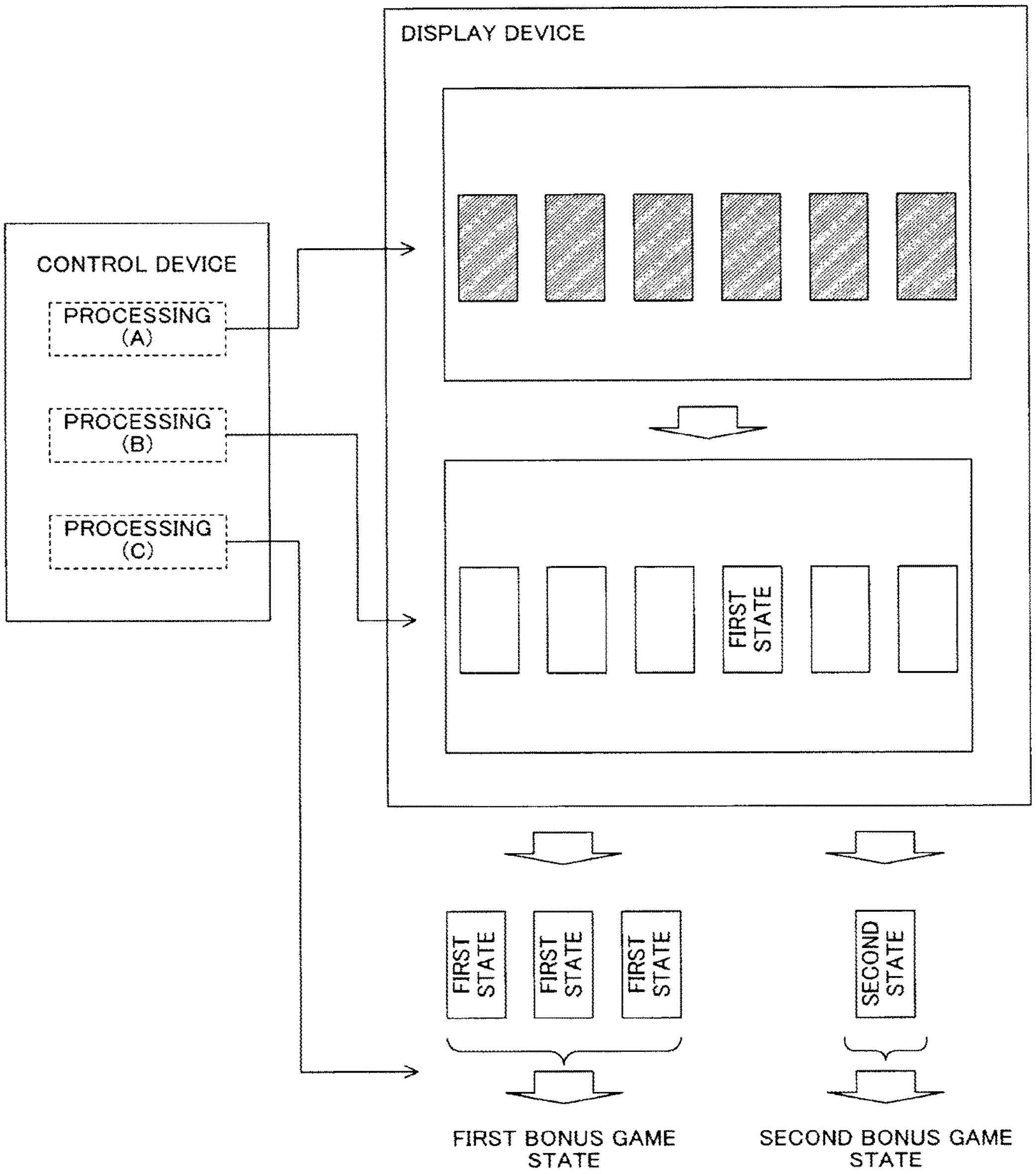
FIG. 1C is a block diagram depicting an overview of the gaming machine according to the embodiment of the present invention.

FIG. 1C is a block diagram depicting the details of the third aspect according to the embodiment of the present invention.

According to the third aspect of the embodiments of the present invention, a gaming machine which is capable of repeatedly executing a unitary game includes:

a control device for executing a unitary game in any of plural kinds of bonus game states including a normal game state, a first bonus game state which is more advantageous to a player than the normal game state, and a second bonus game state, the control device being programmed to execute processing operations (A) to (C) below;

a display device for displaying a plurality of selection images for migrating from the normal game state to either the first bonus game state or the second bonus game state;

an operating device for selecting any of the plurality of selection images which are displayed on the display device by means of a player operation; and a storage device for storing assignment information indicating that at least one of the plurality of selection images is assigned to migrate to the first bonus game state and a remaining one of the plurality of selection images is assigned to migrate to the second bonus game state, the control device executing processing operations of:

(A) when a predetermined start condition is met, displaying the plurality of selection images on the display device, the display processing being displaying the plurality of selection images on the display device in a manner in which a player cannot visually recognize a fact that the first bonus game state has been assigned and a fact that the second bonus game state has been assigned;

(B) selecting one of the plurality of selection images by means of a player selection operation;

(C) executing the processing (B) at least once and then when a first predetermined number of the selection images assigned to the first bonus game state have been selected, causing the normal game state to migrate to the first bonus game;

When a second predetermined number of the selection images assigned to the second bonus game state have been selected, causing the normal game state to migrate to the second bonus game.

A gaming machine has a control device, a display device, an operating device, and a storage device. The control device is equivalent to a main CPU 71 to be described later. The display device is equivalent to a lower image display panel 141 to be described later. The operating device is equivalent to a touch panel 114 to be described later. The storage device is equivalent to a ROM 72 or a RAM 73 to be described later.

The control device executes a unitary game by selecting any of a normal game state and a plurality of bonus game states. The plurality of bonus game states include a first bonus game state and a second bonus game state. Both of the first bonus game state and the second bonus game state are directed to game states which are advantageous to a player than the normal game state. The control device is programmed to execute processing operations (A) to (C) below.

The display device serves to display a plurality of selection images for causing the normal game state to migrate to the first bonus game state or causing the normal game state to the second bonus game state.

The operating device is directed to a device which a player can operate. The operating device is directed to a device for selecting any of a plurality of selection images displayed on a display device by means of a player operation.

The storage device serves to store assignment information. The assignment information includes information indicating that any of the plurality of selection images is assigned to migrate to the first bonus game state and information indicating that a remaining one of the plurality of selection images is assigned to migrate to the second bonus game state.

The processing (A) is directed to processing of displaying a plurality of selection images on the display device when a predetermined start condition is met. It is preferable that the predetermined start condition is determined on the basis of a result of lottery processing of unitary game or a result of winning prize. In the processing (A), the plurality of selection images are displayed on the display device in a manner in which a player cannot visually recognize that a first bonus game state is assigned and that a second bonus game state is assigned. The processing (A) is equivalent to the processing in step s3117 of FIG. 31.

The processing (B) is directed to processing in which one of a plurality of selection images is selected by means of a player selection operation. The processing (B) is equivalent to the processing in step S3127 of FIG. 31.

The processing (C) is executing the processing (B) at least once and then, when a first predetermined number of selection images assigned to a first bonus game state have been selected, causing a normal game state to migrate to the first bonus game; or when a second predetermined number of selection images assigned to a second bonus game have been selected, causing the normal game state to migrate to the second bonus game state. The processing (C) is equivalent to the processing operations in steps S3131 to S3139 of FIG. 31.

A probability of enabling migration to a first bonus game is determined according to the number of selection images assigned to migrate to the first bonus game state and a first predetermined number. Similarly, a probability of enabling migration to a second bonus game is determined according to the number of selection images assigned to migrate to the second bonus game state and a second predetermined number. In this manner, the probabilities enabling migration to the first or second bonus game state can be adjusted and a player can expect a game for selecting a selection image.

In particular, the number of assignments of selection images or the first and second predetermined numbers are determined so that the probabilities that the routine can migrate to the first and second bonus game states are equal to each other, whereby migration to either of the bonus game states is possible at the same probability and a player's mental burden imposed when selecting a selection image can be reduced. Further, more selection opportunities can be increase by setting a large number of selection images, for example, setting the number to six, so that the player's mental burden when selecting a selection image can be reduced.

It is preferable that the processing (A) includes:

(A-1) when a predetermined start condition is met, displaying the plurality of selection images on the display device in a manner in which a player can visually recognize that the first bonus game state has been assigned and that the second bonus game state has been assigned;

(A-2) after a predetermined time has elapsed, displaying the plurality of selection images on the display device in a manner in which a player cannot visually recognize that the first bonus game state has been assigned and that the second bonus game state has been assigned;

(A-3) displaying each of the plurality of selection images on the display device in a moving manner; and (A-4) after a predetermined time has elapsed, displaying the plurality of selection images on the display device in a manner in which a player cannot visually recognize that the first bonus game state has been assigned and that the second bonus game state has been assigned.

Figure 31:
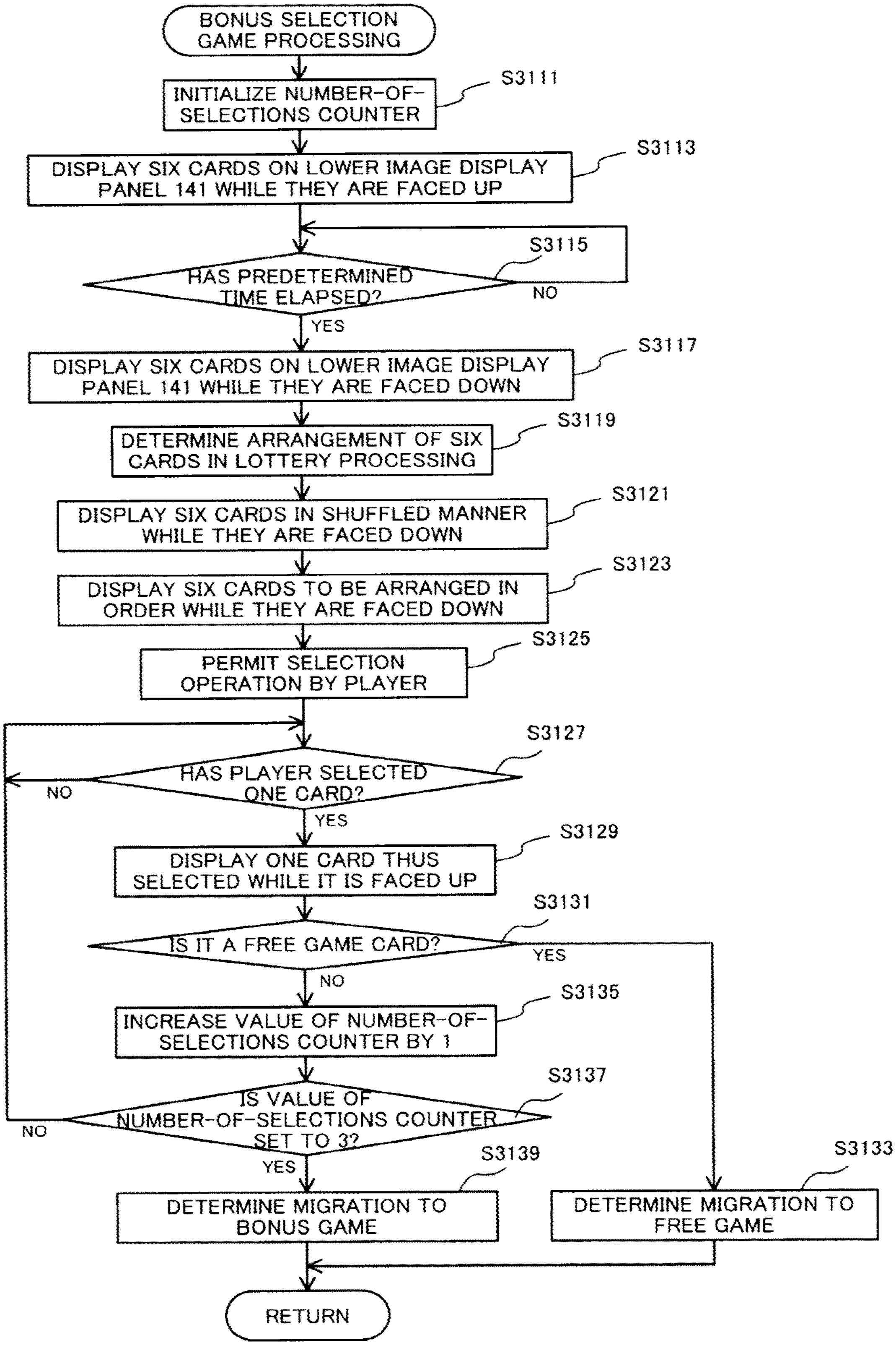
FIG. 31 is a flowchart showing a subroutine of bonus selection game processing.

The processing (A-1) is equivalent to the processing in step S3113 of FIG. 31. The processing (A-2) is equivalent to the processing in step S3117 of FIG. 31. The processing (A-3) is equivalent to the processing in step S3121 of FIG. 31. The processing (A-4) is equivalent to the processing in step S3123 of FIG. 31.

In this manner, a player is allowed to temporarily visually recognize that the first bonus state has been assigned and that the second bonus state has been assigned, whereby a game is started after the specific contents of assignment have been recognized by the player, so that the player's mental burden when selecting a selection image can be reduced.

[Description of Functional Flow Diagram]

Figure 2A:
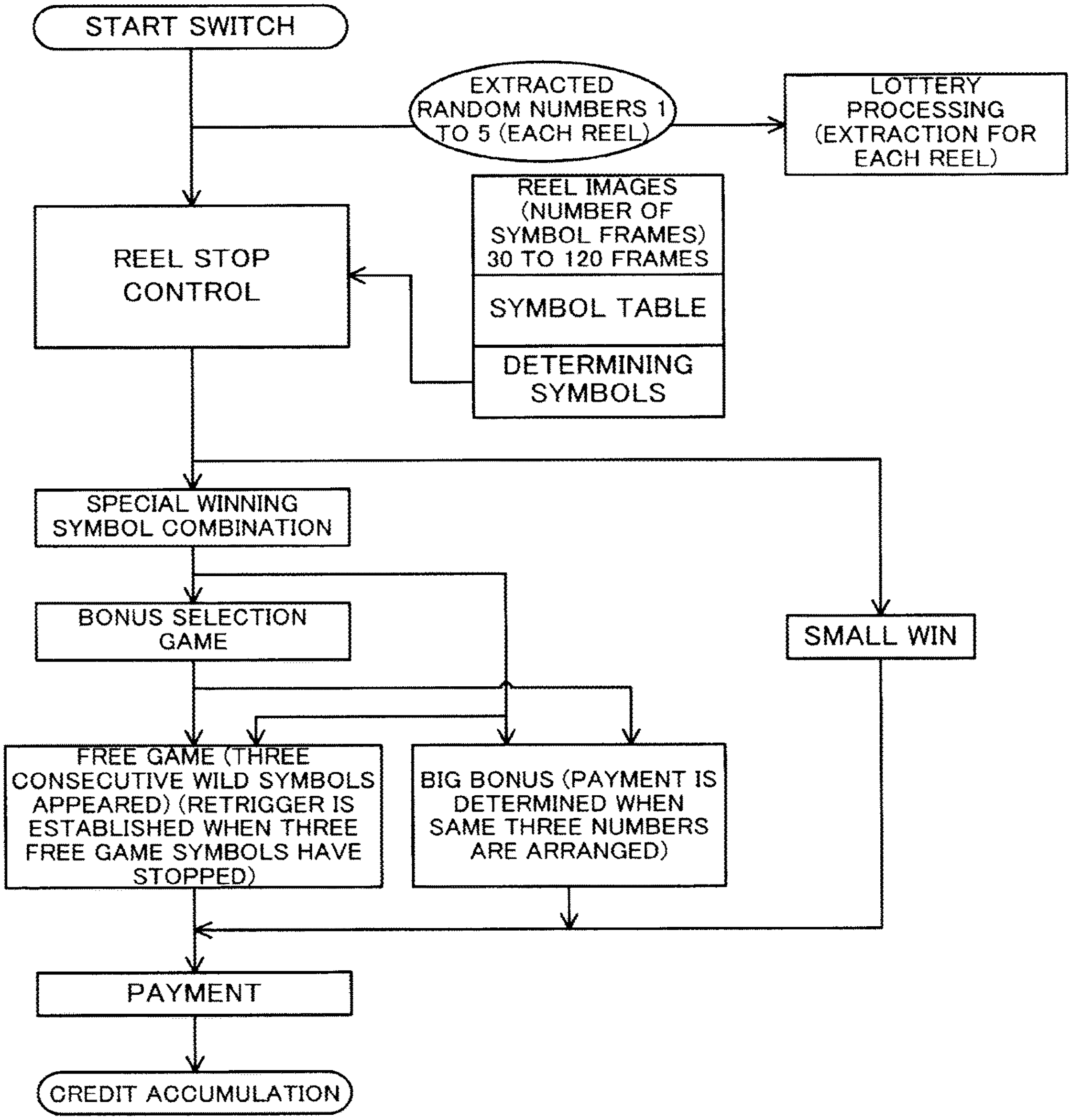
FIG. 2A is a functional flow diagram depicting an overview of the gaming machine according to the embodiment of the present invention.
Figure 2B:
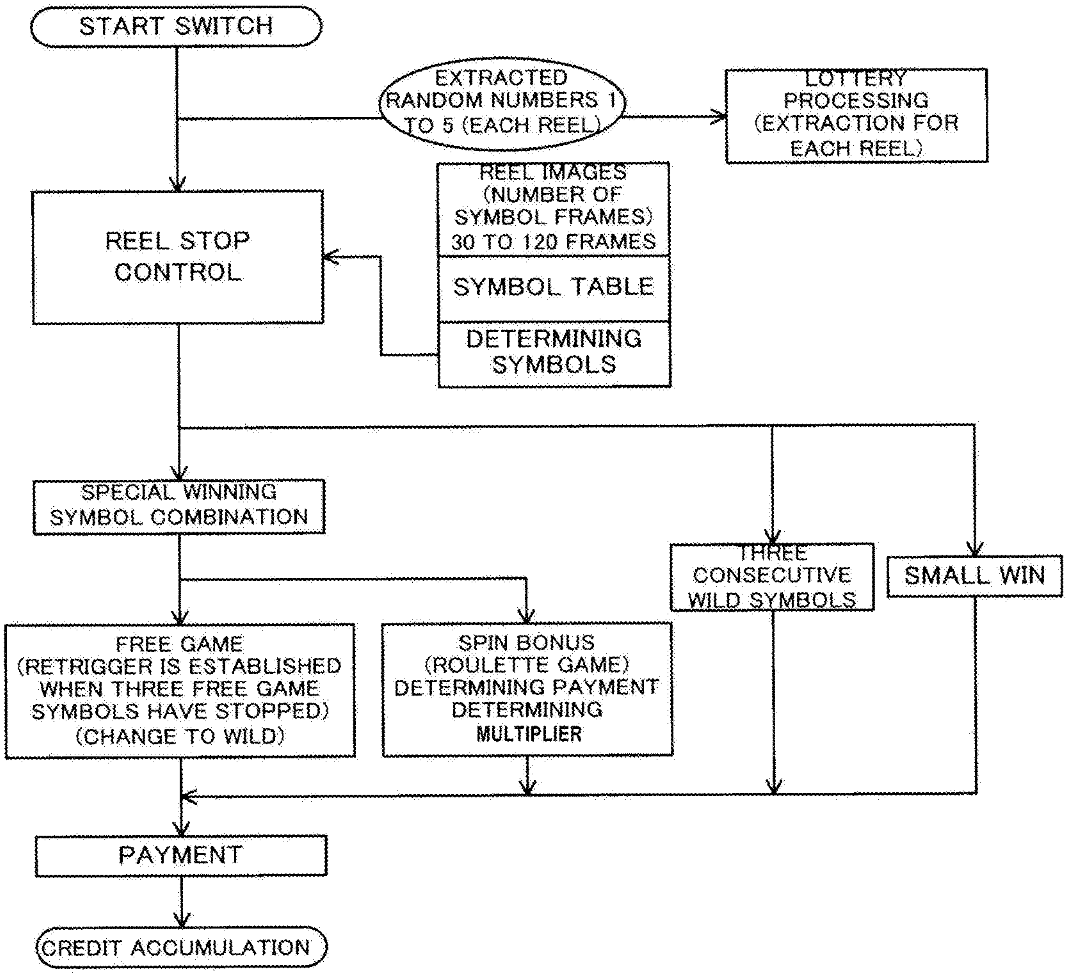
FIG. 2B is a functional flow diagram depicting an overview of the gaming machine according to the embodiment of the present invention.

Basic functions of a gaming machine according to the embodiment will be described with reference to FIG. 2A and FIG. 2B. FIG. 2A and FIG. 2B are views each showing a functional flow diagram of the gaming machine according to the embodiment of the present invention.

<Coin-Insertion/Start-Check>

First, the gaming machine checks whether or not a BET button has been pressed by the player, and subsequently checks whether or not a spin button or high power button has been pressed by the player.

<Symbol Determination>

Next, when the spin button or high power button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning. The winning prizes include at least both of a small win and a winning special symbol.

<Payout>

When the combination of symbols displayed for the player is a combination related to winning, the gaming machine offers benefits according to the combination to the player.

For example, when a combination of symbols related to a payout of coins has been displayed ("Small win" shown in FIG. 2A or FIG. 2B), the gaming machine pays out coins of the number corresponding to the combination of symbols to the player.

A game from the start of scroll-display or rearrangement of symbol arrays to stop-display of the symbol arrays is referred to as a unitary game. The unitary game may be started when a player has operated a BET button. The unitary game may also be started when a player has operated a spin button or a high power button. Further, the unitary game may be completed when payout processing of payment relative to a combination of stop-displayed symbols has been completed.

As shown in FIG. 2A, a gaming machine executes a bonus selection game when a combination of symbols associated with bonus game trigger has been displayed.

The bonus selection game is directed to a selection game using six cards and is a game for determining one bonus from a big bonus and a free game. When the big bonus has been selected, the routine migrates to a big bonus game which is more advantageous to a player than a basic game and then starts the big bonus game. When the free game has been selected, the routine migrates to the free game that is more advantageous to a player than the basic game and then starts the free game. The free game is directed to a game in which lottery associated with determination of symbols to be stopped, described previously, is performed over a predetermined number of times without consuming coins.

The bonus game is started by shuffling six cards after it has been first showed that one of the six cards include a free game card. A bonus is determined in a selection game as to whether three big bonus games are arranged or one free game card is selected. The bonus selection game is directed to a game which makes a player feeling that a big bonus is advantageous.

The free game is directed to a game which causes a player to anticipate a high payment by a volcanic explosion which is displayed on a display. In the free game, the unitary game is played seven times in principle. Unexceptionally, the unitary game may be played more than seven times. A payout rate can be increased by playing the unitary game more than seven times.

If a volcano displayed at an upper part of a screen erupts immediately after scrolling of symbol arrays has been started, a wild effect of displaying three consecutive wild symbols takes place. The wild symbols are directed to symbols handled as almighty symbols or universal symbols. That is, the wild symbols are directed to symbols in which in a case where a wild symbol is included in a combination of symbols which are stopped or rearranged a player can replace the wild symbol with another one so that the combination of symbols which are stopped or rearranged is advantageous to a player.

The wild effect is directed to an effect in which: the volcano displayed at the upper part of the screen erupts immediately after scrolling of symbol arrays has been started; magma having flowed out subsequent to the eruption is displayed in a manner in which it is solidified on a symbol array; and then, three consecutive wild symbols are arranged on that symbol array.

In free game, if three free game symbols are arranged, retrigger is established.

A big bonus game is directed to a selection game in which all payments will take place at the same probability (irrespective of whether the payment is high or low). The big bonus game is directed to a game in which if three magnitudes of the same number are arranged, a payment is determined.

The big bonus game is directed to a bonus game in which same three volcanoes (the same three numbers (magnitudes) are arranged, whereby a payment is determined. When the big bonus game is started, 15 volcano icons are arranged and then a player is caused to select a desired volcano icon. The 15 volcano icons are made of different five numbers (magnitudes). The number of stages of decoration for providing an effect is determined by the first three numbers (magnitudes) that are arranged and then a payment is obtained.

Every time a player makes a selection, an icon indicative of the volcano eruption emerges as an image and then the number (magnitude) is displayed. In effect decoration, an LED indicating the selected number is caused to blink thereby causing the player to visually recognize which number's icon has been selected. The LED is controlled so as to blink shortly only for a short period of time displayed with the number and then go out. The number of the effect decoration is determined by the first three numbers (magnitudes) and then a selection game is completed.

The LED is controlled to be illuminated so that an illumination portion of the effect decoration rises up to the determined number (magnitude) and then the amount of payment to be given to a player is determined.

As shown in FIG. 2A, a gaming machine may cause the routine to migrate to a free game directly or migrate to a big bonus game without executing a bonus selection game when a combination of symbols associated with a bonus game trigger has been displayed. It may be judged, on the basis of a result of lottery processing (specific symbol winning prize), whether to execute a bonus selection game, cause the routine to migrate to a free game, or cause the routine to migrate to a big bonus game.

As shown in FIG. 2B, a gaming machine starts a bonus game which is more advantageous than a basic game from the basic game and then starts the bonus game when a combination of symbols associated with a bonus game trigger has been displayed. The bonus games shown in FIG. 2B include both of free game and spin bonus.

If three free game symbols are arranged due to stoppage of symbol arrays, a Peridot and Cleopatra movie runs on air and then the routine migrates to a free game.

In the free game, when a Peridot symbol has been stopped on a third symbol array (a third reel), a player can touch the Peridot symbol via a touch panel or the like. After the touched Peridot has varied to a "Cleopatra wild symbol", Scarab appears while rolling down Peridot from an end of a screen and then randomly places Peridot. The placed Peridot varies to a "Cleopatra wild symbol."

In the free game, if three free game symbols are arranged, retrigger is established.

If three spin bonus symbols are arranged due to stoppage of symbol arrays, the routine migrates to a spin bonus game.

In the spin bonus game, a roulette rotates on which numeric values indicating payments and characters indicating replay are displayed. After the roulette has been stopped, a numeric value of a position which is indicated by the arrow is selected as the number of payments. The roulette is rotated again in a state in which the selected payment lights up. Magnifications and jackpot are arranged outside of the roulette, and the position indicated by the number of payments at which the roulette has been stopped and illuminated is specified as a magnification or jackpot. A value obtained by multiplying a magnification for the number of payments is determined as the acquired number of payments.

In the gaming machine shown in FIG. 2B, when scrolling of the symbol array of each video reel has been stopped, three consecutive wild effects may be performed in addition to a small win.

The three consecutive wild effects are directed to effects in which three consecutive wild symbols are arranged in one symbol array after a predetermined animation character has been displayed so as to take a predetermined action after an image of the predetermined animation character has been displayed.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game (unitary game), the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a free game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

First Embodiment

[Overall Game System]

The basic functions of the gaming machine have been described above. Next, with reference to FIG. 3, a game system including the gaming machine is described.

Figure 3:
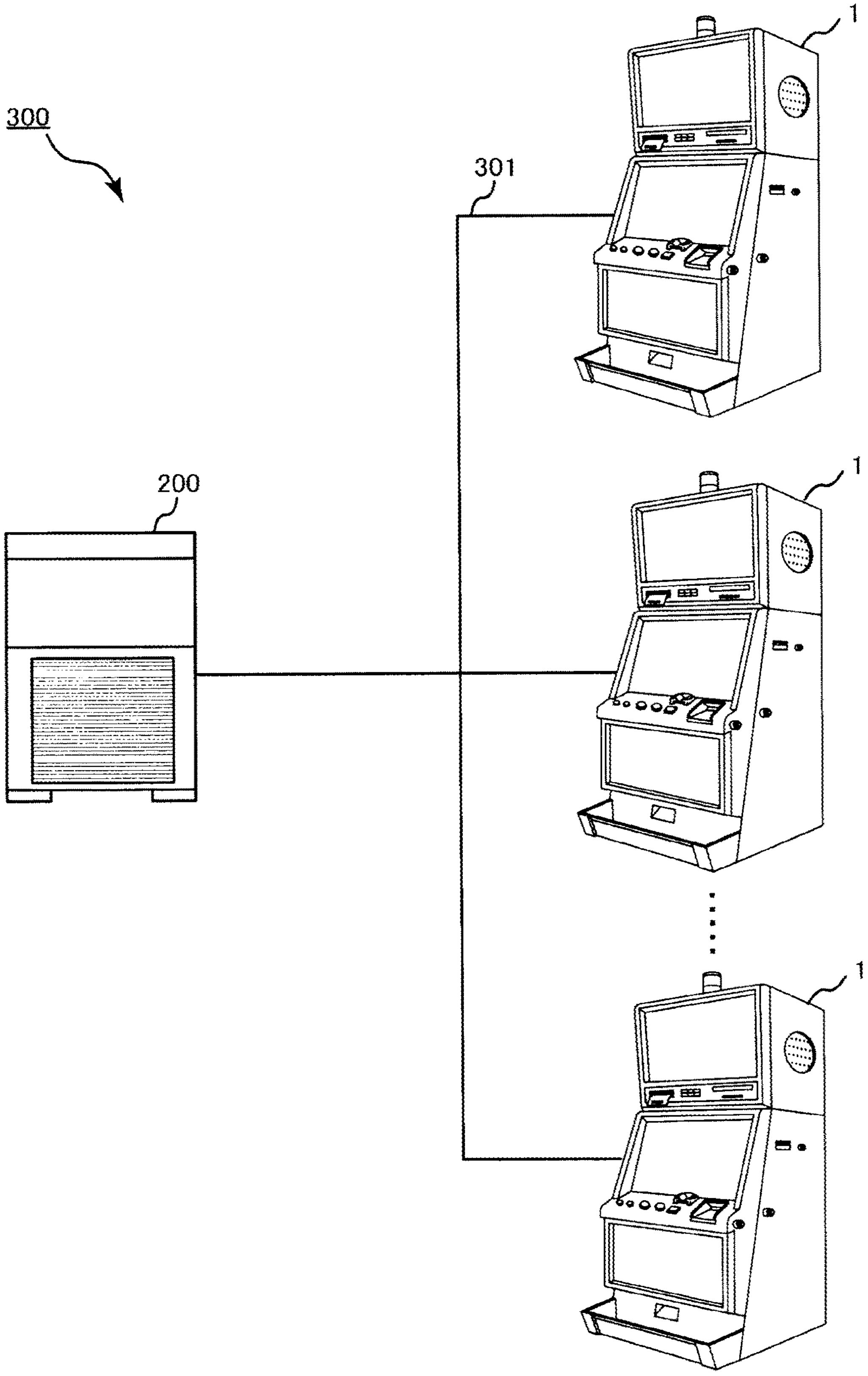
FIG. 3 is a view showing a game system including gaming machines according to an embodiment of the present invention.

FIG. 3 is a view illustrating the game system including the gaming machine according to the embodiment of the present invention.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

The game system according to the present embodiment has been described above. Next, with reference to FIG. 4, an overall configuration of the gaming machine 1 is described.

Figure 4:
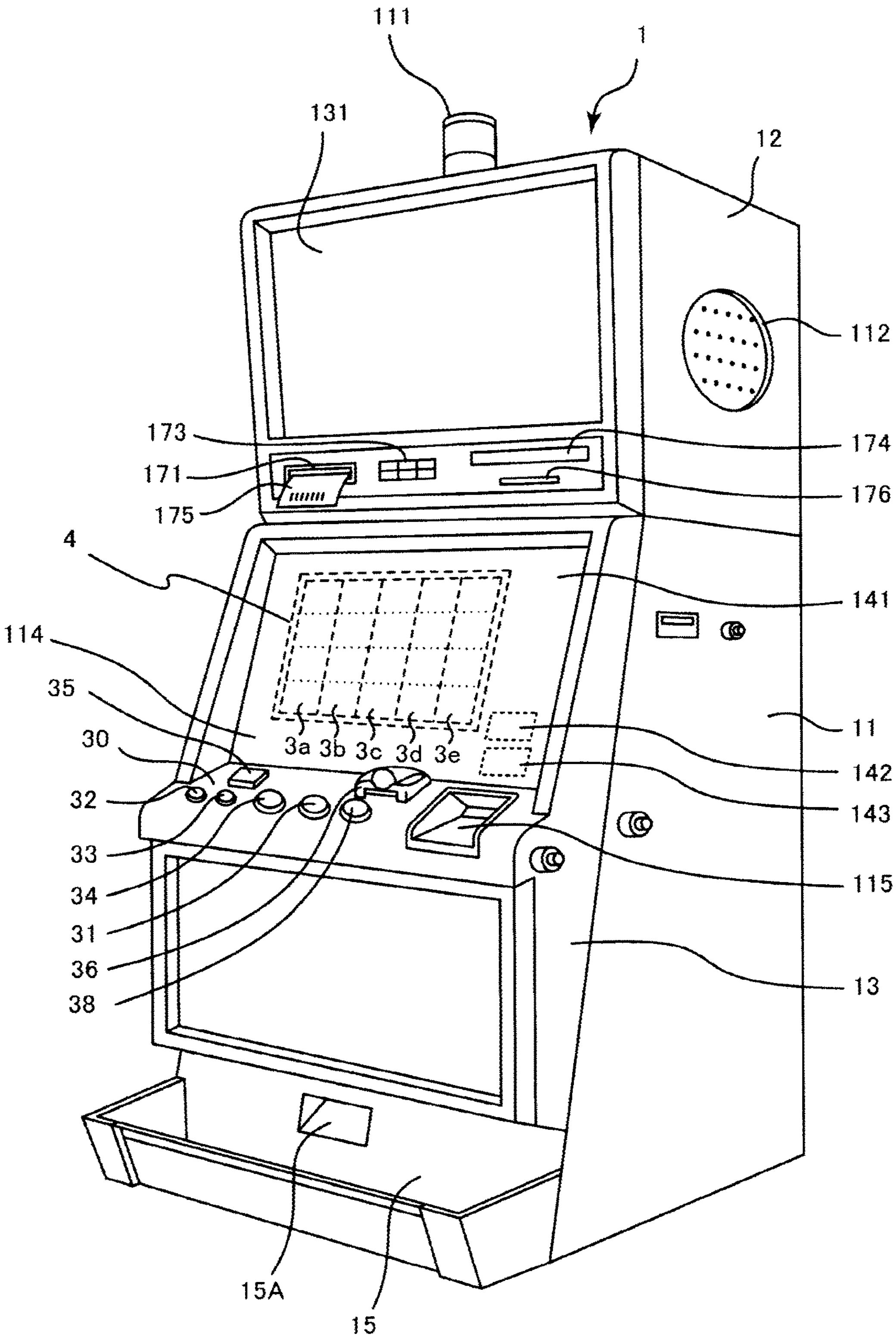
FIG. 4 is a view showing an entire configuration of the gaming machines according to the embodiment of the present invention.

FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player.

In the symbol display region 4, one symbol is displayed in a respective one of three regions, i.e., an upper region, a middle region, and a lower region, according to each video reel 3. In the symbol display region 4, namely, a total of 15 symbols (5 columns×3 symbols) are displayed In the present embodiment, a line formed by selecting one of the aforementioned three regions for each of the video reels 3 and connecting the respective regions is referred to as a winning line.

It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 27 lines.

The lower image display panel 141 has a number-of-credits display region 142 and a number-of-payouts display region 143. The number-of-credits display region 142 is intended to display the number of coins owned by a player, the coins being deposited inside the gaming machine (hereinafter, referred to as the number of credits). The number-of-payouts display region 143 is intended to display the number of coins to be paid out to a player when a winning prize is established (hereinafter, referred to as the number of payouts).

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A high power button 38 is also employed when scrolling of the symbol array of each video reel 3 is started by means of a player operation. When a spin button 31 has been operated by a player, a unitary game is started in a normal state (hereinafter, referred to as a non-high power state). When the high power button 38 has been operated by a player, a high power state is established and then a unitary game is started.

A high power state is directed to a state in which a payout rate higher than that in a non-high power state is established. The high payout rate is realized by increasing the number of times of playing free game to be described later or increasing a payment of bonus game. By doing this, the payout rate can be increased without a need to change a lottery probability of lottery processing.

The payout rate designates a value obtained by dividing the number of coins or the number of credits paid out to a player as a result of executing a unitary game by the number of coins or the number of credits that is determined (betted) in order to start a unitary game. A state of high payout rate refers to a state in which more coins or coins are likely to be paid out. The state of high payout rate refers to a state which is advantageous to a player, but which is disadvantageous to gaming facility. A state of low payout rate refers to a state which is disadvantageous to a player, but which is advantageous to gaming facility.

A unitary game designates a game from the start of scroll-display or rearrangement of symbols to stop-display of the symbols. The unitary game may be started when a player has operated BET buttons such as a 1-BET button 34 and a MAX-BET button 35 or five BET buttons 39*a* to 39*e*. The unitary game may also be started when a spin button 31 or a high power button 38 has been operated. The unitary game may also be completed when payout processing of a payment relative to a combination of symbols stop-displayed has been completed.

A high power state or a non-high power state can be determined by means of a value of a flag stored in a RAM 73 of a mother board 70 to be described later. When the high power state is established, the value of the flag is set to 1 or when the non-high power state is established, the value of the flag is set to 0. When the high power state is established, a player operates the spin button 31 to thereby able to return to the non-high power state. Processing of returning the high power state to the non-high power state will be described later in detail.

It is preferable that when a unitary game is established in a basic game state, a player operates the high power button 38 to thereby establish the high power state. In this case, when a bonus game state or a free game state is established which is advantageous to a player than the basic game state, even if the high power button 38 is operated, no high power state is established. By doing this, the profits given to a player can be restrained and the deficits of gaming facility can be prevented. Even when a bonus game state or a free game state is established, a high power state may be established. In such a case, the profits given to a player are increased to be thereby able to attract the player to the game.

A 1-BET button 34 and a maximum BET button 35 are used for determining the number of coins (hereinafter also referred to as the number of BETs) to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number.

Figure 18:
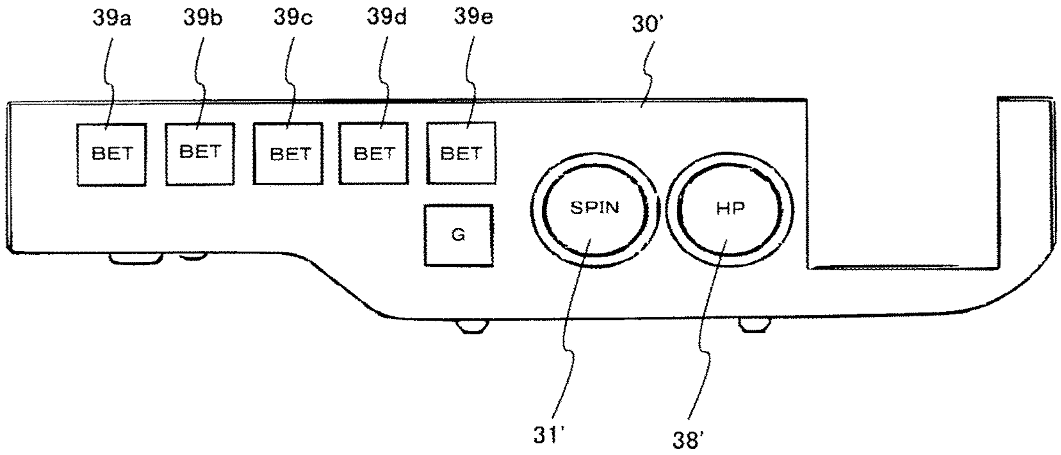
FIG. 18 is a front view showing a control panel 30'.

FIG. 18 is a front view showing a control panel 30' as a modification example. This control panel 30' may be provided in place of a control panel 30 of a gaming machine 1 shown in FIG. 4. Five BET buttons 39*a* to 39*e* are provided on the control panel 30'. A spin button 31' and a high power button 38' are also provided on the control panel 30'. The spin button 31' has a function which is similar to that of the spin button 31. The high power button 38' has a function which is similar to that of the high power button 38.

A different number of bets is assigned to each of five BET buttons 39*a* to 39*e*. For example, the BET button 39*a* is a BET button for setting the number of bets to 1. The BET button 39*b* is a BET button for setting the number of bets to 2. BET button 39*c* is a BET button for setting the number of bets to 3. BET button 39*d* is a BET button for setting the number of bets to 5. BET button 39*e* is a BET button for setting the number of bets to 10. Among these five BET buttons 39*a* to 30*e*, BET operation can be completed by operating a BET button corresponding to a player desired number of bets only once.

In general, the number of coins deposited inside of a gaming machine 1 is stored as the number of credits in a RAM 73 of a motherboard 70. When a 1-BET button 34 and a MAX-BET button 35 or five BET buttons 39*a* to 39*e* have been operated by a player, the number according to a type of each of these BET buttons (the number of bets) is determined, the determined number is subtracted from the number of credits, and then, the number of credits of a result obtained by the subtraction is stored. The number of bets designates the number of coins determined to start a unitary game (all or part of the number of credits), and is referred to as "BET number." In particular, in order to distinguish this BET number from an additional BET number to be described later, a BET number meaning the number of coins determined to start a unitary game (all or part of the number of credits) is referred to as a basic BET number. The number of bets obtained by adding the additional BET number to the basic BET number is referred to as a total BET number.

In order to start a unitary game, a player operates a 1-BET button 34 and a MAX-BET button 35 or five BET buttons 39*a* to 39*e*. Operation of the BET buttons for starting the unitary game is referred to as "BET operation." An action of a player operating the BET buttons is referred to "BET." In this manner, BET or BET operation is referred to as an operation of determining the number of bets (all or part of the number of coins or the number of credits) in order to start a unitary game.

As described above, a player makes BET operation (operation of the 1-BET button 34 and the MAX-BET button 35 or five BET buttons 39*a* to 39*e*), whereby the number according to a type of each of these BET buttons (a basic BET number) is determined. Next, the player operates a spin button 31, whereby a unitary game is started.

When a player has operated a high power button 38 after a basic BET number has been determined by a player making BET operation, an additional BET number is determined. In a case where the number of credits at that time point is insufficient and the additional BET number cannot be determined, a message indicating an insufficient number of credits is displayed on a lower screen display panel 141 or the like.

It is preferable that an additional BET number is constant. For example, let us presuppose that an additional BET number is set to 5 and a value obtained by adding the setting to a basic BET number is a total BET number. In a case where the basic BET number is set to 1, the total BET number is set to 6 by adding 5 as the additional BET number thereto. In a case where the basic BET number is set to 4, the total BET number is set to 9 by adding 5 as the additional BET number thereto.

An additional BET number may not be constant. For example, the additional BET number may be determined by employing a basic BET number, for example. Let us presuppose that a value obtained by multiplying 3 for the basic BET number is a corresponding additional BET number. In a case where the basic BET number is set to 1, a numeric value 3 obtained by multiplying 3 for 1 is defined as an additional BET number. In a case where the basic BET number is set to 4, a numeric value 12 obtained by multiplying 3 for 4 is defined as an additional BET number. Determination of an additional BET number is not limitative to a method of performing computation by multiplying 3. By doing this, a player's sense of expectation can be enhanced as the additional BET number increases.

An additional BET number can be determined by merely operating a high power button 38, whereby operation for additional BET by a player can be eliminated and additional BET operation can be simplified. Additional BET operation to be made by a player is eliminated, whereby a unitary game can be started speedily and the number of times of executing unitary game can be increased. By increasing the number of times of executing unitary game, the number of coins a day inserted into gaming machines can be increased and profits can be given to gaming facility such as casino.

An additional BET number may also be determined by a player operating the 1-BET button 34 and the MAX-BET button 35 or five BET buttons 39*a* to 39*e* or the like. In such a case, only the player-desired BET number is targeted for additional BET, so that illegal use of coins is prevented and a unitary game can be started at a player's will.

As described above, when a player has operated the high power button 38 after the basic BET number has been determined by a player making BET operation, an additional BET number is determined. The additional BET number is determined, whereby a non-high power state migrates to a high power state. After the migration to the high power state, when a predetermined condition is met, a game state of high payout rate is established.

Specifically, after the migration to the high power state, when a bonus game trigger is established, the number of payments in bonus game (the payout number of coins) is increased. After the migration to the high power state, when a free game trigger is established, the number of times of executing unitary game in free game is increased. In this manner, a payout rate can be increased by increasing the number of payments or increasing the number of times of executing unitary game. By increasing the payout rate, more amount of payment can be paid out to a player to be thereby able to attract the player to the game.

When the routine migrates to the high power state, execution time of unitary game is reduced. For example, the execution time of unitary game in the high power state is set at half of that in non-high power state. By doing this, the number of times to be able to execute unitary game can be increased; a total BET number can be increased together with an increased number of executing unitary game; and even if a game state in which a payout rate is increased is provided, the profits of gaming facility such as casino can be ensured. In this manner, by providing both of a game state of high payout rate and a unitary game of short time, an appropriate balance between profits of a player and those of gaming facility such as casino can be realized.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described.

FIG. 5 is a view illustrating the arrangements of symbols drawn on the peripheral surfaces of the reels of the gaming machine according to the embodiment of the present invention.

A first video reel 3*a*, a second video reel 3*b*, a third video reel 3*c*, a fourth video reel 3*d*, and a fifth video reel 3*e* each is assigned with a symbol array consisting of 22 symbols that correspond to respective code numbers from "00" to "21".

Types of the symbols provided are "JACKPOT 7", "BLUE 7", "BELL", "CHERRY", "STRAWBERRY", "PLUM", "ORANGE", and "APPLE".

[Configuration of Circuit Included in Gaming Machine]

The configuration of the symbol arrays included in the video reels 3 of the gaming machine 1 has been described above. Next, with reference to FIG. 6, a configuration of a circuit included in the gaming machine 1 is described.

Figure 6:
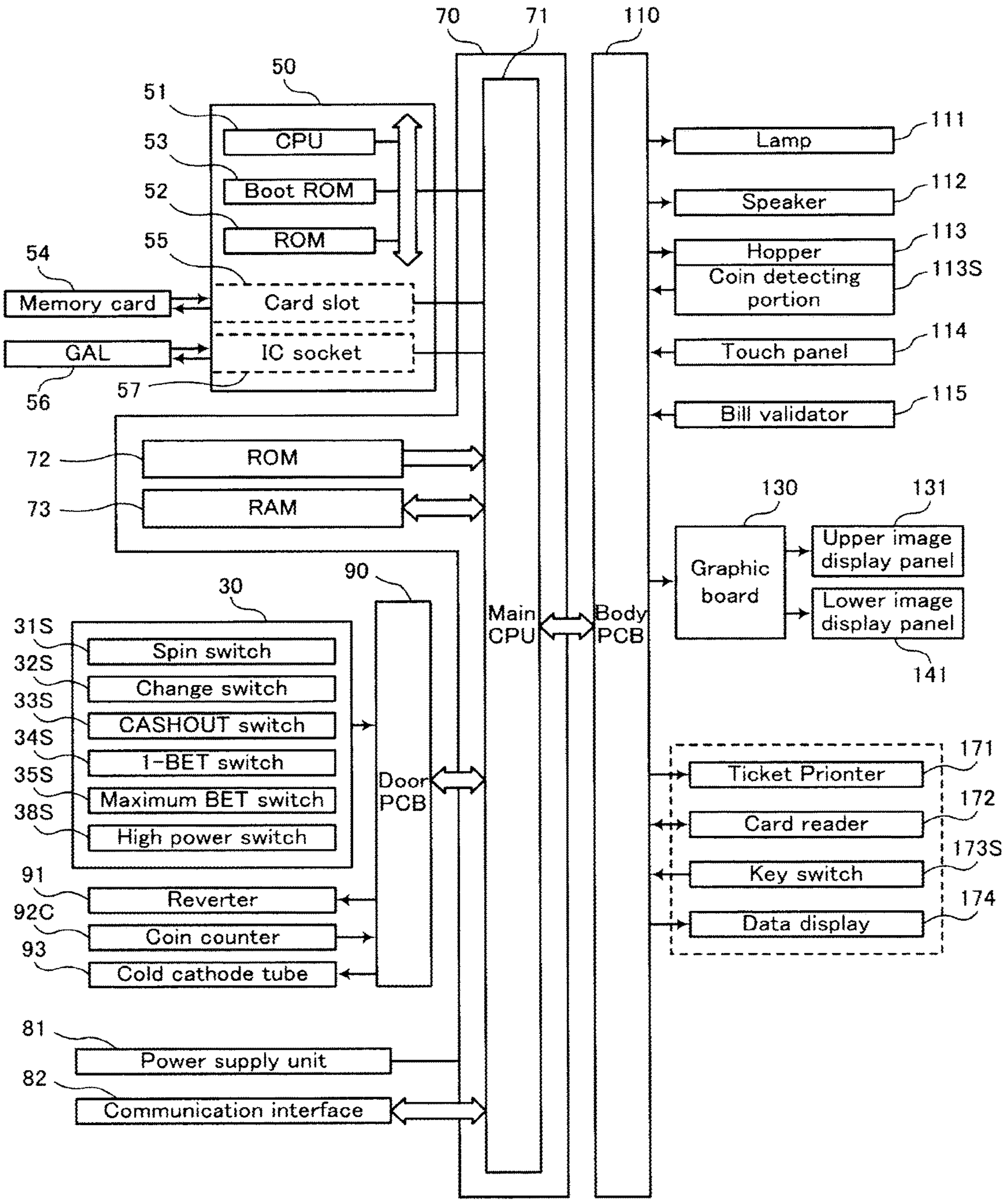
FIG. 6 is a block diagram depicting an internal configuration of the gaming machine according to the embodiment of the present invention.

FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 8 to 17 which are described later). Further, the aforementioned game program includes data (see FIG. 5) specifying the configuration of the symbol array assigned to each video reel 3.

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (for example, the upper region) out of the four regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of "JACKPOT7", and includes seven symbols of "ORANGE". Hence, the former is determined at the probability of "1/22", whereas the latter is determined at the probability of "7/22".

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper cheek program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S, a maximum BET switch 35S, and a high power switch 38S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71*a* signal corresponding to the detected place. Upon acceptance of a valid bill, the bill validator 115 outputs to the main CPU 71*a* signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like. A credit number display region 142 of the lower image display panel 141 displays a credit number stored in RAM 73. A payout number display region 143 of the lower image display panel 141 displays a number of payout of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Symbol Combination Table]

A description of a circuit construction of a gaming machine 1 has been furnished above. Next, a symbol combination table will be described with reference to FIG. 7. FIG. 7 is a view showing a symbol combination table of a gaming machine according to the embodiment of the present invention.

The symbol combination table specifies combinations of symbols associated with winning prizes and the number of payouts. At the gaming machine 1, a winning prize is established in a case where scrolling of the symbol array of each video reel 3 is stopped and then a combination of symbols displayed on a winning line coincides with that of symbols specified according to the symbol combination table. According to the winning combination, a privilege such as coin payout or start of bonus game is awarded to a player. In a case where a combination of symbols displayed on a winning line does not coincide with any of the symbol combination specified according to the symbol combination table, no winning combination (a so called "losing") is established.

Basically, in a case where all of the symbols displayed on a winning line by means of the respective video reels 3 are symbols of one type from among "Jackpot 7", "APPLE", "BLUE 7", "BELL", "CHERRY", "STRAWBERRY", "PLUM" and "ORANGE", a winning prize is established. However, as to symbols of each of the types "CHERRY" and "ORANGE", even in a case where one or three of one type of symbol is displayed on a winning line by means of video reels 3, a winning prize is established.

For example, in a case where symbols "BLUE 7" are arranged on a winning line by means of all of the video reels 3, a winning combination is established as "BLUE" and then 10 is determined as the number of payouts. Coin payout is then performed based on the determined number of payouts. Coin payout is performed by actually ejecting coins from a coin payout exit 15A, adding to the number of credits, or issuing a barcode ticket.

"JACKPOT 7" is a symbol associated with a jackpot trigger. In a case where a plurality of symbols "JACKPOT 7" is displayed on a winning line by means of all of the video reels 3, a winning combination is established as a jackpot and then a jackpot amount is determined as the number of payouts.

"APPLE" is a symbol associated with a bonus game trigger. In a case where a plurality of symbols "APPLE" is displayed on a winning line by means of all of the video reels 3, a winning combination is established as a bonus game trigger and then a bonus game is started from a next play of the game.

[Contents of Program]

The symbol combination table has been described above. Next, with reference to FIGS. 8 to 17, the program to be executed by the gaming machine 1 is described.

<Main Control Processing>

Figure 8:
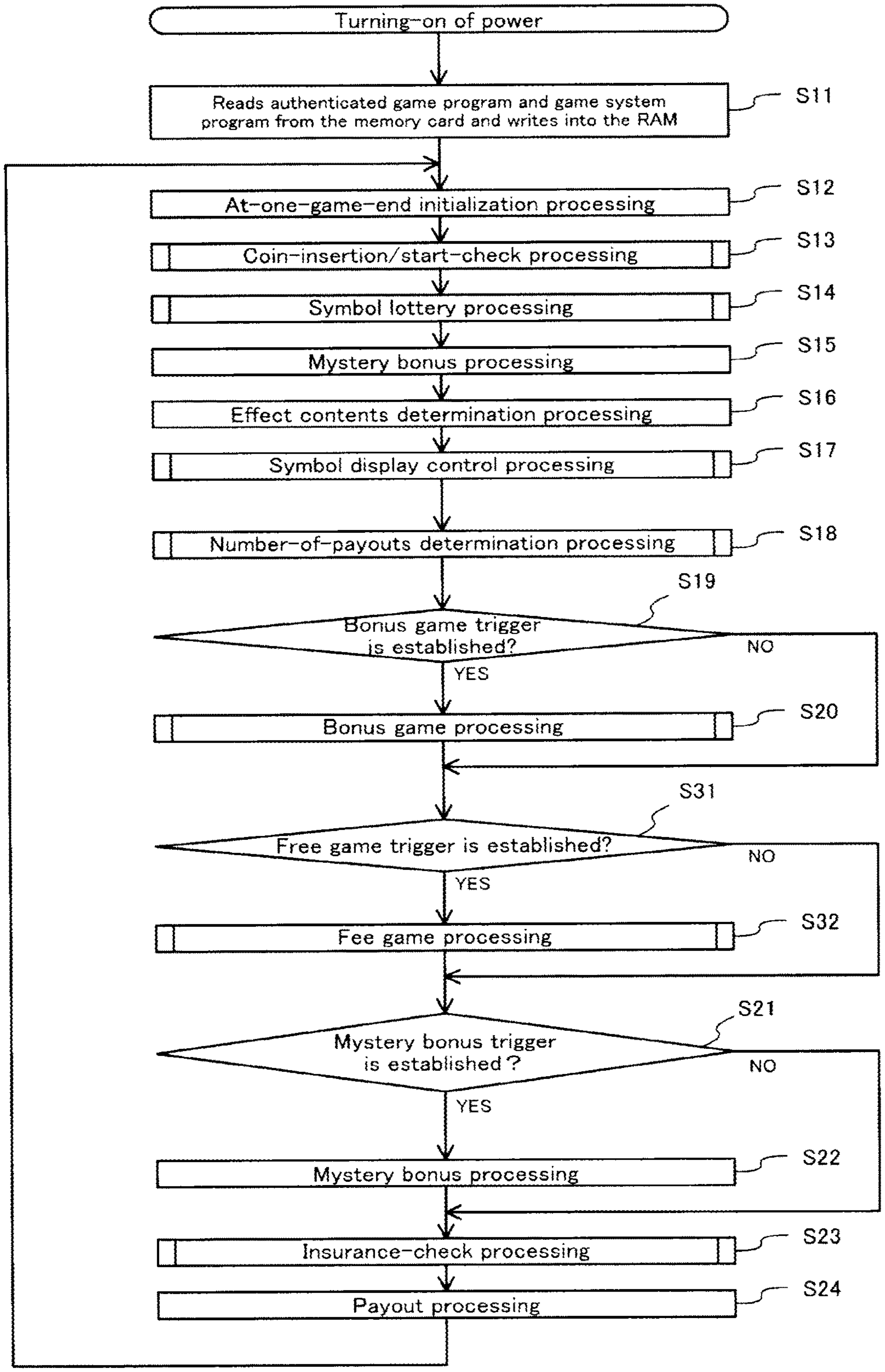
FIG. 8 is a flowchart showing a subroutine of main control processing of the gaming machine according to the embodiment of the present invention.

First, with reference to FIG. 8, main control processing is described.

FIG. 8 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 9 (step S13). In the processing, input from the BET switch and the spin switch is checked.

The main CPU 71 then conducts symbol lottery processing which is described later with reference to FIG. 12 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 13 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 conducts number-of-payouts determination processing which is described later with reference to FIG. 14 (step S18). In the processing, the number of payouts is determined based on the combination of symbols displayed along one of the winning lines, and is stored into a number-of-payouts counter provided in the RAM 73.

Next, the main CPU 71 determines whether or not bonus game trigger has been established (step S19). When the main CPU 71 determines that a bonus game trigger has been established, the main CPU 71 conducts bonus game processing to be described later with reference to FIG. 16 (step S20).

Next, subsequent to the processing in step S20 or when the main CPU 71 determines that a bonus game trigger has not been established in step S19, the main CPU 71 determines whether or not a free game trigger has been established (step S31). When the main CPU 71 determines that the free game trigger has been established, the main CPU 71 conducts bonus game processing shown in FIG. 23 to be described later (step S32).

Next, subsequent to the processing in step S32 or when the main CPU 71 determines that the free game trigger has not been established in step S31, the main CPU 71 determines whether or not a mystery bonus trigger has been established (step S21). When determining that the mystery bonus trigger has been established, the main CPU 71 conducts the mystery bonus processing (step S22). In the processing, the number of payouts (e.g. 300) being set for the mystery bonus is stored into the number-of-payouts storage area provided in the RAM 73.

After the processing of step S22 or when determining in step S21 that the mystery bonus trigger has not been established, the main CPU 71 conducts insurance-check processing which is described later with reference to FIG. 15 (step S23). In the processing, whether or not to conduct payout by the insurance is checked.

The main CPU 71 conducts payout processing (step S24). The main CPU 71 adds the value stored in the number-of-payouts counter to a number-of-credits counter provided in the RAM 73. It is to be noted that operations of the hopper 113 may be controlled based on input from the CASHOUT switch 33S, and coins of the number corresponding to the value stored in the number-of-payouts counter may be discharged from the coin payout exit 15A. Further, operations of the ticket printer 171 may be controlled and a ticket with a barcode may be issued on which a value stored in the number-of-payouts counter is recorded. After the processing has been conducted, the processing is shifted to step S12.

<Coin-Insertion/Start-Check Processing>

Figure 9:
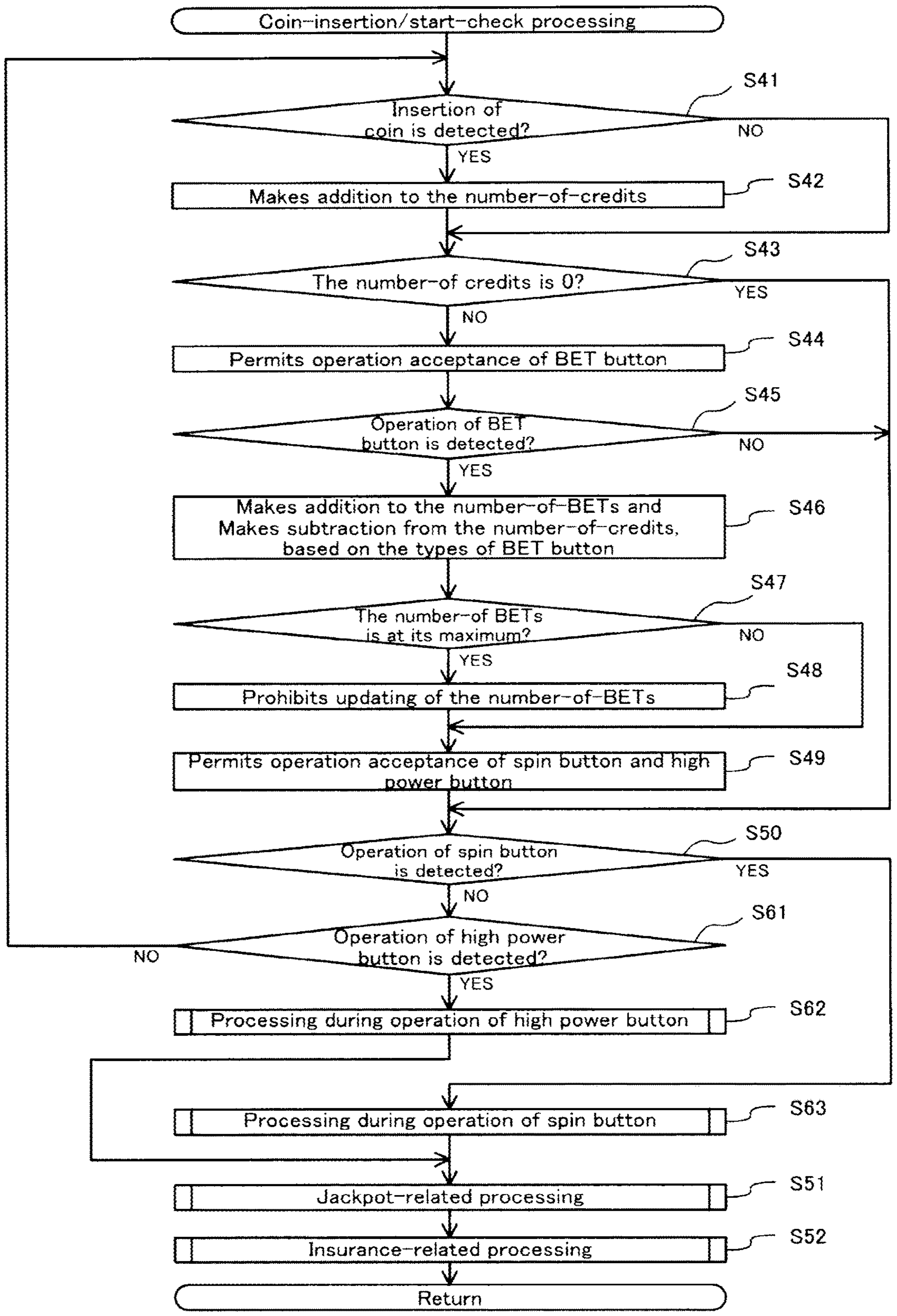
FIG. 9 is a flowchart showing a subroutine of coin insertion/start check of the gaming machine according to the embodiment of the present invention.

Next, with reference to FIG. 9, coin-insertion/start-check processing is described. FIG. 9 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a number-of-BETs counter provided in the RAM 73 and makes a subtraction from the number-of-credits counter, based on the type of the BET button (step S46).

The main CPU 71 then determines whether or not the number-of-BETs counter is at its maximum (step S47). When the main CPU 71 determines that the number-of-BETs counter is at its maximum, the main CPU 71 prohibits updating of the number-of-BETs counter (step S48). After step S48 or when determining in step S47 that the number-of-BETs counter is not at its maximum, the main CPU 71 permits operation acceptance of the spin button (step S49).

After step S49 or when determining in step S45 that the operation of any of the BET buttons has not been detected, or when determining in step S43 that the number-of-credits counter is zero, the main CPU 71 determines whether or not operation of the spin button has been detected (step S50). When the main CPU 71 determines that the operation of the spin button has not been detected, the main CPU 71 determines whether or not operation of a high power button has been detected (step S61). When the main CPU 71 determines that the operation of the high power button has not been detected, the routine reverts to step S41.

When the main CPU 71 determines that operation of the high power button 38 has been detected, the main CPU 71 invokes and executes a subroutine of the processing to be performed at the time of the operation of the high power button, shown in FIG. 20 to be described later (step S62).

When the main CPU 71 determines that the operation of the spin button 31 has been detected in the determination processing in step S50 described above, the main CPU 71 invokes and executes a subroutine of processing to be performed at the time of the operation of the spin button, shown in FIG. 21 to be described later (step S63).

Next, after the main CPU 71 has executed the processing in step S62 or S63 described above, the main CPU 71 conducts jackpot-related processing which is described with reference to FIG. 10 (step S51). In the processing, the amount to be accumulated to the amount of jackpot is calculated, and the amount is transmitted to the external control device 200.

Next, the main CPU 71 conducts insurance-related processing which is described later with reference to FIG. 11 (step S52). In the processing, counting of the number of games is conducted which triggers a payout by the insurance. After the processing has been conducted, the coin-insertion/start-check processing is completed.

<Jackpot-Related Processing>

Figure 10:
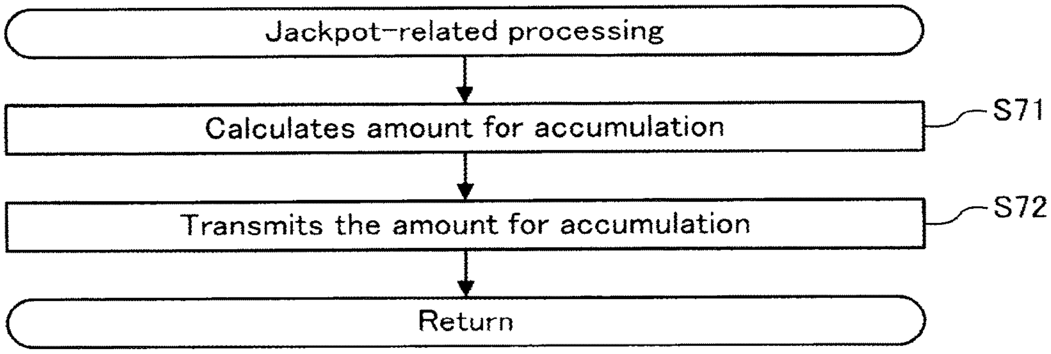
FIG. 10 is a flowchart showing a subroutine of jackpot-related processing of the gaming machine according to the embodiment of the present invention.

Now, with reference to FIG. 10, the jackpot-related processing is described.

FIG. 10 is a view illustrating a flowchart of the jackpot-related processing for the gaming machine according to the embodiment of the present invention.

First, the main CPU 71 calculates the amount for accumulation (step S71). The main CPU 71 obtains the product of the value of the number-of-BETs counter and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 11:
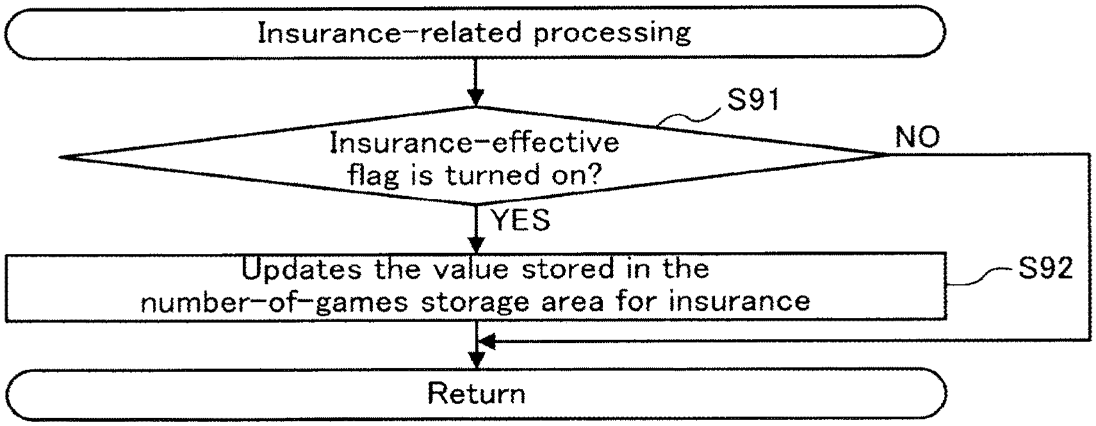
FIG. 11 is a flowchart showing a subroutine of insurance-related processing of the gaming machine according to the embodiment of the present invention.

Next, with reference to FIG. 11, the insurance-related processing is described.

FIG. 11 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 16.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a number-of-games counter for insurance provided in the RAM 73 (step S92). The number-of-games counter for insurance is a counter for managing the number of games up to the time of the payout by the insurance. In the processing of step S92, the main CPU 71 adds one to the number-of-games counter for insurance. After the processing has been conducted, the insurance-related processing is completed.

<Symbol Lottery Processing>

Figure 12:
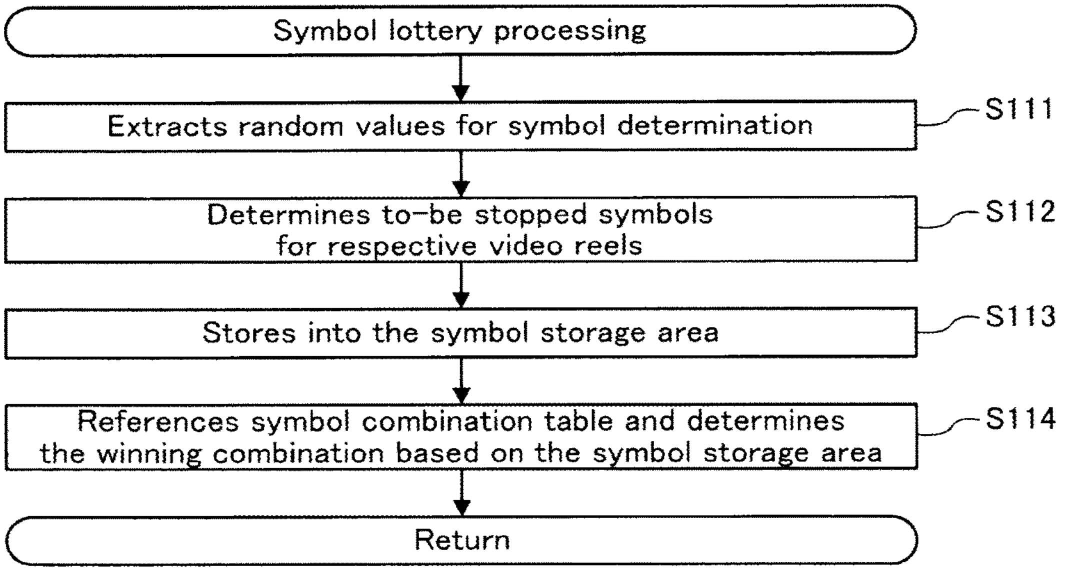
FIG. 12 is a flowchart showing a subroutine of symbol lottery processing of the gaming machine according to the embodiment of the present invention.

Next, with reference to FIG. 12, the symbol lottery processing is described.

FIG. 12 is a view illustrating a flowchart of the symbol lottery processing for the gaming machine according to the embodiment of the present invention.

First, the main CPU 71 extracts random values for symbol determination (step S111). Next, the main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

Next, the main CPU 71 then stores the determined to-be stopped symbols for the respective video reels 3 into a symbol storage area provided in the RAM 73 (step S113). Next, the main CPU 71 references the number-of-payouts determination table (FIG. 7) and determines a winning combination based on the symbol storage area (step S114). The main CPU 71 determines the winning combination based on the combination of symbols to be displayed along the winning line by the respective video reels 3 and the number-of-payouts determination table. After the processing has been conducted, the symbol lottery processing is completed.

<Symbol Display Control Processing>

Figure 13:
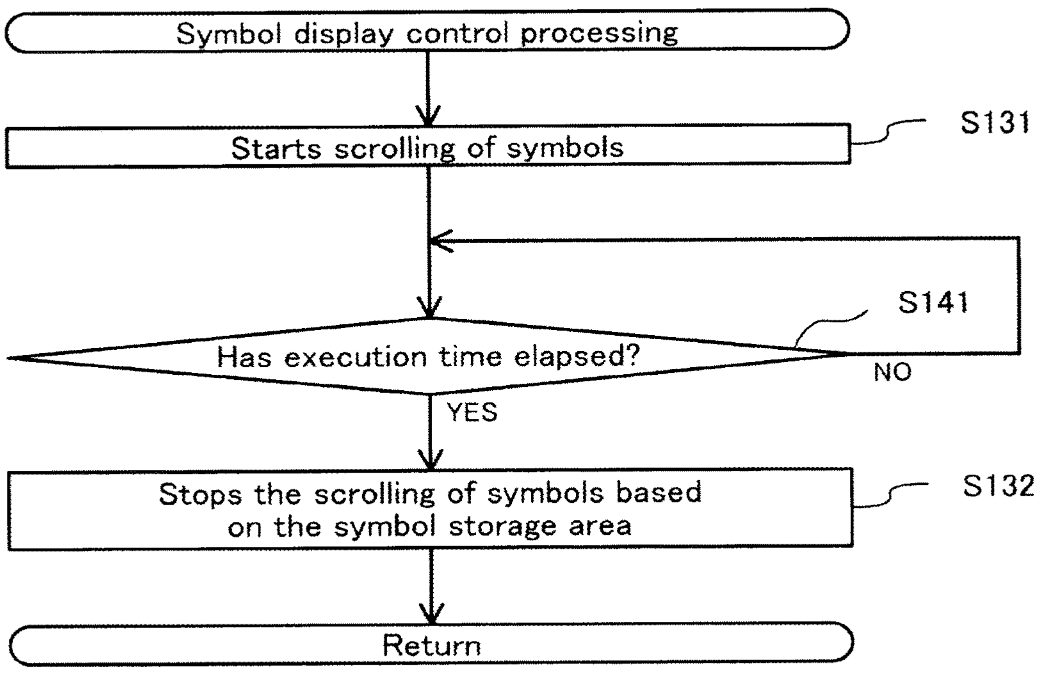
FIG. 13 is a flowchart showing a subroutine of symbol display control processing of the gaming machine according to the embodiment of the present invention.

Next, with reference to FIG. 13, the symbol display control processing is described. FIG. 13 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131).

Next, the main CPU 71 determines whether or not execution time of unitary game has elapsed after scroll-display of symbol arrays has been started (step S141). When the main CPU 71 determines that the execution time of unitary game has not elapsed yet, the main CPU 71 causes the routine to revert to step S141.

When the main CPU 71 determines that the execution time of unitary game has elapsed in the determination processing in step S141, the main CPU 71 then stops the scrolling of the symbol arrays of the respective video reels 3, based on the aforementioned symbol storage area (step S132). After the processing has been conducted, the symbol display control processing is completed.

The execution time of unitary game described above is determined as a first time interval or a second time interval by means of processing of determining execution time of unitary game in FIG. 22 to be described later. The first time interval is a normal execution time or a basic execution time of unitary game. It is preferable that the second time interval is shorter than the first time interval. For example, it is preferable that the second time interval is half of the first time interval.

For example, when a non-high power state is established, the first time interval is selected as the execution time of unitary game. When the first time interval has elapsed after scroll-display of symbol arrays has been started, scrolling of symbol arrays is stopped and then the unitary game completes. When a high power state is established, the second time interval is selected as the execution of unitary game. When the second time interval has elapsed after scroll-display of symbol arrays has been started, scrolling of symbol arrays is stopped and then the unitary game completes. As described above, it is preferable that the second time interval is shorter than the first time interval. When the high power state is established, the unitary game can be completed within a short period of time and then the number of times to be able to execute unitary game can be increased. By increasing the number of times to be able to execute unitary game, the number of coins a day to be inserted into gaming machines can be increased and profits can be given to gaming facility such as casino.

<Number-of-Payouts Determination Processing>

Next, with reference to FIG. 14, the number-of-payouts determination processing is described.

FIG. 14 is a view illustrating a flowchart of the number-of-payouts determination processing for the gaming machine according to the embodiment of the present invention.

First, The main CPU 71 determines whether or not the winning combination is the jackpot (step S151). When the main CPU 71 determines that the winning combination is not the jackpot, the main CPU 71 determines whether or not a game state is a bonus game state (step S161). When the main CPU 71 determines that the game state is the bonus game state, the main CPU 71 determines whether or not a high power state is established (step S162). Whether or not the high power state or the non-high power state is established can be determined according to a value of a flag stored in a RAM 73 of a motherboard 70.

When the main CPU 71 determines that the high power state is established, the main CPU 71 determines a payment (the payout number of coins) to be made when the high power state is established, according to a winning combination (step S163). When the main CPU 71 determines that the high power state is not established, the main CPU 71 determines a payment (the payout number of coins) to be made when a bonus game state is established, according to a winning combination (step S164).

When the main CPU 71 determines that a game state is not a bonus game state in the determination processing in step S161, the main CPU 71 determines a payment (the payout number of coins) to be made when a basic game state is established, according to a winning combination (step S152). For example, when the winning combination is "BELL," 8 is determined as the number of payouts (see FIG. 7). When a losing is established, 0 is determined as the number of payouts.

In a ROM 72 of a motherboard 70, data of correlation between winning combinations and payments is stored in advance according to a game state such as a basic game state or a bonus game state or a variety of states such as a high power state. In the processing operations of step S163, step S164, and step S152, a payment can be determined by reading out data of this correlation from the ROM 72. A payment to be made when the game state is the bonus game state or a payment to be made when the high power state is established is set to be higher than that in the basic game state. By doing this, a payout rate in the bonus game state or high power state can be set to be higher than that in a non-high power state, and the profits given to a player is increased to be thereby able to attract the player to the game.

It is preferable that the payment to be made when the game state is the bonus game state or the payment to be made when the high power state is established is determined to become more as a basic BET number, an additional BET number, or a total BET number obtained by adding the basic BET number and additional BET number to each other increases. By doing this, a motivation of starting unitary game with many more BET numbers, the profits in gaming facility can be ensured. Higher profits can be given to a player by increasing a payment according to the basic BET number, the additional BET number, or the total BET number.

The number of times of high power button operation made when the high power button 38 has been operated by a player is updated in the processing of step S2023 of FIG. 20 to be described later. A payment to be made when the high power state is established may be increased, as the number of times of high power button operation increases. In a case where the number of times of high power button operation is large, the total BET number that has been betted so far is also large. In such a case, the profits given to a player is increased, whereby more profits are given to a player who has a large total BET number to be thereby able to attract the player.

After the main CPU 71 has executed the processing in step S163, step S164, or step S152 described above, the main CPU 71 stores the determined number of payouts in a number-of-payouts storage region (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts counter (step S156). After the processing has been conducted, the number-of-payouts determination processing is completed.

<Insurance-Check Processing>

Figure 15:
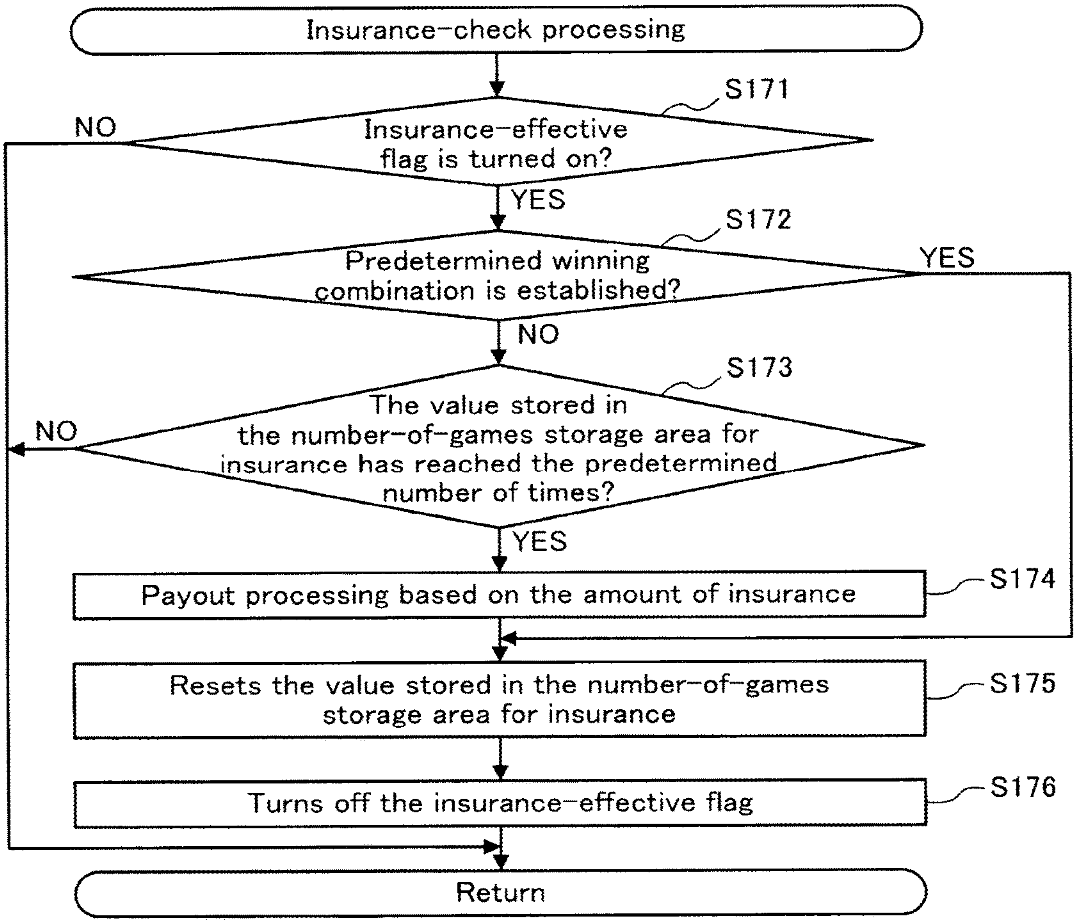
FIG. 15 is a flowchart showing a subroutine of insurance check processing of the gaming machine according to the embodiment of the present invention.

Next, with reference to FIG. 15, the insurance-check processing is described.

FIG. 15 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "free game trigger", "jackpot" and "mystery bonus" are subjects of the predetermined winning combination.

When the main CPU 71 determines that the predetermined winning combination has not been established, the main CPU 71 determines whether or not the number-of-games counter for insurance has reached a predetermined number of times (e.g. 300) (step S173). When the main CPU 71 determines that the number-of-games counter for insurance has not reached the predetermined number of times, the main CPU 71 completes the insurance-check processing.

When the main CPU 71 determines that the number-of-games counter for insurance has reached the predetermined number of times, the main CPU 71 conducts payout processing based on the amount of insurance (step S174). The main CPU 71 adds an amount (e.g. 200) previously set as the amount of insurance to the number-of-credits counter.

After step S174 or when determining in step S172 that the predetermined winning combination has been established, the main CPU 71 resets the number-of-games counter for insurance (step S175). Next, the main CPU 71 turns the insurance-effective flag off (step S176). After the processing has been conducted, the insurance-check processing is completed.

<Bonus Game Processing>

Figure 16:
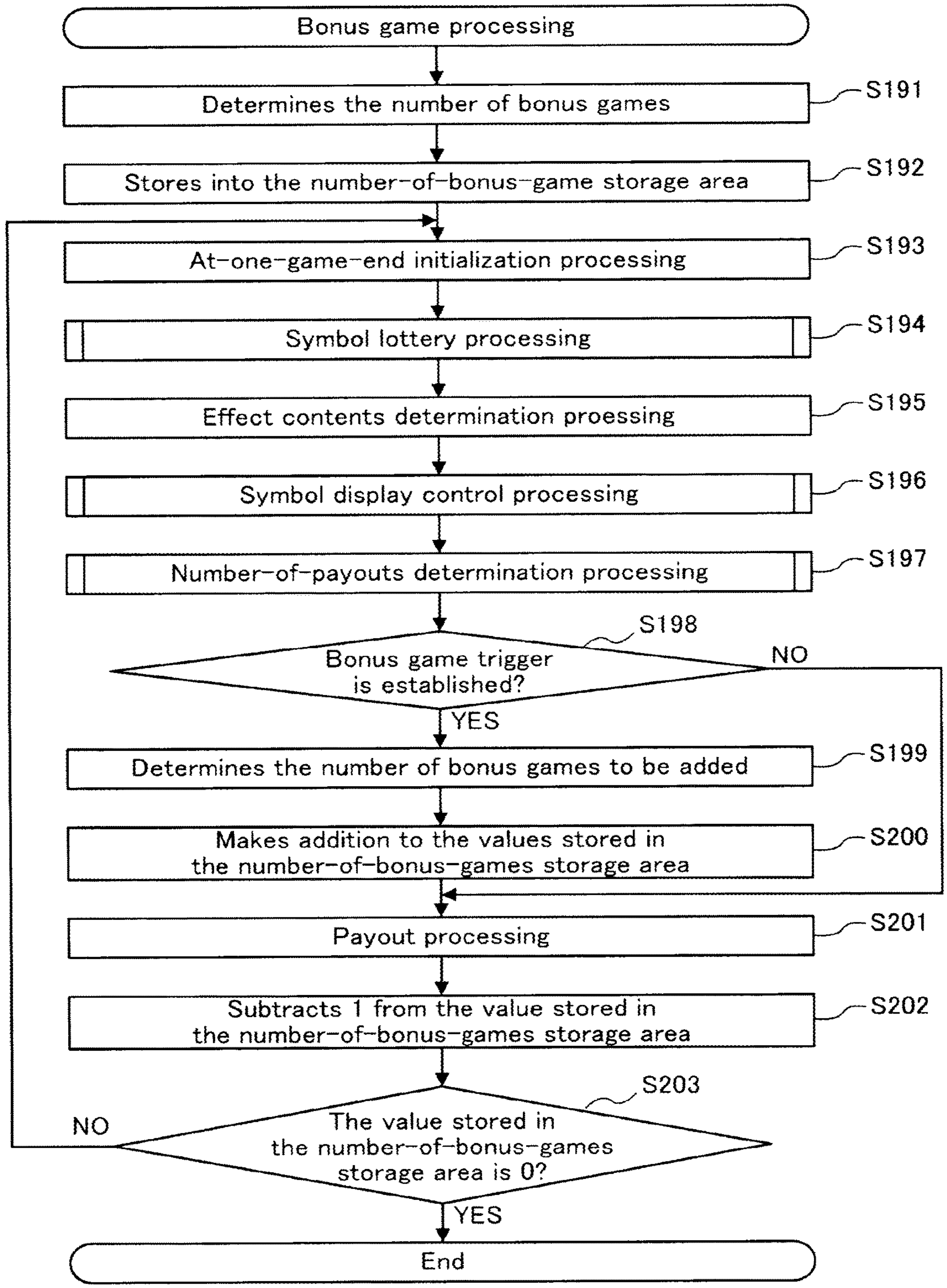
FIG. 16 is a flowchart showing a subroutine of bonus game processing of the gaming machine according to the embodiment of the present invention.

Next, with reference to FIG. 16, the bonus game processing is described.

FIG. 16 is a view illustrating a flowchart of the bonus game processing for the gaming machine according to the embodiment of the present invention.

First, the main CPU 71 determines the number of the bonus games (step S191). The main CPU 71 extracts random number values for determining the number of bonus games and then determines any of a plurality of playable times of bonus game such as "50", "70", and "100", for example, by means of lottery.

Next, the main CPU 71 stores the determined number of bonus games in a number-of-bonus-games storage region which is provided in the RAM 73 (step S192).

Next, like the processing of step S12 described with reference to FIG. 8, the main CPU 71 conducts at-one-game-end initialization processing (step S193). Next, the main CPU 71 then conducts symbol lottery processing described with reference to FIG. 12 (step S194). Next, the main CPU 71 conducts effect content determination processing in a manner similar to that in step S16 described with reference to FIG. 8 (step S195). Next, the main CPU 71 then conducts symbol display control processing described with reference to FIG. 13 (step S196). The main CPU 71 then conducts number-of-payouts determination processing described with reference to FIG. 14 (step S197).

Next, the main CPU 71 determines whether or not a bonus game trigger has been established (step S198). When the main CPU 71 determines that the bonus game trigger has been established, the main CPU 71 determines the number of bonus games to be added (step S199). The number of bonus games is determined in a manner similar to that in the processing of step 191 describe previously. The main CPU 71 then adds the determined number of bonus games to a value stored in a number-of-bonus game storage region (step S200).

Subsequent to the processing in step S200 or when the main CPU 71 determines that the bonus game trigger has not been established in step S198, the main CPU 71 conducts payout processing (step S201). In this payout processing, the main CPU 71 adds the value stored in the number-of-payouts storage region in the number-of-payouts determination processing in step S197 described previously to a value stored in a number-of-bonus-payouts storage region. The number-of-bonus-payouts storage region is directed to a region for storing a total number of payouts determined in bonus game.

When bonus game processing completes, the main CPU 71 adds the value stored in the number-of-bonus-payouts storage region to a value stored in a number-of-payouts number provided in the RAM 73 in the payout processing of step S24 described with reference to FIG. 8. Namely, a total number of payouts determined in bonus game are collectively paid out. Coins may be ejected from the coin payout exit 15A or barcode-attached tickets may be issued.

Next, the main CPU 71 subtracts 1 from the value stored in the number-of-bonus games storage region (step S202). The main CPU 71 then determines whether or not the value stored in the number-of-bonus-games storage region is 0 (step S203). When the main CPU 71 determines that the value stored in the number-of-bonus-games storage region is not 0, the routine migrates to step S193. When the CPU 71 determines that the value stored in the number-of-bonus games storage region is 0, bonus game processing is completed. After the bonus game processing has been completed, the routine migrates to step S21 described with reference to FIG. 8.

<Insurance Selection Processing>

Figure 17:
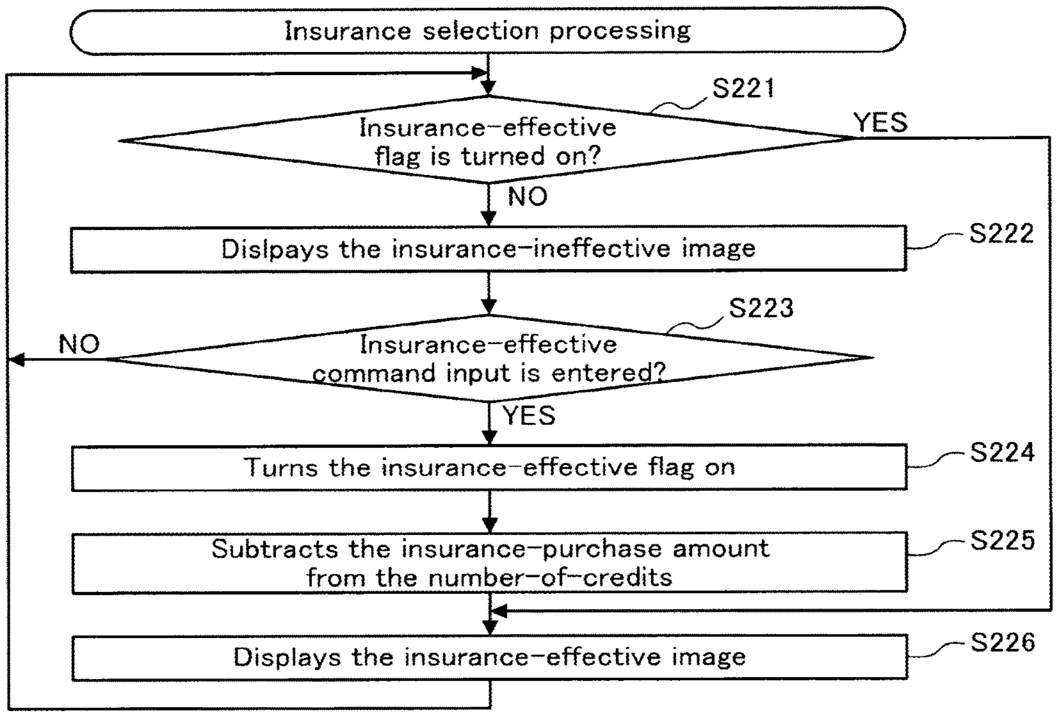
FIG. 17 is a flowchart showing a subroutine of insurance selection processing of the gaming machine according to the embodiment of the present invention.

Next, with reference to FIG. 17, the insurance selection processing is described.

FIG. 17 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the number-of-credits counter (step S225). In the present embodiment, an amount corresponding to, for example, one dollar is subtracted from the number-of-credits counter. After step S225 or when determining in step S221 that the insurance-effective flag is turned on, the main CPU 71 displays the insurance-effective image (step S226). As the insurance-effective image, for example, an image showing "INSURANCE CONTINUED WIN 200 CREDIT" is displayed. This image is an image informing the player that the insurance is effective, and that the value of "200" is to be added to the number-of-credits counter when the insurance condition is satisfied. After the processing has been conducted, the processing is shifted to step S221.

<<Processing at the Time of High Power Button Operation>>

FIG. 20 is a flowchart showing a subroutine of the processing to be executed when a high power button 38 has been operated by a player.

First, the main CPU 71 executes additional bet processing (step S2011). This processing is directed to the processing of determining an additional BET number which has already been determined to start a unitary game at that time point and then determining a total BET number. For example, a value obtained by adding 5 to a basic BET number is defined as the total BET number.

Next, the main CPU 71 invokes and executes a subroutine of execution time determination processing of unitary game, shown in FIG. 22 to be described later (step S2013). By means of this processing, an execution time (a consumption time) for one time of unitary game can be determined as a first time interval or a second time interval.

Next, the main CPU 71 then invokes and executes a subroutine of execution time determination processing of unitary game, shown in FIG. 22 to be described later (step S2015). For example, when the high power state is established, the value of the flag is set to 1 or when a non-high power state is established, the value of the flag is set to 0. The value of the flag is stored in a RAM 73 of a motherboard 70. By means of this processing, it is possible to determine whether the high power state or the non-high power is established.

Figure 19A:
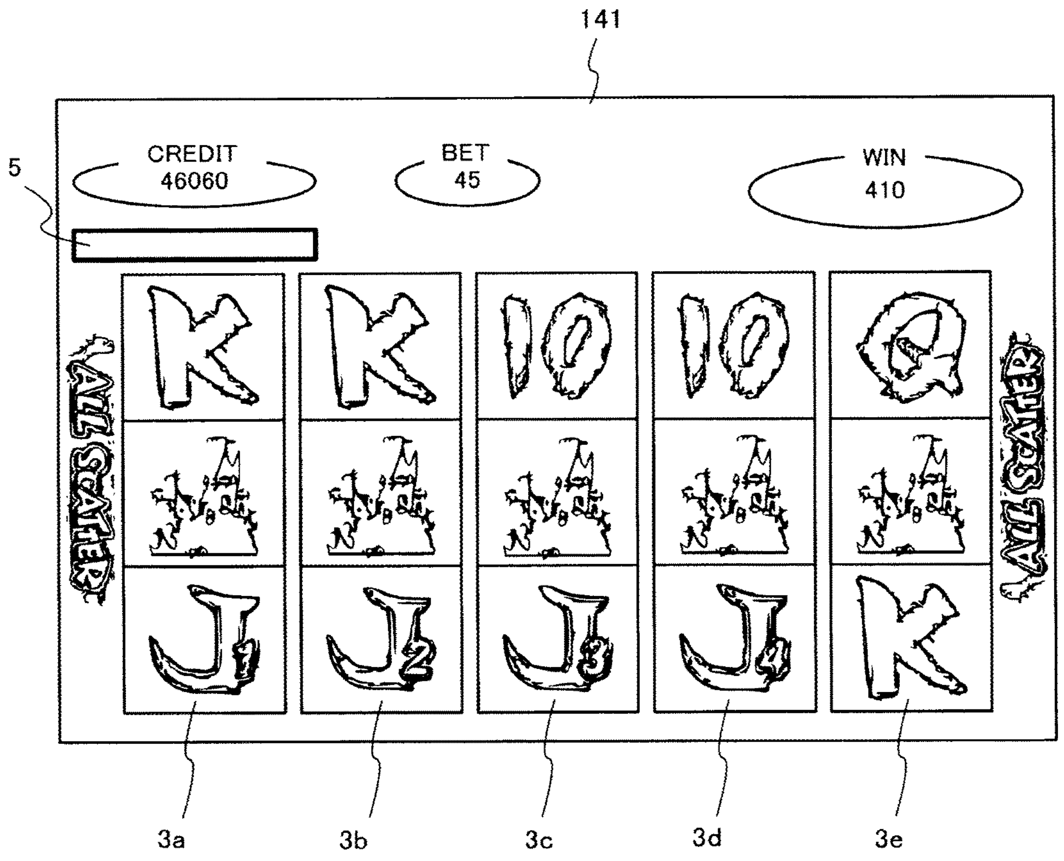
FIG. 19A and FIG. 19B are views showing an example of images to be displayed on a lower image display panel 141.
Figure 19B:
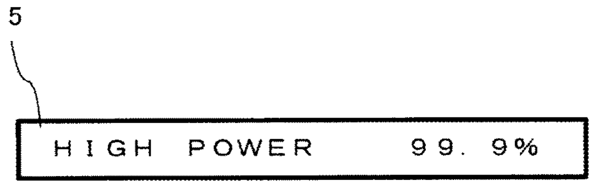

Next, The main CPU 71 then displays information indicating that the high power state has been established, on a lower image display panel 141 (step S2017). For example, as shown in FIG. 19A, a high power state display region 5 is provided between a "CREDIT" field and a video reel 3*a*, and when the high power state has been established, a high power state display region is displayed in a visually recognizable manner, for example, by yellow. A "HIGH POWER" message indicating that the high power state has been established is displayed in a high power state display region 5 (FIG. 19B). As described above, the high power button 38 is operated by a player, whereby the non-high power state migrates to the high power state. The processing in step S2017 is executed, thereby enabling the player to visually recognize that the non-high power state has migrated to the high power state.

Next, The main CPU 71 then generates a high power state sound indicating that the high power state has been established, from a speaker 112 (step S2019). The high power state sound is generated, thereby enabling a player to audibly recognize that the non-high power state has migrated to the high power state.

Next, The main CPU 71 then displays the number of payouts in the high power state display region 5 of the lower image display panel 141 (step S2021). For example, in a case where a player has started a unitary game by operating the high power button 38, a payout rate "99.9%" is displayed (FIG. 19B). The non-high power state migrates to the high power state, thereby enabling the player to visually recognize that the payout rate has increased.

Next, the main CPU 71 updates the number of times of high power button operation indicating that the high power button 38 has been operated by the user (step S2023) and then completes this subroutine.

<<Processing at the Time of Spin Button Operation>>

Figure 21:
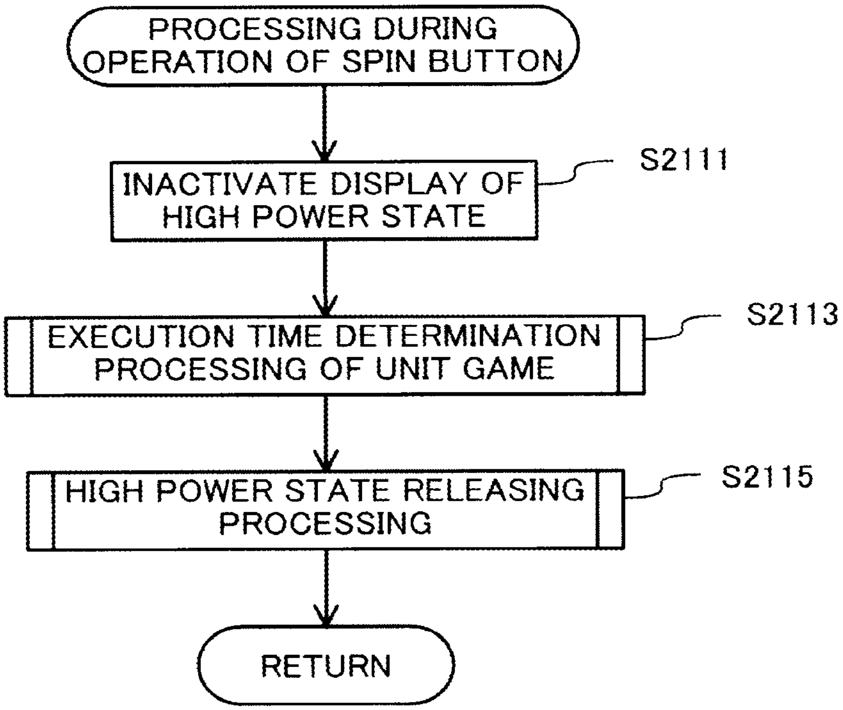
FIG. 21 is a flowchart showing a subroutine of processing to be executed when a spin button 31 is operated by an operator.

FIG. 21 is a flowchart showing a subroutine of processing to be executed when a spin button 31 has been operated by a player.

First, the main CPU 71 clears information indicating that a high power state has been established, from a lower image display panel 141 (step S2111). For example, the main CPU 71 clears a high power state display region 5 shown in FIG. 19A. This enables a player to visually recognize that the high power state has migrated to a non-high power state. In place of clearing the information indicating that the high power has been established, the information indicating that the high-power state is going on may be displayed in a hardly visually recognizable manner. For example, the high power state display region 5 shown in FIG. 19A may be displayed by a dark color such as grey.

Next, the main CPU 71 invokes and executes a subroutine of execution time determination processing of unitary game, shown in FIG. 22 to be described later (step S2113). By means of this processing, an execution time (a consumption time) for one time of unitary game can be determined as a first time interval or a second time interval.

Next, The main CPU 71 then invokes and executes a subroutine of high power state releasing processing shown in FIG. 24 to be described later (step S2115). This processing is intended to execute a variety of processing operations to be made when the high power state has been released.

<<Execution Time Determination Processing of Unitary game>>

FIG. 22 is a flowchart showing a subroutine of execution time determination processing of unitary game.

First, the main CPU 71 determines whether a game state is a free game state or a bonus game state (step S2211). When the main CPU 71 determines that the game state is the free game state or the bonus game state, the main CPU 71 determines whether or not execution time of unitary game can be changed as a result of symbol lottery processing in FIG. 12 (step S2213).

For example, it is preferable that when a specific bonus has won, the execution time of unitary game cannot be changed or when another bonus or a predetermined small winning combination has won, the execution time of unitary game is not changed, so that the unitary game is executed until a normal execution time (a first time interval to be described later) has elapsed. A player's sense of expectation can be enhanced by executing the unitary game for a sufficient period of time. When another bonus or a predetermined small winning combination has won, the number of times to be able to execute a unitary game can be increased by changing, specifically reducing the execution time of unitary game and the profits in gaming facility can be ensured by increasing a total BET number.

When the main CPU 71 determines that the execution time of unitary game can be changed a result of symbol lottery processing, the main CPU 71 determines whether or not the contents of effect is the one in which the execution time can be changes (step S2215). The effects herein referred to as are made of an effect in which the execution time can be changed and an effect in which the execution cannot be changed. A distinction between the effect in which the execution time can be changed and an effect in which the execution time cannot be changed may be predetermined according to a result of lottery corresponding to the effect or the contents of the effects.

The determination in step S2215 is intended to determine whether the effect is the one in which the execution time can be changed or the one in which it cannot be changed. The effect in which the execution time can be changed is the one to be selected and executed when a predetermined small winning combination has won, for example. Time required for unitary game can be reduced and then the number of times of unitary game can be increased by changing, for example, reducing the time during which an effect is executed. A total BET number can be increased and the profits in gaming facility can be ensured by increasing the number of times to be able to execute the unitary game.

The effect in which the execution time cannot be changed is directed to an effect to be selected and executed when a specific bonus has won, for example. A player's sense of expectation can be enhanced by executing the effect for a sufficient period of time.

When the main CPU 71 determines that the effect is not the one in which the execution time can be changed in the judgment processing of step S2215 described above, the main CPU 71 sets the execution time of unitary game to a first time interval (step S2217) and then completes this subroutine.

When the main CPU 71 determines that the game state is neither the free game state nor the bonus game state in the determination processing of step S2211 described above, when the main CPU 71 determines that the execution time of unitary game can be changed in the determination processing of step S2213, or when the CPU 71 determines that the contents of the effect is those in which the execution time can be changed, in the determination processing of step S2215, the main CPU 71 sets the execution time of unitary game to a second time interval (step S2219) and then completes this subroutine.

It is preferable that the second time interval is shorter than the first time interval. For example, it is preferable that the second time interval is half of the first time interval. The first time interval designates a normal execution time or a basic execution time of unitary game. When it is thus determined that the game state is neither the free game state nor the bonus game state, the execution of unitary game is set to the second time interval which is shorter than usual. Therefore, when the unitary game is in the basic game state, the execution time of the unitary game is always set to the second time interval. When the unitary game is thus in the basic game state and is established in a high power state, if the second time interval has elapsed, the unitary game can be completed. By doing this, time required for the unitary game can be reduced and then the number of times of the unitary game can be increased. A total BET number can be increased and then the profits in gaming facility can be ensured by increasing the number of times to be able to execute the unitary game.

<<Free Game Processing>>

FIG. 23 is a flowchart showing a subroutine of free game processing. This subroutine is invoked and executed in the processing of step S32 in FIG. 8 described above.

First, the main CPU 71 determines whether or not a high power state is established (step S2311). That is, the main CPU 71 determines whether or not the routine migrates to a free game and then the free game has been started in a state in which the high power state determined in a basic game has been established. As described later, the main CPU 71 releases the high power state and reverts to a non-high power state on the condition that the free game has been started.

When the main CPU 71 determines that the high power state is established in the determination processing of step S2311, the main CPU 71 determines the number of times of unitary game to be executed in free game at the number of execution times corresponding to the high power state (step S2313). When the main CPU 71 determines that the high power state is not established, the main CPU 71 determines the number of times of unitary game to be executed in a free game state at the number of execution times corresponding to the non-high power state (step S2315).

The number of execution times corresponding to the high power state is more than that corresponding to the non-high power state. A free game with its high payout rate can be executed by thus increasing the number of execution times in free game. That is, when a player has continuously played the unitary game while the high power state is established in basic game, the player can play a free game with its high payout rate. Alternatively, when a player has played the unitary game while the non-high power state is established in basic game, the player will play a free game with its low payout rate.

It is preferable to determine the number of execution times corresponding to the high power state as a basic BET number, a so called line BET number increases. The higher the degree of contribution to gaming facility by means of BET is, the higher a payout rate is, and then the players' profits can be enhanced. The number of execution times corresponding to the high power state may be defined to increase with an increase in an additional BET number or a total BET number obtained by adding a basic BET number and the additional BET number to each other, as well as the basic BET number. In this case also, the higher the degree of contribution to gaming facility by means of BET is, the higher the payout rate is, and then the players' profits can be enhanced. A motivation to bet more BET numbers to start a unitary game can be given to a player and then the profits in gaming facility can be ensured.

The number of execution times corresponding to the high power state may be determined according to the number of times of high power button operation. The number of times of high power button operation is updated in the processing of step S2023 in FIG. 20. In particular, the number of execution times corresponding to the high power state may be increased, as the number of high power button operation increases. In a case where the number of times of operating a high power button 38 is large, a total BET number having been betted so far is also large. In such a case, the payment given to a player is increased, whereby more profits are given to a player whose total BET number is large to be able to attract the player's interest.

When the main CPU 71 executes the processing in step S2313 or S2315, the main CPU 71 executes symbol lottery processing in a free game state (step S2317).

Next, the main CPU 71 determines the contents of an effect according to a result of the symbol lottery processing (step S2319).

Next, the main CPU 71 then invokes and executes a subroutine of symbol display control processing shown in FIG. 13 (step S2321).

Next, The main CPU 71 then determines whether or not a combination of symbols stopped corresponds to a predetermined winning combination (step S2323). When the main CPU 71 determines that the predetermined winning combination has been realized, the main CPU 71 invokes and executes the number-of-payouts determination processing shown in FIG. 14 (step S2325).

When the main CPU 71 determines that the predetermined winning combination is not realized in the determination processing of step S2323 or when the main CPU has executed the processing in step S2325, the main CPU 71 determines whether or not the number of execution times of unitary game has reached the number of times determined in the processing of step S2313 or S2315 (step S2327).

When the main CPU 71 determines that the number of execution times of unitary game has not reached the number of times determined in the processing of step S2313 or S2315, the main CPU 71 causes the routine to revert to step S2317 described above.

When the main CPU 71 determines that the number of execution times of unitary game has reached the number of times determined in the processing of step S2313 or S2315, this subroutine is completed.

<<High Power State Releasing Processing>>

Figure 24:
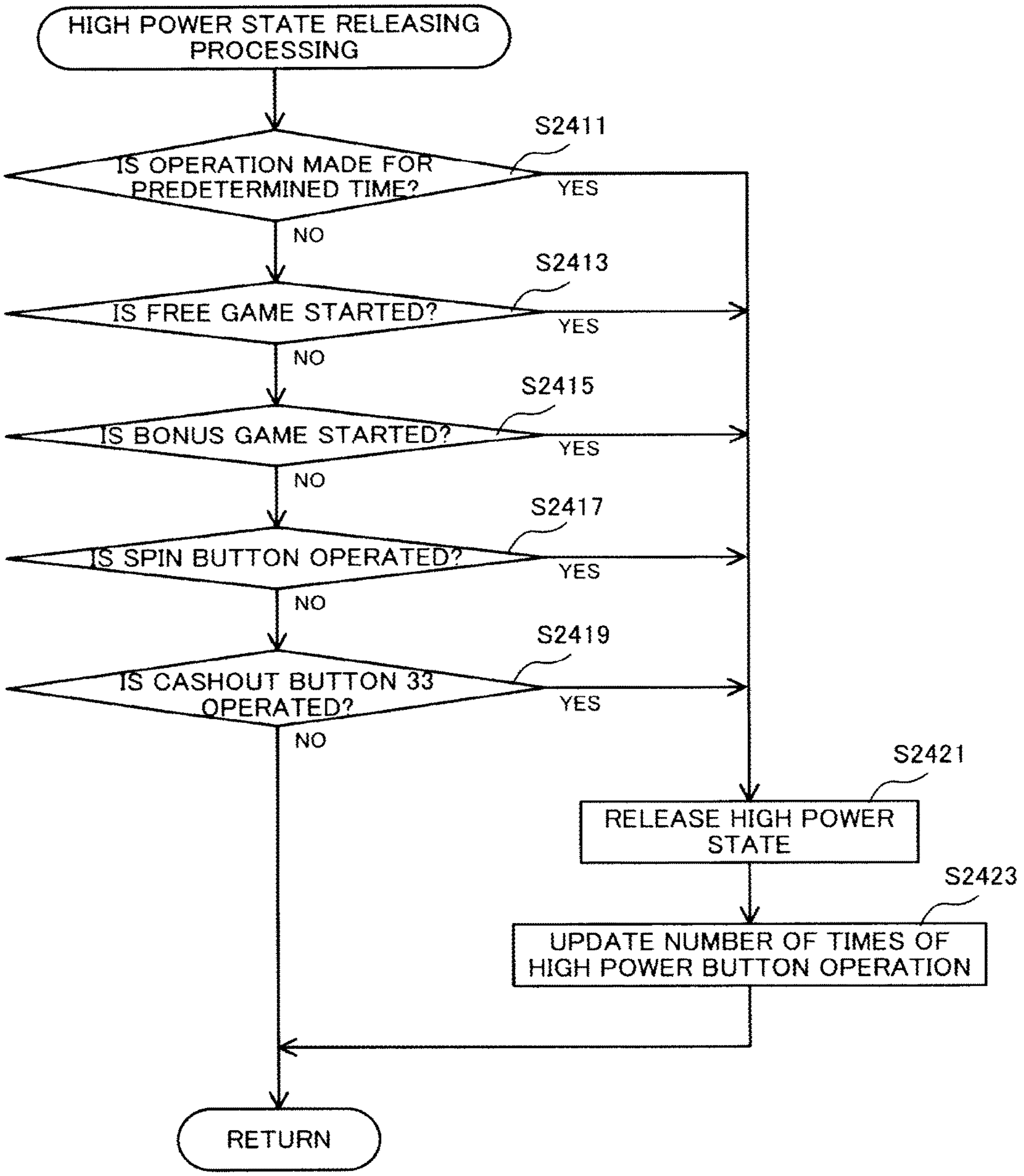
FIG. 24 is a flowchart showing a subroutine of high power state releasing processing.

FIG. 24 is a flowchart showing a subroutine of high power state releasing processing. This subroutine is invoked and executed in the processing of step S2115 in FIG. 21 described above.

First, the main CPU 71 determines whether or not time during which a gaming machine 1 is not operated by a player has exceeded a predetermined time (step S2411). In a case where the gaming machine 1 is not operated in excess of the predetermined time, there is a high possibility that a player stops a game and has left the gaming machine 1. In this case, since there is a possibility that the profits of the past player are unfairly given to another player, it is preferable to release the high power state.

When the main CPU 71 determines that the time during which the gaming machine 1 is not operated by a player does not exceed the predetermined time, the main CPU 71 determines whether or not a free game has been started (step S2413). When the free game has been started, the game with its high payout rate is executed. Therefore, it is preferable to release the high power state on the basis of the fact that an object of continuously executing a unitary game by establishing the high power state in basic game has been successfully achieved.

When the main CPU 71 determines that a free game state has not been started, the main CPU 71 determines whether or not a bonus game has been started (step S2415). When the bonus game has been started as well, the high with the payout rate is executed. Therefore, it is preferable to release the high power state on the basis of the fact that an object of continuously executing a unitary game by establishing the high power state in basic game has been successfully achieved.

When the main CPU 71 determines that the bonus game has not been started, the main CPU 71 determines whether or not a spin button 31 has been operated by a player in basic game (step S2417). When the spin button 31 has been operated by the player, there is a high possibility that the player has desired that the routine reverts to a non-high power state at the player's will. In this case, it is preferable to release the high power state at the player's will.

The processing in step S2417 is intended to determine whether or not the spin button 31 has been operated in one unitary game in basic game. However, it is also presupposed that the spin button 31 is operated by mistaken operation of a player. Therefore, it may be determined whether or not the spin button 31 has been operated in a plurality of consecutive times of executing unitary game in basic game, for example, in two continuous times of executing unitary game. By doing this, in a case where the player has mistakenly operated the spin button 31, the releasing of the high power state can be prevented.

When the main CPU 71 determines that the spin button 31 has not been operated by a player in basic game, the main CPU 71 determines whether or not a CASHOUT button 33 has been operated (step S2419). When the player has operated the CASHOUT button 33, there is a possibility that a player has stopped a game. In this case, there is a possibility that the profits of the past player are unfairly given to another player; and therefore, it is preferable to release the high power state.

When the main CPU 71 determines that the CASHOUT button 33 has not been operated, this subroutine is completed.

When the main CPU 71 determines that the time during which the gaming machine 1 is not operated by a player exceeds a predetermined time in the determination processing of step S2411 described above, when the main CPU 71 determines that a free game has been started in the determination processing of step S2413, when the CPU 71 determines that a bonus game has been started in the determination processing of step S2415, when the main CPU 71 determines that the spin button 31 has been operated in the judgment processing of step S2417, or when the CPU 71 determines that the CASHOUT button 33 has been operated in the judgment processing of step S2419, the CPU 71 released the high power state (step S2421), initializes the number of times of high power button operation (step S2423), and then, completes this subroutine. The high power state can be released by setting a value of a flag indicating the high power state or non-high power state to 0.

The determination processing of step S2417 described above was directed to the processing of releasing the high power state when the spin button 31 was operated by a player. By doing this, when the spin button 31 has been operated by the player, the high power state can be released immediately. However, when the spin button 31 has been operated by the player, the high power state may not be released immediately. For example, the high power button 38 has been operated at least one time in basic game, whereby the game with its high payout rate can be executed. In this case, after the determination processing in step S2417 described above has been eliminated, the high power state may be released when a free game has been started in the determination processing of step S2413 or when a bonus game has been started in the determination processing of step S2415. By doing this, the high power button 38 has been operated at least one time in basic game to be thereby able to execute the game with its high payout rate.

Second Embodiment

Figure 25:
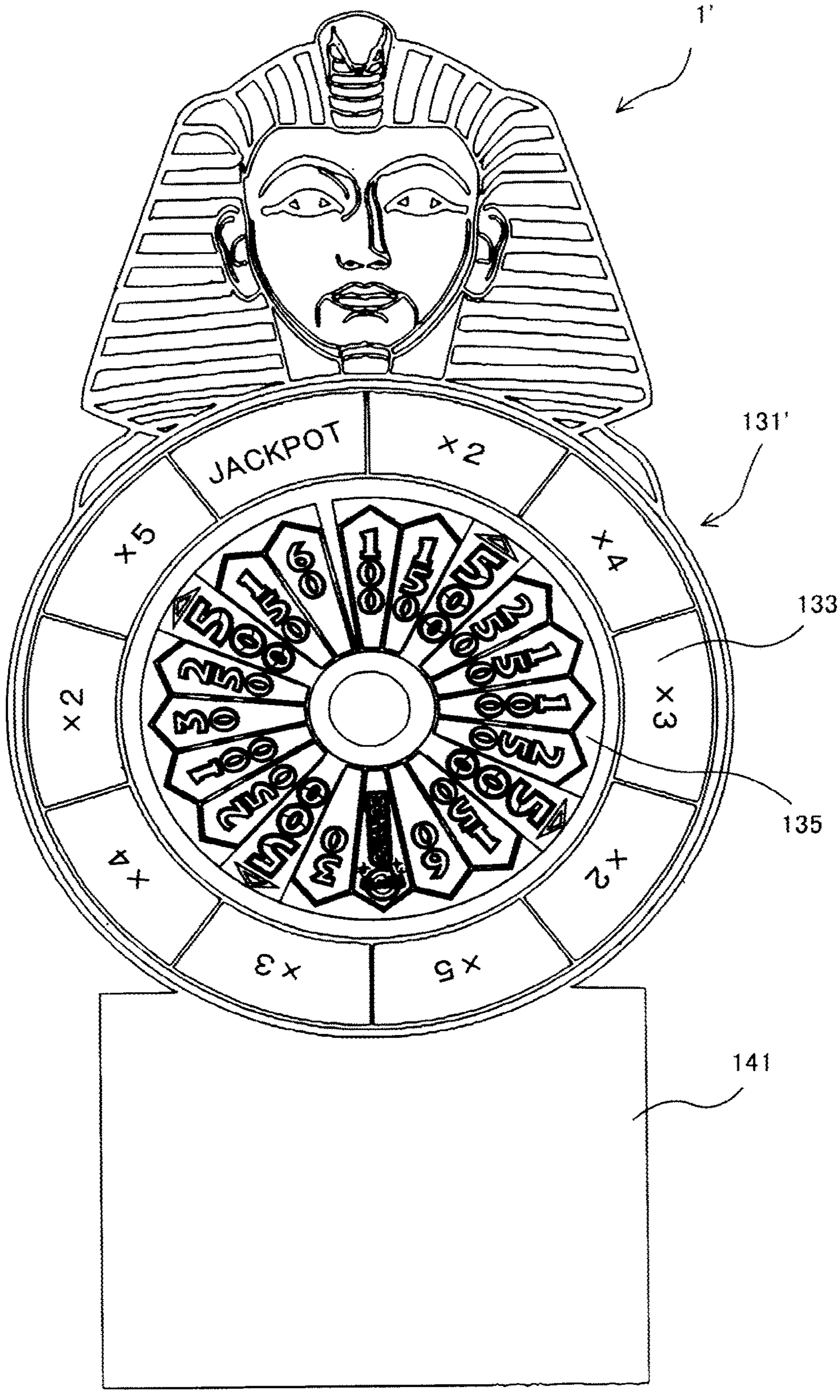
FIG. 25 is a front view showing a gaming machine 1' according to a second embodiment.

FIG. 25 is a front view showing a gaming machine 1' according to a second embodiment. The gaming machine 1' is the one in which the upper image display panel 131 of the gaming machine 1 according to the first embodiment is customized as an upper image display panel 131' according to the contents of game at the gaming machine F. The lower image display panel 141 is similar to the gaming machine 1 according to the first embodiment, and has been shown by assigning the same reference numerals thereto.

Except for a shape or construction of the upper image display panel 131', the gaming machine 1' according to the second embodiment has a construction and functions which are similar to those of the gaming machine 1 according to the first embodiment. Therefore, the gaming machine 1' according to the second embodiment also has the construction shown in FIG. 3 to FIG. 6 and FIG. 18 and a variety of processing operations shown in FIG. 7 to FIG. 17 and FIG. 20 to FIG. 24 are executed.

<<First Spin Bonus Game Processing>>

Figure 26:
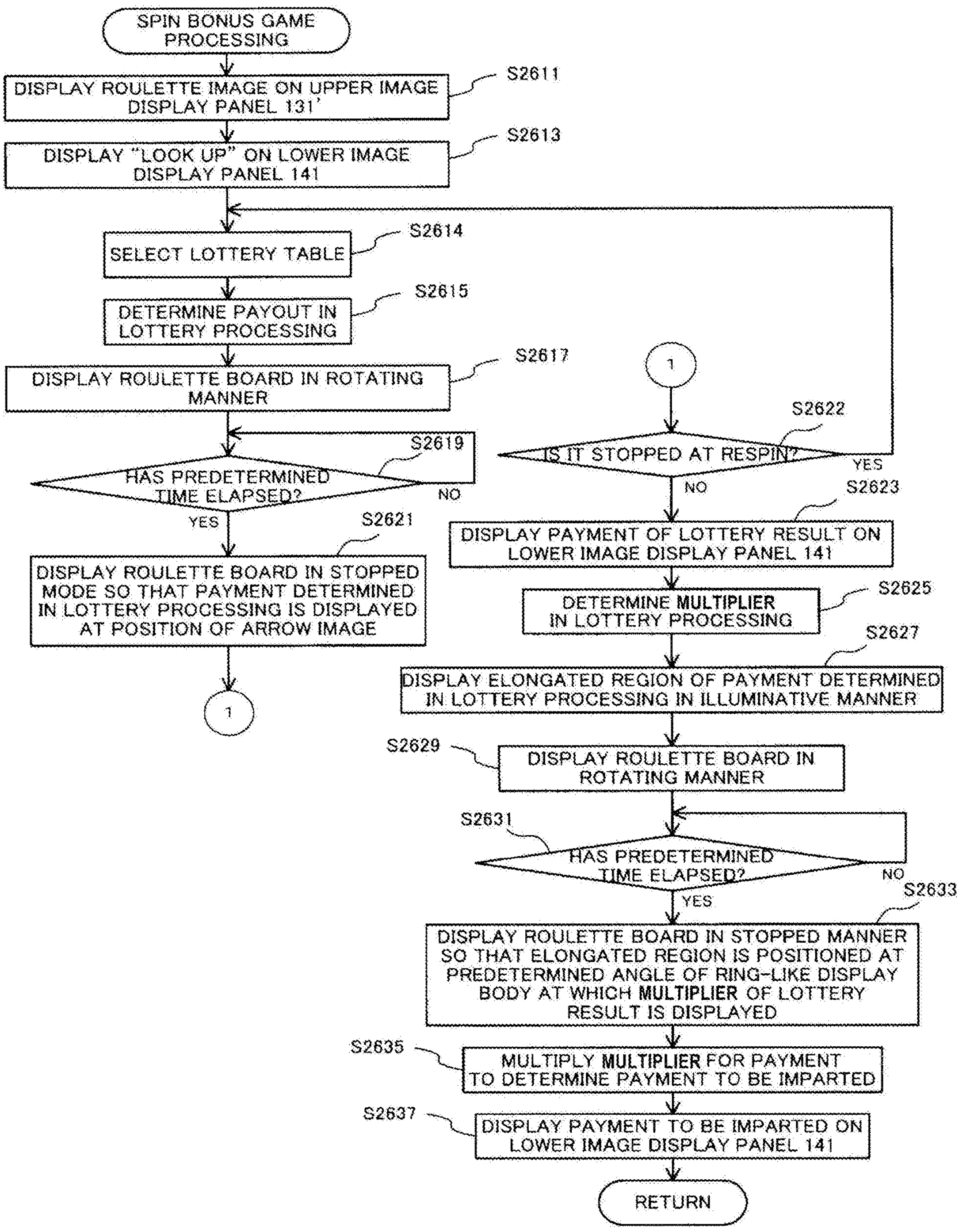
FIG. 26 is a flowchart showing a subroutine of first spin bonus game processing.

FIG. 26 is a flowchart showing a subroutine of first spin bonus game processing. This subroutine is invoked and executed in the processing of step S20 in FIG. 8.

Figure 27A:
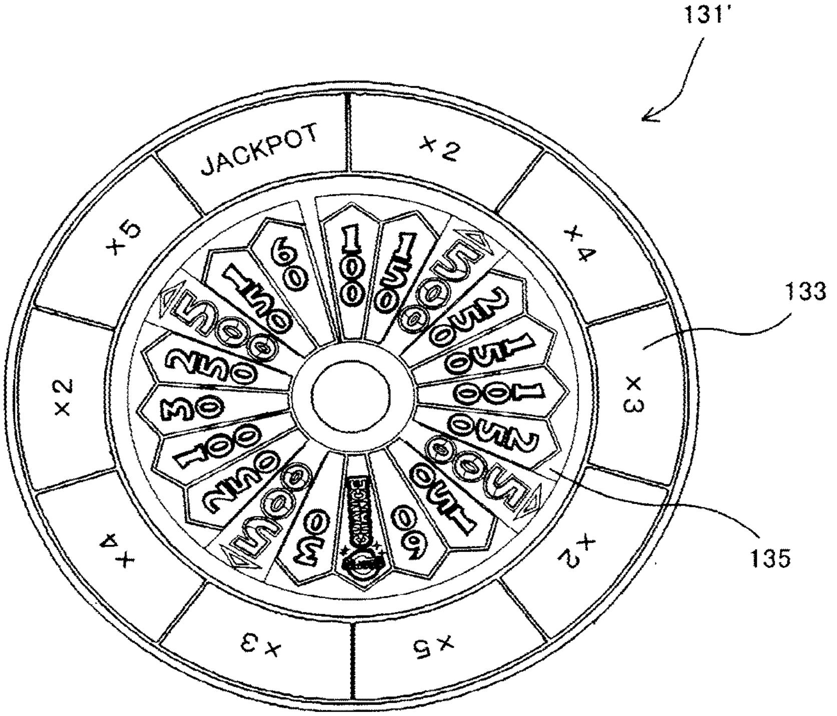
FIG. 27A and FIG. 27B are views showing an example of images to be displayed on the upper image display panel 131'.

First, the main CPU 71 displays an image 133 of a roulette board and an image 135 of a ring-like display object on an upper image display panel 131' (step S2611). For example, as shown in FIG. 26 or FIG. 27A, the image 133 of the roulette board (hereinafter, referred to as a roulette board 133) and an image 135 of a ring-like display object (hereinafter, referred to as a ring-like display object 135) are displayed on a circular upper image display panel 131'. On the roulette board 133, an image of numeric values indicating payments of "500", "250", "150", "100", "60", and "30" or an image of characters "RESPIN CHANCE" indicating that a roulette game is executed again is displayed. On the ring-like display object 135, an image of numeric values indicating magnifications such as "×5", "×4", "×3", "×2" or an image of characters indicating "JACKPOT" is displayed.

Next, the main CPU 71 displays characters "LOOK UP" on the lower image display panel 141 (step S2613). Displaying this can prompt a player to see the upper image display panel 131'.

The main CPU 71 then selects a lottery table (step S2614). The lottery table includes a first table and a second table. The first table is the one for performing normal lottery processing and is a lottery table in which a variety of payments such as a low payment "30" or a payment "60" have won. When "RESPIN" has won, the roulette board is rotated again and then a roulette game is played.

The second table is directed to a lottery table to be selected when a result of lottery processing in step S2615 to be described later is "RESPIN" and then the routine has reverted to step S2614 in determination processing of step S2622. That is, the second table is directed to a table to be selected when "RESPIN" has been established in first lottery processing. In the lottery processing employing the second table, "RESPIN", a low payment "30", or a payment "60" is never won. By doing this, when "RESIN" has been established in a first roulette game, a payment higher than the payment "60" can always be won. Thus, when "RESPIN" has been established in the roulette game, a player's sense of expectation can be enhanced.

When "RESPIN" has been temporarily established, "RESPIN" is never won again, and thus, "RESPIN" are never established two or more times. By doing this, extension of time required for roulette game is prevented and the profits in gaming facility can be ensured by returning the routine to a unitary game requiring coins or credits earlier. By doing this, an appropriate balance between players' profits and gaming facilities' profits can be realized.

Next, the main CPU 71 determines a payment or replay by executing lottery processing, employing the lottery table selected in step S2614 (step S2615).

Figure 27B:
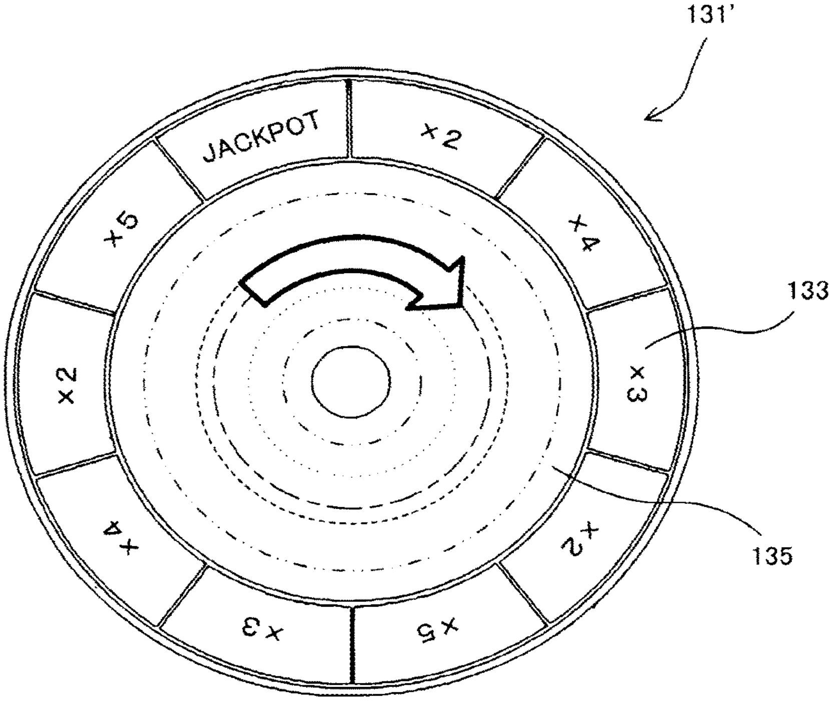

The main CPU 71 then displays the roulette board 133 in a rotating manner (step S2617). By executing the processing in step S2617, an image as shown in FIG. 27B is displayed on the upper image display panel 131'.

The main CPU 71 then determines whether or not a predetermined time has elapsed after rotation of the roulette board 133 has been started (step S2619). When the main CPU 71 determines that the predetermined time has not elapsed yet, the main CPU 71 causes the routine to revert to step S2619.

Figure 28A:
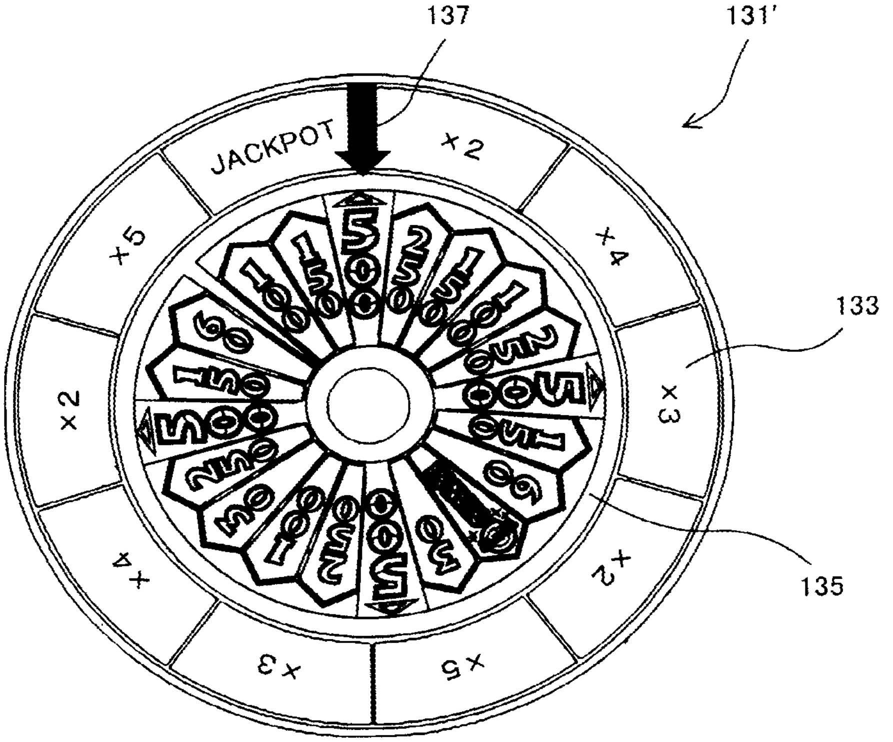
FIG. 28A and FIG. 28B are views showing an example of images to be displayed on the upper image display panel 131'.

When the main CPU 71 determines that the predetermined time has elapsed, the main CPU 71 displays the roulette board in a stopped manner so that the payment determined in lottery processing is displayed at a position of an arrow image 137 (step S2621). By executing the processing in step S2621, an image as shown in FIG. 28A is displayed on the upper image display panel 131'. The payment determined in lottery processing is displayed at the position of the arrow image 137, thereby enabling a player to recognize as if the payment were determined by means of a real roulette game. FIG. 28A shows an example appearing when a payment has been determined as 500.

Next, the main CPU 71 determines whether or not the roulette board 133 has been stopped at "RESPIN" (step S2622). When the main CPU 71 determines that the roulette board 133 has been stopped at "RESPIN", the main CPU 71 causes the routine to revert to step S2614 described above. By doing this, a second table is selected in the processing of step S2614 and then lottery processing in step S2615 is executed.

When the main CPU 71 determines that the roulette board 133 has not been stopped at a "RESPIN" position, the main CPU 71 displays the payment determined in lottery processing on the lower image display panel 141 (step S2623). The payment determined in lottery processing is displayed on the lower image display panel 141, thereby enabling a player to clearly visually recognize the determined payment.

Next, the main CPU 71 executes lottery processing and then determines a magnification or a jackpot (step S2625).

Figure 28B:
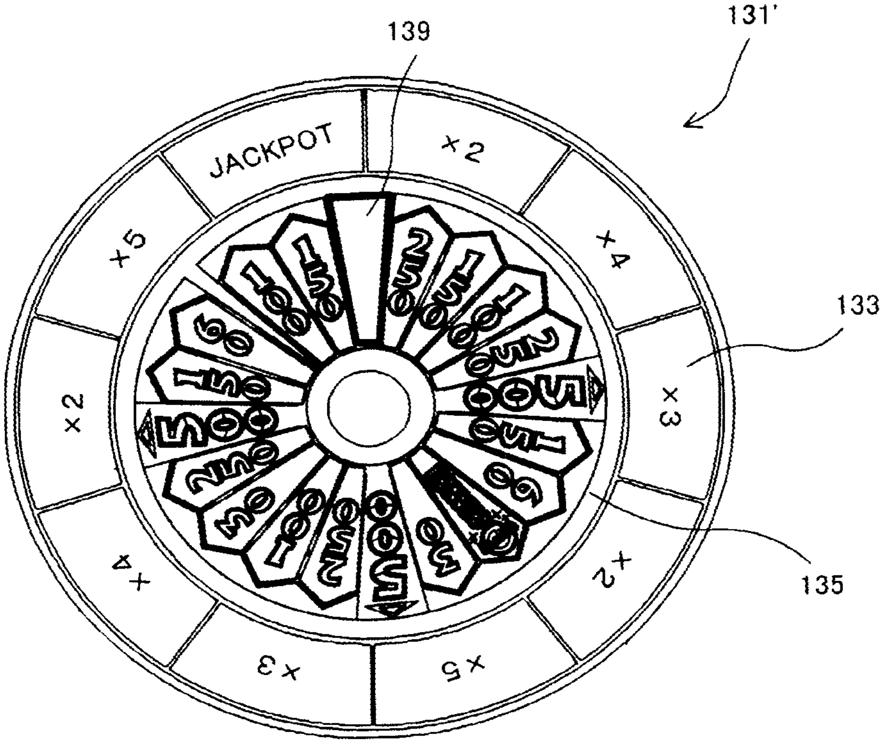

Next, the main CPU 71 then displays an elongated region 139 of the payment determined in lottery processing on the roulette board, in an illuminative manner (step S2627). By executing the processing of step S2627, an image as shown in FIG. 28B is displayed on the upper image display panel 131'. As described above, in this example, the payment is determined as 500, so that the elongated region 139 in which payment is 500 is illuminated.

Figure 29A:
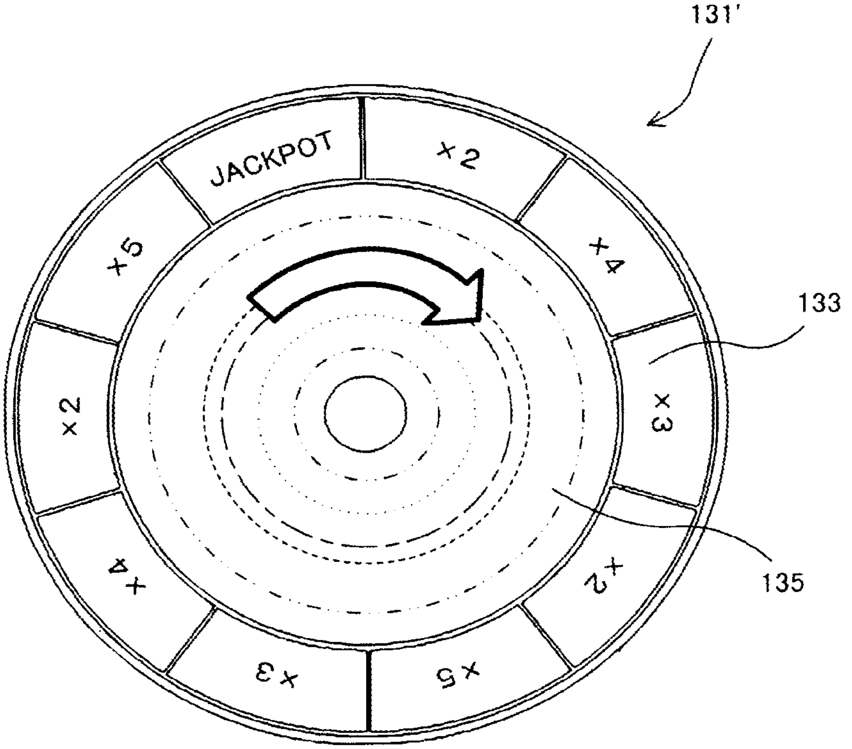
FIG. 29A and FIG. 29B are views showing an example of images to be displayed on the upper image display panel 131'.

Next, the main CPU 71 then displays the image of the roulette board in a rotating manner together with the elongated region 139 (step S2629). By executing the processing of step S2629, an image as shown in FIG. 29A is displayed on the upper image display panel 131'.

Figure 29B:
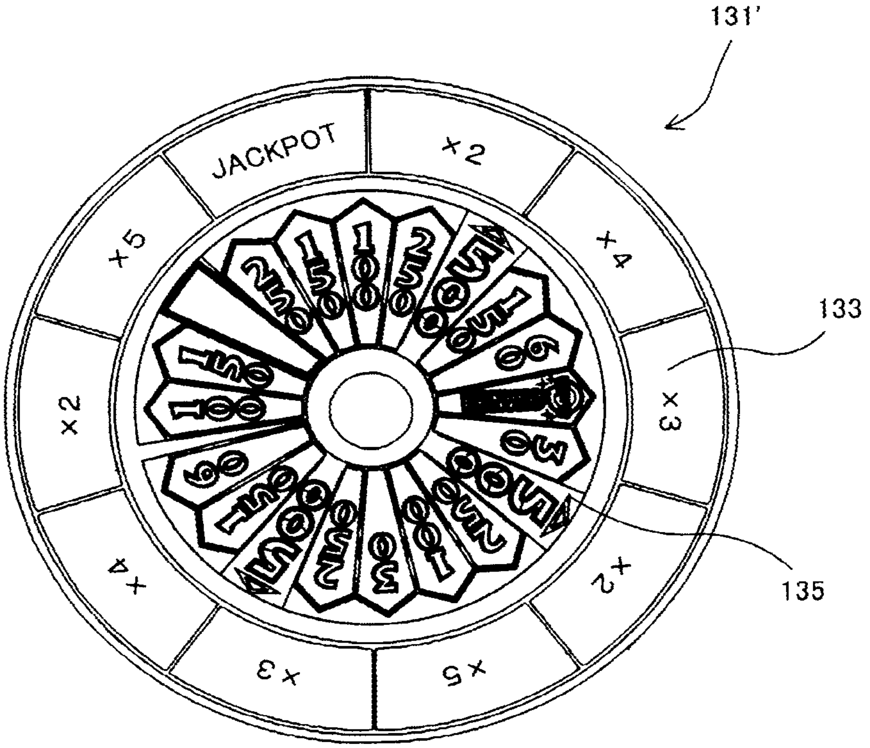

Next, the main CPU 71 then determines whether or not a predetermined time has elapsed after the image of the roulette board has been rotated (step S2631). When the main CPU 71 determines that the predetermined time has not elapsed yet, the main CPU 71 causes the routine to revert to step S2631. When the main CPU 71 determines that the predetermined time has elapsed, the main CPU 71 displays the roulette boards in a stopped manner so that the elongated region moves to the position indicating the magnification determined in lottery processing (step S2633). By executing the processing of step S2633, an image as shown in FIG. 29B is displayed on the upper image display panel 131'. FIG. 29A shows an example appearing when the magnification has been determined as 5.

Next, the main CPU 71 then determines a value obtained by multiplying the magnification determined in lottery processing for the payment determined in lottery processing as a payment to be given to a player (step S2635). In this example, the payment is determined as 500 and the magnification is determined as 5; and therefore, the payment given to the player is determined as 2500.

Next, the main CPU 71 then displays the payment to be given to the player on the lower image display panel 141 (step S2637) and then completes this subroutine. The processing in step S2637 enables a player to clearly visually recognize that the payment to be given to the player is 2500.

While, in step S2619 or step S2631 described above, it was determined whether or not a predetermined time had elapsed, it may be determined whether or not a player has made operation in place of the above determination. Specifically, it is determined whether or not a player has operated a touch panel 114. By doing this, a player can positively participate in a game in progress, enabling the player to be hardly weary of the game.

Third Embodiment

Figure 30:
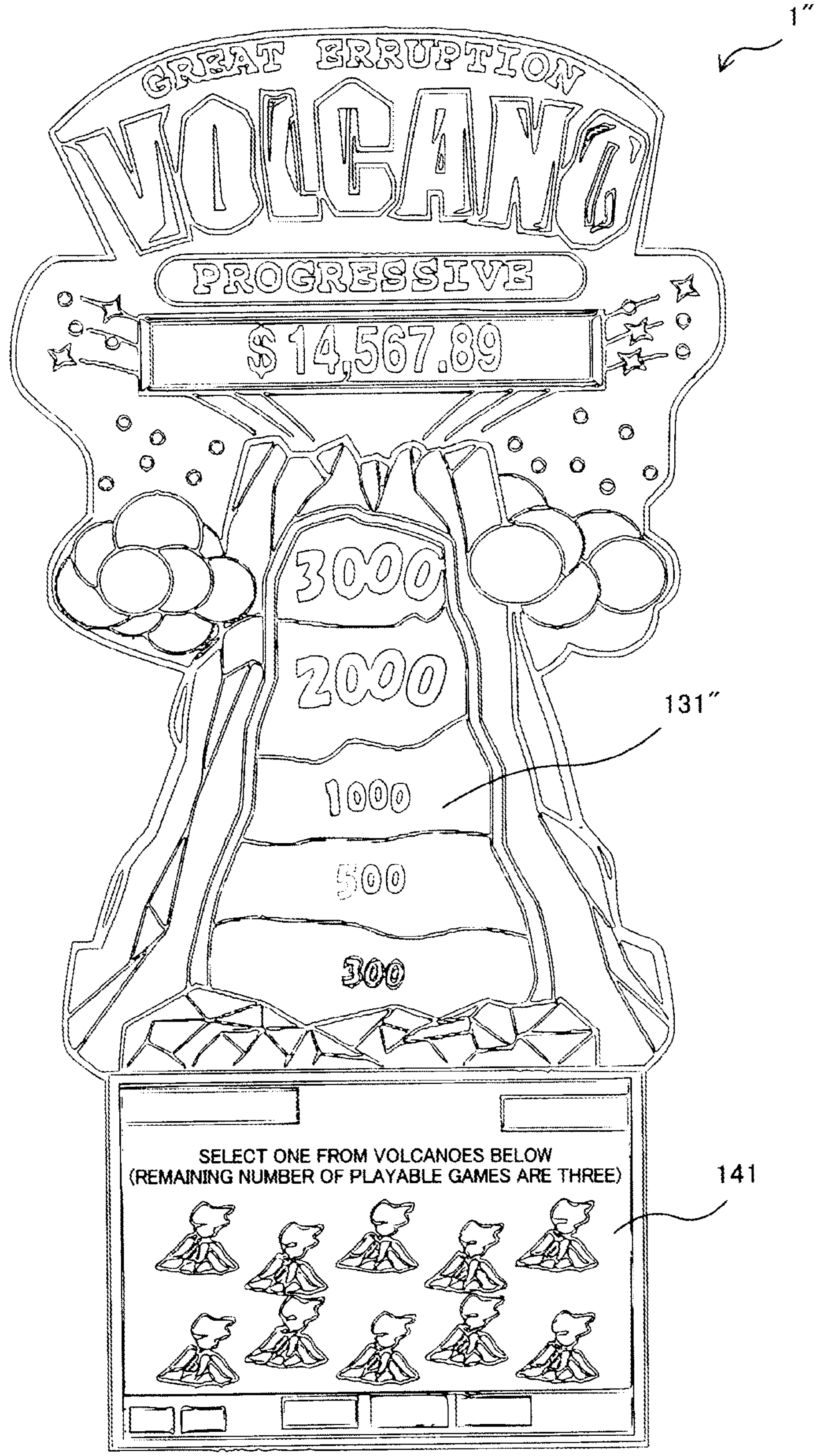
FIG. 30 is a front view showing a gaining machine 1" of a third embodiment.

FIG. 30 is a front view showing a gaming machine 1" according to a third embodiment. The gaming machine 1" is the one in which the upper image display panel 131 of the gaming machine 1 according to the first embodiment is customized as an upper image display panel 131" according to the contents of a game at the gaming machine 1". A lower image display panel 141 was shown by assigning the same reference numeral as is the case with the gaming machine 1 according to the first embodiment.

Except for a shape or a construction of the upper image display panel 131", the gaming machine 1" according to the third embodiment has a construction and functions which are similar to those of the gaming machine 1 according to the first embodiment. Therefore, the gaming machine 1" according to the third embodiment also has the construction shown in FIG. 3 to FIG. 6 and FIG. 18 and a variety of processing operations shown in FIG. 7 to FIG. 17 and FIG. 20 to FIG. 24 are executed.

<<Bonus Selection Game Processing>>

FIG. 31 is a flowchart showing a subroutine of bonus selection game processing. This subroutine is invoked and executed in processing of step S20 in FIG. 8. For example, this subroutine is executed on the condition that a predetermined symbol combination has won.

First, a main CPU 71 initializes a number-of-selections counter (step S3111). The number-of-selections counter is directed to a counter indicating the number of big bonus cards to be described later, selected by a player.

Next, the main CPU 71 arranges six cards in one line in a manner in which the suits or numbers of the cards can be visually recognized by a player and then displays the arranged cards on the lower image display panel 141 (step S3113). For example, the visually recognizable manner designates a manner in which an image of faced-up cards is displayed. By executing processing in step S3113, an image as shown in FIG. 32A is displayed on the lower image display panel 141.

Figure 32A:
FIG. 32A, FIG. 32B, FIG. 32C, and FIG. 32D are views showing an example of images to be displayed on a lower image display panel 141.

As shown in FIG. 32A, five of the six cards are directed to cards for migrating to a big bonus (hereinafter, referred to as big bonus cards). One of the six cards is directed to a card for migrating to a free game (hereinafter, referred to as a free game card). All of the sixth cards are displayed on the lower image display panel 141 in a visually recognizable manner, thereby enabling a player to visually recognize assignment of the six cards.

The main CPU 71 then determines whether or not a predetermined time has elapsed (step S3115). The predetermined time designates time during which it is presupposed that a player can recognize the suits or numbers of the six cards. When the main CPU 71 determines that the predetermined time has not elapsed yet, the main CPU 71 causes the routine to revert to step S3115.

Figure 32B:
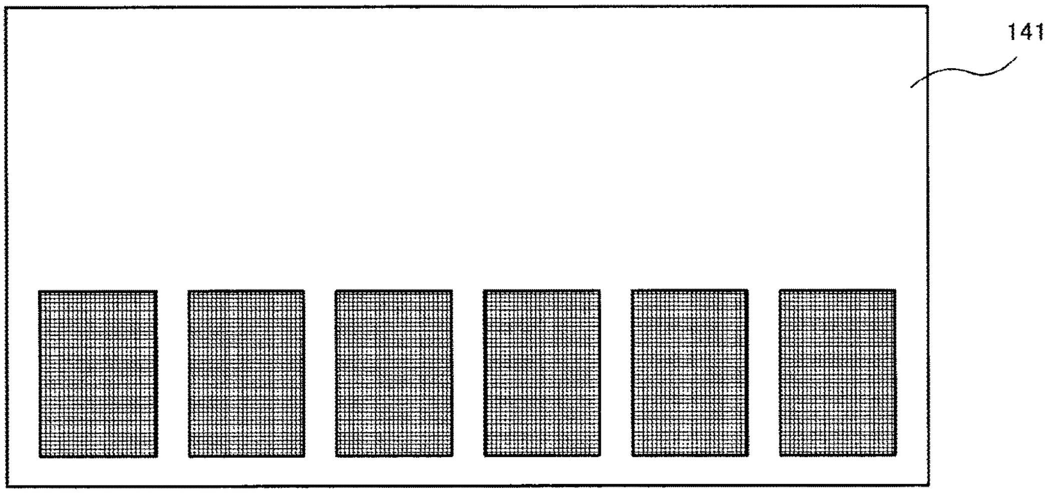
Figure 32C:

When the main CPU 71 determines that the predetermined time has elapsed, the main CPU 71 arranges the six cards in one line in a manner in which the suits or numbers of the cards cannot be visually recognized by a player and then displays them on the lower image display panel 141 (step S3117). By executing processing in step S3117, an image as shown in FIG. 32B is displayed on the lower image display panel 141.

Next, the main CPU 71 determines arrangement of the six cards by means of lottery processing (step S3119). Next, The main CPU 71 then displays the six cards on the lower image display panel 141 in a shuffled manner (step S3121); arranges the six cards in one line in a manner in which the suits or numbers of the cards cannot be visually recognized by a player; and then, displays them on the lower image display panel 141 again (step S3123). By executing processing in step S3123, an image as shown in FIG. 32B is displayed on the lower image display panel 141.

Next, the main CPU 71 then allows a player selection operation (step S3125). The player selection operation may be made by employing buttons existing on a control panel 30 or 30' and the like or employing a touch panel (not shown) provided to be superimposed on the lower image display panel 141.

Next, the main CPU 71 then determines whether or not a player has selected one card (step S3127). When the main CPU 71 determines that the player has not selected one card, the main CPU 71 causes the routine to revert to step S3127.

When the main CPU 71 determines that the player has selected one card, the selected card is displayed in a manner in which its suit or number can be visually recognized by the player (step S3129). In this step S3129, the suit or number of one card existing at the selected position by the player are displayed referring to arrangement of the six cards determined in lottery processing of step S3119.

Next, the main CPU 71 then determines whether or not the selected card is a free game card (step S3131). When the main CPU 71 determines that it is the free game card, the main CPU 71 determines migration to a free game (step S3133) and completes this subroutine.

When the main CPU 71 determines that it is not the free game card, the result is when a bog bonus card has been selected, and therefore, a value of the number-of-selections counter is increased by 1 (step S3135).

Next, the main CPU 71 determines whether or not the value of the number-of-selections counter is 3 (step S3137). When the main CPU 71 determines that the value of the number-of-selections counter is 3, the main CPU 71 causes the routine to revert to step S3127.

When the main CPU 71 determines that the value of the number-of-selections counter is 3, the result is when three bonus cards could be arranged; and therefore, migration to a big bonus is determined (step S3139) and then this subroutine is completed.

Figure 32D:

A bonus selection game is directed to a game in which the routine is caused to migrate to a big bonus when cards are selected from the six cards displayed on the lower image display panel 141 on a one-by-one card basis and then three big bonus cards are first selected (arranged) (see FIG. 32 (C)) or the routine is caused to migrate to a free game when one free game card is first selected (arranged) (see FIG. 32D).

In this bonus selection game, a probability that the routine can migrate to a big bonus or a probability that the routine can migrate to a free game are ½, both of which is identical to each other. However, for example, in comparison with a case in which a player must select only one of two cards, the probabilities are ½, both of which are identical to each other in the abovementioned bonus selection game, whereas a player can make any selection from among six cards, so that the player's mental burden can be reduced.

Fourth Embodiment

Figure 33:
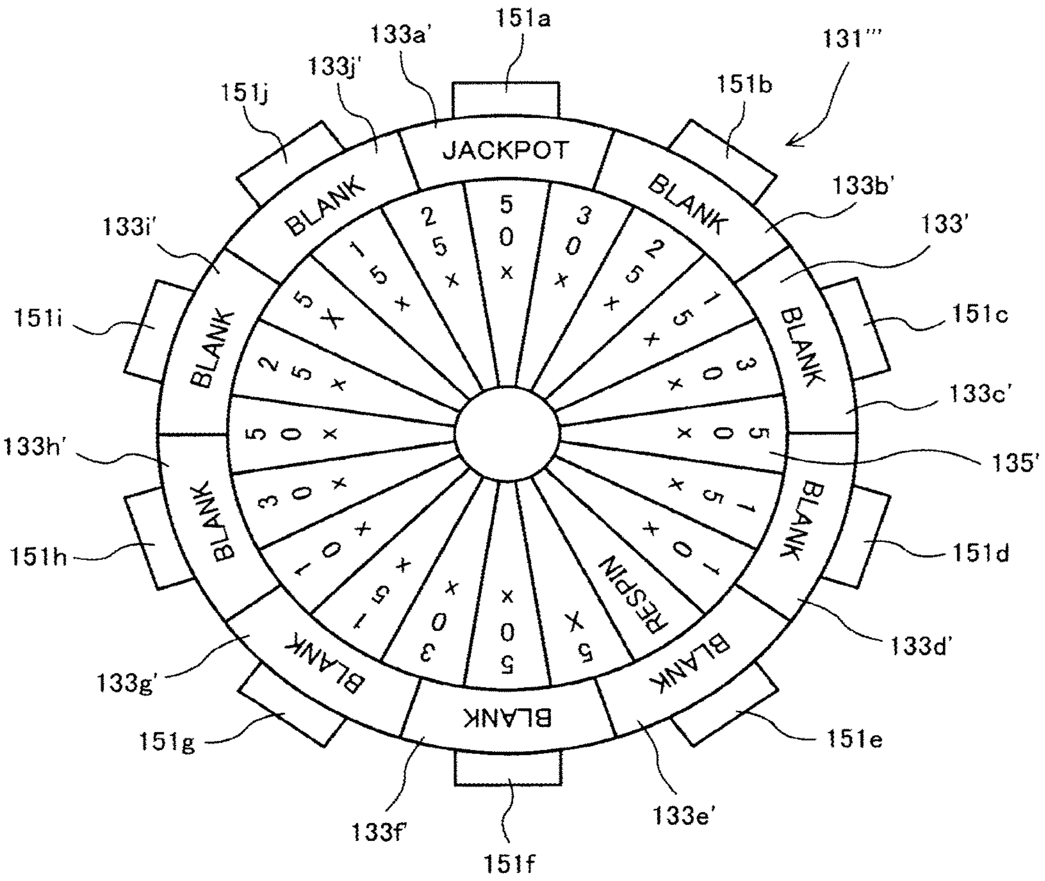
FIG. 33 is a front view showing an upper image display panel 131''' of a gaming machine 1''' according to a fourth embodiment.

FIG. 33 is a front view showing an upper image display panel 131''' of a gaming machine 1''' according to a fourth embodiment. The gaming machine 1''' is the one in which the upper image display panel 131' of the gaming machine 1' according to the second embodiment is customized as an upper image display panel 131' according to the contents of game at the gaming machine 1'''. The lower image display panel 141 is similar to the gaming machine 1 according to the first embodiment, and has been shown by assigning the same reference numerals thereto.

Except for a shape or construction of the upper image display panel 131''', the gaming machine 1''' according to the fourth embodiment has a construction and functions which are similar to those of the gaming machine 1' according to the first embodiment. Therefore, the gaming machine 1''' according to the fourth embodiment also has the construction shown in FIG. 3 to FIG. 6 and FIG. 18 and a variety of processing operations shown in FIG. 7 to FIG. 17 and FIG. 20 to FIG. 24 are executed.

As shown in FIG. 33, ten LEDs **151*a* to 151*j* are provided at the periphery of the upper image display panel 131'''. These ten LEDs 151*a* to 151*j* correspond to ten outer circumferential regions 133*a*' to 133*j*'. One outer circumferential region can be illuminated by lighting one LED. Like a lamp 111 shown in FIG. 6, each of the ten LEDs 151*a* to 151*j* is electrically connected to a main PCB 110, and each of the ten LEDs 151*a* to 151*j* is controlled to be turned on or off by means of a control signal that is outputted from the main PCB 110**.

In an example shown in FIG. 33, among the ten outer circumferential regions **133*a*' to 133*j*', one outer circumferential region 133*a*' is a region which indicates "JACKPOT, and the other nine outer circumferential regions 133*b*' to 133*j*'** are regions which indicate "BLANK". In a case where "JACKPOT is won by playing a JACKPOT challenge game to be described later, a predetermined payment is granted to a player, and when "BLANK" is won, i.e., in a case where "JACKPOT" is lost, the predetermined payment is not granted to the player.

While, in an example shown in FIG. 33, one "JACKPOT" and nine "BLANK" symbols are displayed in the ten outer circumferential regions **133*a*' to 133*j*', the number of "JACKPOT" symbols or "BLANK" symbols can be appropriately changed according to a value relating to a game such as the number of BETs. In addition, while, in the example shown in FIG. 33, "JACKPOT" has been shown only in the outer circumferential region 133*a*'**, the "JACKPOT" may be shown in another outer circumferential region.

<<Second Spin Bonus Game/JACKPOT Challenge Game Processing>>

Figure 34:
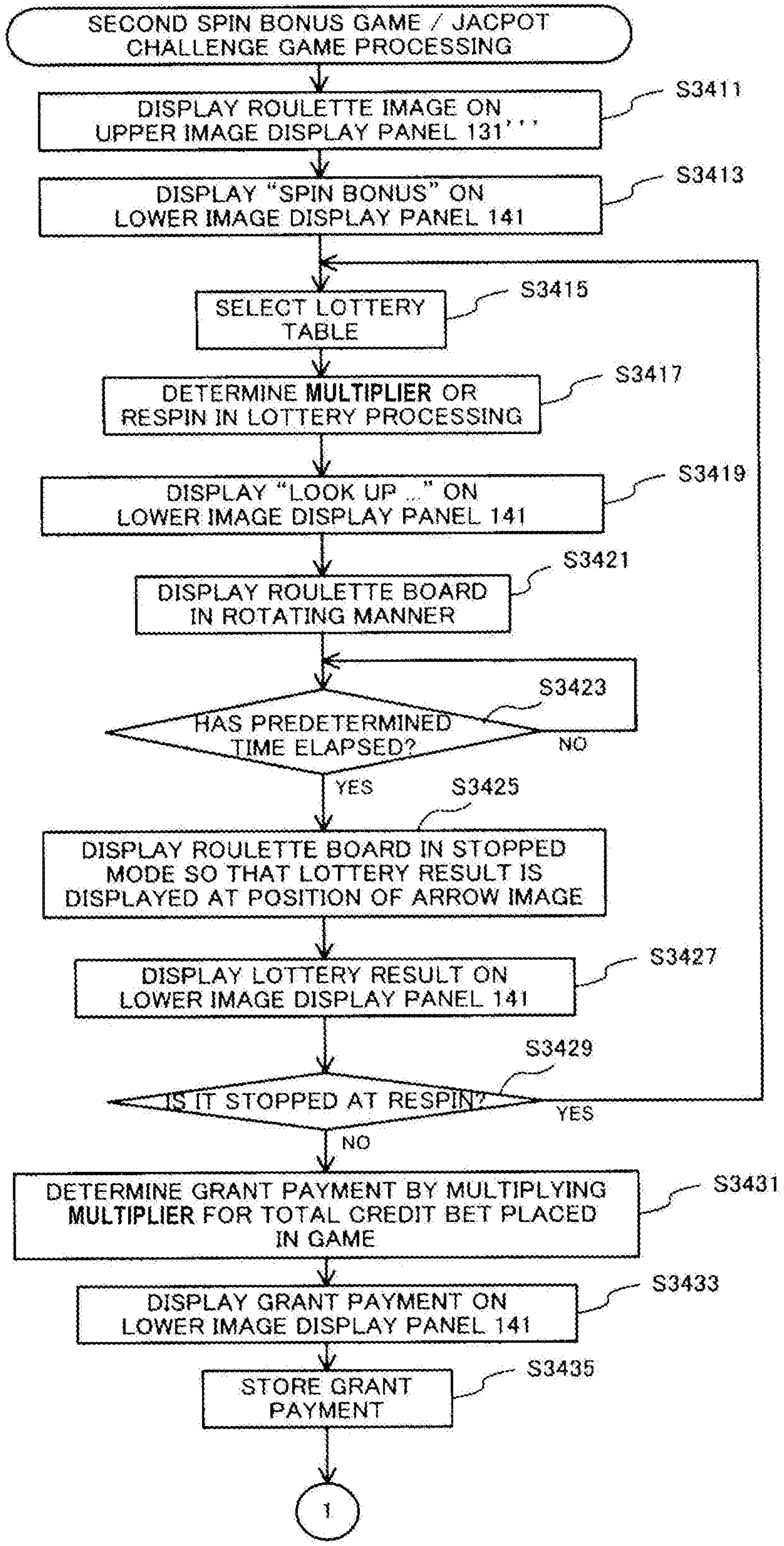
FIG. 34 is a flowchart showing a subroutine of second spin bonus game processing and JACKPOT challenge game.
Figure 35:
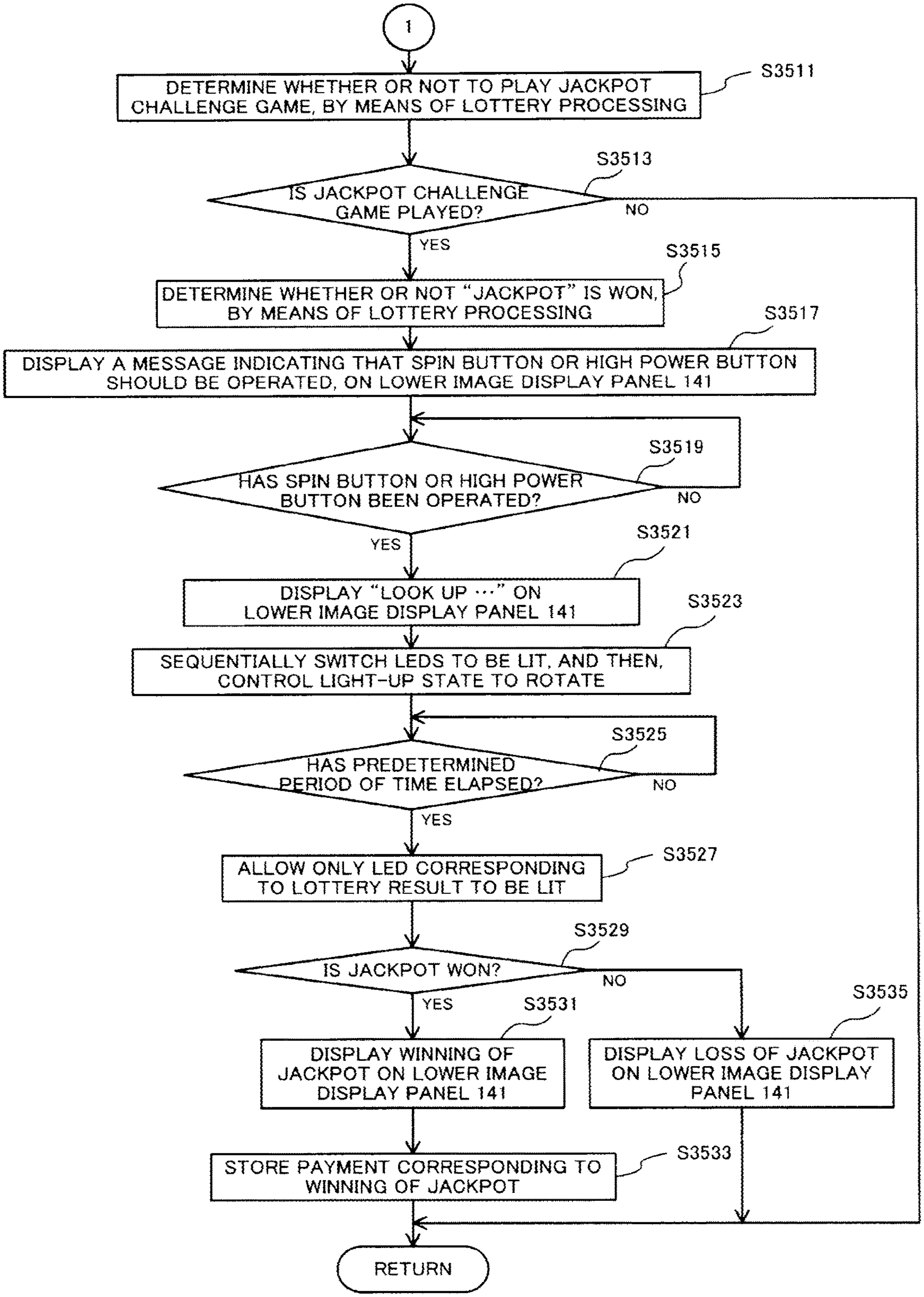
FIG. 35 is a flowchart showing a subroutine of second spin bonus game processing and JACKPOT challenge game.

FIGS. 34 and 35 are a flowchart showing a subroutine of second spin bonus game/JACKPOT challenge game processing. This subroutine is invoked and executed in the processing of step S20 in FIG. 8. Specifically, subroutines of the second spin bonus game and JACKPOT challenge game processing, shown in FIG. 34 and FIG. 35, are invoked and executed as a bonus game trigger which is exerted by the fact that "SPIN BONUS" symbols have appeared on a first video reel, a third video reel, and a fifth video reel (the video reels of a first column, a third column, and a fifth columns).

First, the main CPU 71 displays an image 133' of a roulette board and an image 135' of a ring-like display object on an upper image display panel 131''' (step S3411). For example, as shown in FIG. 33, the image 133' of the roulette board (hereinafter, referred to as a roulette board 133') and an image 135' of a ring-like display object (hereinafter, referred to as a ring-like display object 135') are displayed on a circular upper image display panel 131'''. On the roulette board 133', an image of numeric values indicating magnification of "50×", "230×", "25×", "15×", "10×", and "5×" or an image of characters "RESPIN" indicating that a roulette game is executed again is displayed. On the ring-like display object 135', an image of characters indicating "BLANK", an image of characters indicating "JACKPOT" is displayed.

Next, the main CPU 71 displays characters "SPIN BONUS" on the lower image display panel 141 (step S3413). Displaying this can recognized to a player, to starting of SPIN BONUS game on the upper image display panel 131''.

Next, the main CPU 71 then selects a lottery table (step S3415). The lottery table includes a first table and a second table. The first table is the one for performing normal lottery processing and is a lottery table in which "RESPIN" or magnification have won. When "RESPIN" has won, the roulette board 133' is rotated again and then a roulette game is played.

The second table is directed to a lottery table to be selected when a result of lottery processing in step S3417 to be described later is "RESPIN" and then the routine has reverted to step S3415 in determination processing of step S3429. That is, the second table is directed to a table to be selected when "RESPIN" has been established in first lottery processing. In the lottery processing employing the second table, "RESPIN", a low magnification "5×", or "10×" is never won. By doing this, when "RESPIN" has been established in a first roulette game, a high magnification in a second roulette game can always be won. Thus, when "RESPIN" has been established in the roulette game, a player's sense of expectation can be enhanced.

When "RESPIN" has been temporarily established, "RESPIN" is never won again, and thus, "RESPIN" are never established two or more times. By doing this, extension of time required for roulette game is prevented and the profits in gaming facility can be ensured by returning the routine to a unitary game requiring coins or credits earlier. By doing this, an appropriate balance between players' profits and gaming facilities' profits can be realized.

Next, the main CPU 71 determines the magnification or the RESPIN, employing the lottery table selected in step S3415 (step S3417).

Next, the main CPU 71 displays a message "LOOK UP FOR MULTIPLIER ELECTION" on the lower image display panel 141 (step S3419). Displaying this message can prompt a player to watch the upper image display panel 131''.

Figure 36:
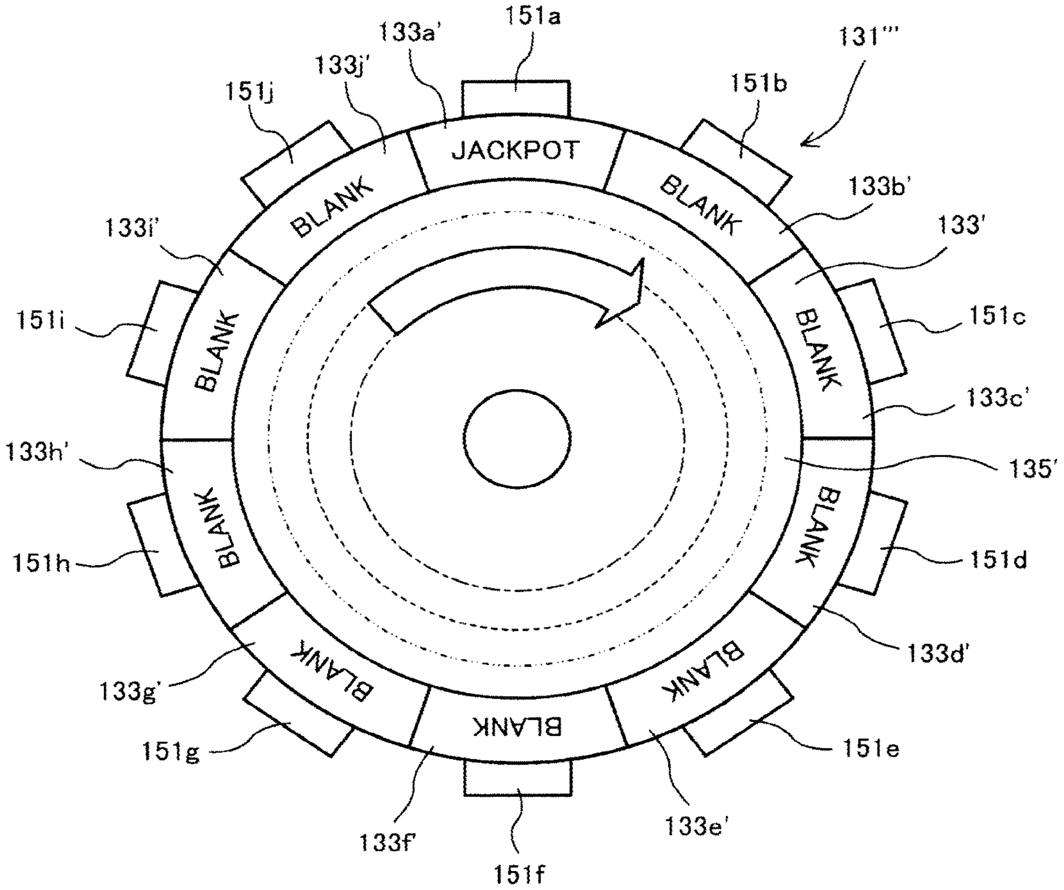
FIG. 36 is a view showing an example of an image to be displayed on the upper image display panel 131'''.

Next, the main CPU 71 then displays the roulette board 133' in a rotating manner (step S3421). By executing the processing in step S3421, an image as shown in FIG. 36 is displayed an image rotating of the roulette board 133' on the upper image display panel 131''.

Next, the main CPU 71 then determines whether or not a predetermined time has elapsed after rotation of the roulette board 133' has been started (step S3423). When the main CPU 71 determines that the predetermined time has not elapsed yet, the main CPU 71 causes the routine to revert to step S2619.

Figure 37:
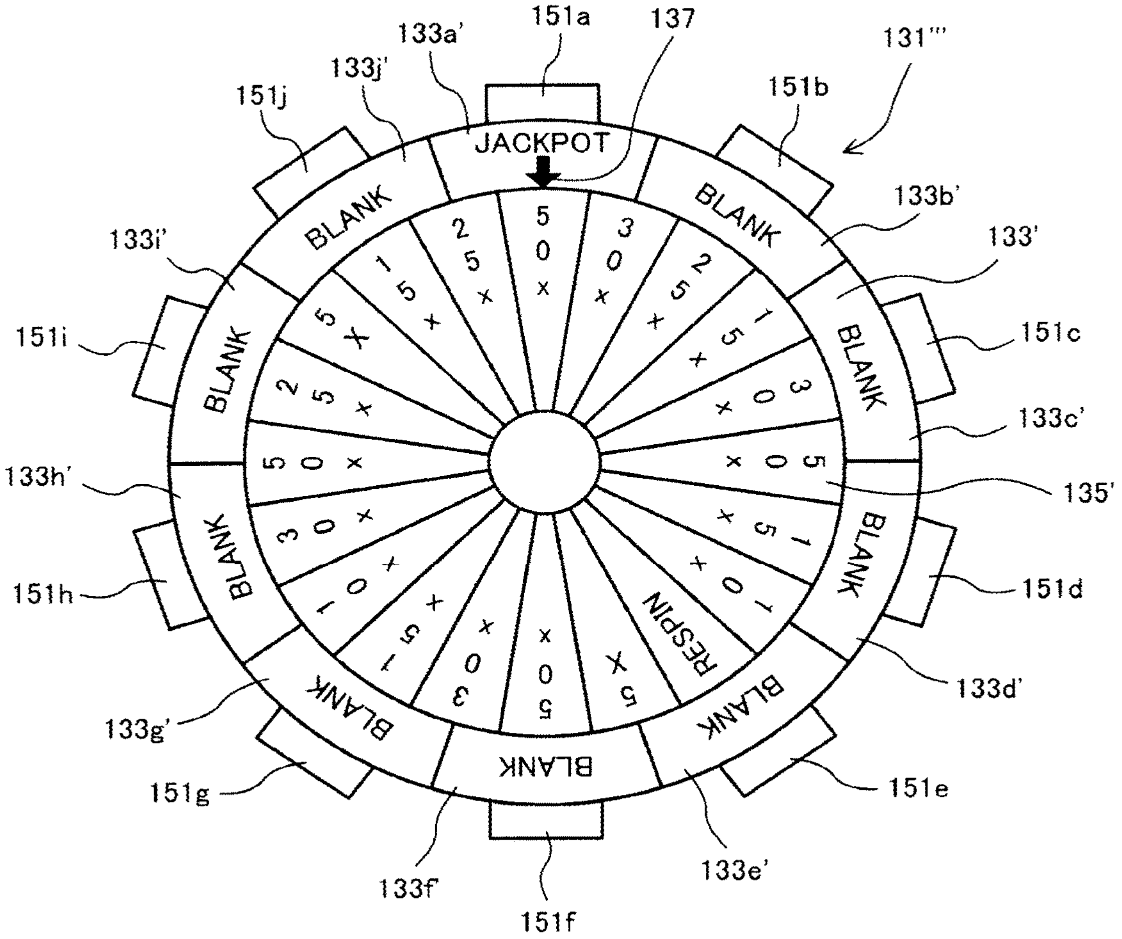
FIG. 37 is a view showing an example of an image to be displayed on the upper image display panel 131'''.

When the main CPU 71 determines that the predetermined time has elapsed, the main CPU 71 displays the roulette board in a stopped manner so that the lottery result is displayed at a position of an arrow image 137 (step S3425). By executing the processing in step S3421, an image as shown in FIG. 37 is displayed on the upper image display panel 131'''. The lottery result is displayed at the position of the arrow image 137, thereby enabling a player to recognize as if the magnification or the RESPIN were determined by means of a real roulette game. FIG. 37 shows an example appearing when a magnification has been determined as 50×.

Next, the main CPU 71 displays a lottery result on the lower image display panel 141 (step S3427). Displaying the lottery result enables a player to recognize a scale of magnification or whether RESPIN is established in a case where the player has watched the lower image display panel 141 as well.

Next, the main CPU 71 determines whether or not the roulette board 133' has been stopped at "RESPIN" (step S3429). When the main CPU 71 determines that the roulette board 133' has been stopped at "RESPIN", the main CPU 71 causes the routine to revert to step S3415 described above. By doing this, a second table is selected in the processing of step S3415 and then lottery processing in step S3417 is executed.

When the main CPU 71 determines that the roulette board 133' has not been stopped at a "RESPIN" position, the main CPU 71 determines as a grant payment to be granted to a player according to a second spin game, a value obtained by multiplying a magnification that is determined by lottery processing for a total credit bet placed in a game (step 3431).

Next, main CPU 71 is displayed the determined grant payment on the lower image display panel 141 (step S3433). By displayed the determined payment on the lower image display panel 141, enabling a player to clearly visually recognize the determined grant payment.

Next, main CPU 71 stored the determined grant payment in RAM 73 (step S3435).

The second spin game processing is configured by described above the processing of step S3411 to S3435.

Next, the main CPU 71 determines whether or not to execute a JACKPOT challenge game by executing lottery processing (step S3511). It is preferable that a probability of generating this JACKPOT challenge game is proportional to a TOTAL BET amount. Doing this enables a player who has betted a large amount of money to preferentially play the JACKPOT challenge game, enabling the player to have a sense of expectation and then continuously play the game.

Next, the main CPU 71 determines whether or not to execute a JACKPOT challenge game (step S3513). When the main CPU 71 determines that the JACKPOT challenge game is not executed (NO), this subroutine is completed immediately. Doing this enables the subroutine to be completed by the second spin game.

Next, when the main CPU 71 determines that the JACKPOT challenge game is executed (YES), the main CPU 71 determines whether or not JACKPOT is won by executing lottery processing (step S3515). By means of this lottery processing, the number of "JACKPOT" symbols and the number of "BLANK" symbols to be shown in the ten outer circumferential regions 133*a*' to 133*j*' are also determined. In a case where the number of "JACKPOT" symbols is 0, it means that JACKPOT is lost. When JACKPOT is won, a player obtains a profit. For example, a predetermined payment is granted to the player. Alternatively, when JACKPOT is lost, a player cannot obtain any profit, and the predetermined payment is not granted to the player.

Next, the main CPU 71 displays a message indicating that a spin button 31 or a high power button 38 should be operated, on the lower image display panel 141 (step S3517). Operating the spin button 31 or the high power button 38 while this message is displayed enables a player to be broadcasted that a JACKPOT challenge game is started.

Next, the main CPU 71 determines whether or not the spin button 31 or the high power button 38 has been operated by a player (step S3519). When the main CPU 71 determines that the spin button 31 or the high power button 38 has not been operated (NO), the main CPU 71 causes the routine to revert to step S3519.

When the main CPU 71 determines that the spin button 31 or the high power button 38 has been operated (YES), the main CPU 71 displays characters "LOOK UP FOR JACKPOT CHALLENGE" on the lower image display panel 141 (step S3521). Displaying these characters can prompt a player to watch the upper image display panel 131'''.

Next, the main CPU 71 causes ten LEDs 151*a* to 151*j* to light sequentially and then sequentially illuminates ten outer circumferential regions 133*a*' to 133*j*'. For example, the main CPU 71 causes the ten LEDs 151*a* to 151*j* to light sequentially in clockwise direction. Doing this enables the ten outer circumferential regions 133*a*' to 133*j*' to be sequentially illuminated, enabling a player to visually recognize as if the outer circumferential regions having been brightly illuminated were spinning. In this manner, the JACKPOT challenge game is executed.

Next, the main CPU 71 then determines whether or not a predetermined time based on a light-up starting of the ten LED 151*a* to 151*j* (step S3525). When the main CPU 71 determines that the predetermined time has not elapsed yet, the main CPU 71 causes the routine to revert to step S3525. When the main CPU 71 determines that the predetermined time has elapsed, the main CPU 71 lighting the LED only corresponding to the lottery result of step S3515 (step S3527).

For example, in a case where JACKPOT is won, only an LED is lit which corresponds to an outer circumferential region in which the "JACKPOT" is displayed. Doing this can illuminate only the outer circumferential region in which "JACKPOT" is displayed, enabling a player to be explicitly indicated that the JACKPOT is won.

Alternatively, in a case where JACKPOT is lost, only an LED is lit which corresponds to an outer circumferential region in which any one "BLANK" is displayed. Doing this can illuminate only the outer circumferential region in which "BLANK" is displayed, enabling a player to be explicitly indicated that JACKPOT is lost.

In a case where JACKPOT is lost, all of the ten LEDs 151*a* to 151*j* may be turned off. Doing this also enables a player to be explicitly indicated that JACKPOT is lost. In the case where JACKPOT is lost, the LEDs may also be lit so as to illuminate only all of the outer circumferential regions in which "BLANK" is displayed.

Next, the main CPU 71 determines whether or not "JACKPOT" is won, by means of lottery processing in step S3515 (step S3529). When the main CPU 71 determines that "JACKPOT" is won (YES), the main CPU 71 displays a message indicating the winning of JACKPOT and a granted payment, on the upper image display panel 141 (step S3531), causes the RAM 73 to store the payment corresponding to the winning of JACKPOT (step S3533), and then, completes this subroutine.

When the main CPU 71 determines that "JACKPOT" is lost in the determination processing of step S3529 (NO), the main CPU 71 displays a message indicating that JACKPOT has been lost, on the lower image display panel 141 (step S3531), and then, completes this subroutine.

A JACKPOT challenge game is executed in accordance with the processing operations in step S3511 to S3535 described above.

While, in step S3423 or step S3525 described above, it was determined whether or not a predetermined time had elapsed, it may be determined whether or not a player has made operation in place of the above determination. Specifically, it is determined whether or not a player has operated a touch panel 114. By doing this, a player can positively participate in a game in progress, enabling the player to be hardly weary of the game.

While, the example of the second spin bonus game described above, showed a case in which an image of a roulette board 133' is displayed on the upper image display panel 131''' in a rotating manner, it may be that a disk equivalent to the roulette board 133' is provided, and then, this disk is controlled so as to be rotated by driving means such as a motor.

<<Characteristics of Fourth Embodiment>>

According to a fourth embodiment, a gaming machine includes:

a control device determining a magnification for computing a payment to be granted to a player, the control device being programmed so as to execute processing operations (A) to (E-2); and an operating device which is capable of being operated by a player; and a display device which is displays an information associating a game.

The control device executes the processing operations of:

(A) displaying on the display device, plural items of magnification information, each of which indicates a plurality of magnifications, in a moving manner;

(B) determining one magnification of the plurality of magnifications;

(C) when a predetermined period of time has elapsed, displaying magnification information corresponding to said one magnification in such a manner as to be stopped and static at a predetermined position;

(D) displaying on the display device a value that is obtained by multiplying said one magnification for a predetermined payment, as a payment to be granted to a player;

(E) determining whether or not to execute JACKPOT grant determination processing;

(E-1) in a case where it is determined that JACKPOT is granted to a player in the processing (E), determining whether or not the JACKPOT is granted to a player; and (E-2) when a predetermined period of time has elapsed, executing processing of displaying a result of the processing (E-1) on the display device.

What is claimed is:

1. A gaming machine executing a game, the gaming machine comprising:
- a slot accepting game medium that provides credits to the gaming machine;
- a display device configured to display a total payment won by a player, the display device comprising a plurality of payment images arranged in a circumferential manner and a plurality of multiplier images arranged in a circumferential manner and in concentric manner with the plurality of payment images; and
- a control device configured to
- determine a basic payment and a multiplier based on a lottery program, the basic payment multiplied by the multiplier being a total payment won by a player; and
- control the display device to
  - start and stop a first rotation of the plurality of payment images relative to the plurality of multiplier images,
  - mark one of the plurality of payment images denoting the basic payment with an arrow image after the plurality of payment images stop the first rotation,
  - illuminate the one of the plurality of payment images marked with the arrow image,
  - perform a second rotation of the plurality of payment images relative to the plurality of multiplier images while maintaining the illumination on the one of the plurality of payment images during the second rotation, and
  - stop the second rotation of the plurality of payment images while maintaining the illumination on the one of the plurality of payment images such that the illuminating one of the plurality of payment images indicates one of the plurality of multiplier images denoting the multiplier.

2. A gaming system repeatedly executing unitary games, the gaming system comprising:
- a slot accepting game medium that provides credits to the gaming system;
- a display device configured to display a total payment won by a player; and
- a control device configured to determine a basic payment and a multiplier based on a lottery program, the basic payment multiplied by the multiplier being the total payment,
- wherein the control device is further configured to
  - (A) display a plurality of multiplier images in a still state;
  - (B) display a plurality of payment images in a first moving state;
  - (C) display the plurality of payment images in a first still state after displaying the plurality of payment images in the first moving state such that one of the plurality of payment images denoting the basic payment stops at a predetermined position;
  - (D) illuminate the one of the plurality of payment images after displaying the one of the plurality of payment images in the first still state;
  - (E) display the plurality of payment images in a second moving state after displaying the plurality of payment images in the first still state while maintaining the illumination on the one of the plurality of payment images during the second moving state;
  - (F) display the plurality of payment images in a second still state after displaying the plurality of payment images in the second moving state while maintaining the illumination on the one of the plurality of payment images such that the illuminating one of the plurality of payment images indicates one of the plurality of multiplier images denoting the multiplier; and
  - (G) calculating the total payment based on the basic payment denoted by the one of the plurality of payment images and the multiplier denoted by the one of the multiplier images.

3. The gaming machine of claim 1, further comprising a betting button wherein a betting amount for the game is set through the betting button.

4. The gaming system of claim 2, further comprising a betting button wherein betting amounts for the unitary games are set through the betting button.

* * * * *